United States Patent
Yang et al.

(10) Patent No.: US 9,518,076 B2
(45) Date of Patent: Dec. 13, 2016

(54) APPARATUS AND PROCESS FOR PREPARING REACTIVE LIGNIN WITH HIGH YIELD FROM PLANT BIOMASS FOR PRODUCTION OF FUELS AND CHEMICALS

(71) Applicant: Washington State University, Pullman, WA (US)

(72) Inventors: Bin Yang, Richland, WA (US); Dhrubojyoti Dey Laskar, Richland, WA (US)

(73) Assignee: Washington State University, Pullman, WA (US)

( * ) Notice: Subject to any disclaimer, the term of this patent is extended or adjusted under 35 U.S.C. 154(b) by 55 days.

(21) Appl. No.: 14/397,035

(22) PCT Filed: Apr. 30, 2013

(86) PCT No.: PCT/US2013/038927
§ 371 (c)(1),
(2) Date: Oct. 24, 2014

(87) PCT Pub. No.: WO2014/163652
PCT Pub. Date: Oct. 9, 2014

(65) Prior Publication Data
US 2015/0099868 A1      Apr. 9, 2015

Related U.S. Application Data

(60) Provisional application No. 61/640,502, filed on Apr. 30, 2012.

(51) Int. Cl.
*C07G 1/00*       (2011.01)
*C08H 7/00*       (2011.01)
(Continued)

(52) U.S. Cl.
CPC .................. *C07G 1/00* (2013.01); *B01J 19/24* (2013.01); *B01J 19/245* (2013.01); *C08H 6/00* (2013.01);
(Continued)

(58) Field of Classification Search
CPC .............. C07G 1/00; C08H 6/00; C08H 8/00; B01J 19/24; B01J 19/245
See application file for complete search history.

(56) References Cited

U.S. PATENT DOCUMENTS 5,424,417 A * 6/1995 Torget .................. C08H 8/00
                                                127/1
6,172,272 B1 * 1/2001 Shabtai ................. C10G 1/002
                                                208/108
(Continued)

OTHER PUBLICATIONS

Liu, C., et al. "The Effect of Flow Rate of Very Dilute Sulfuric Acid on Xylan, Lignin, and Total Mass Removal from Corn Stover," Ind. Eng. Chem. Res., 2004, 43, 2781-2788.*
(Continued)

*Primary Examiner* — Liam J Heincer
*Assistant Examiner* — Nicholas Hill
(74) *Attorney, Agent, or Firm* — Whitham, Curtis & Cook, P.C.

(57) ABSTRACT

Provided are methods for aqueous isolation of depolymerized lignin in high yield from a lignin-containing biomass composition, comprising positioning a lignin-containing biomass composition into a flowthrough thermal reactor chamber to provide for passage of an aqueous fluid therethrough, contacting the lignin biomass composition with the aqueous fluid under elevated temperature conditions sufficient to provide for lignin release and depolymerization, flowing the aqueous fluid through the reactor chamber under the elevated temperature conditions, to provide an output aqueous fluid comprising released depolymerized lignin,
(Continued)

and collecting the depolymerized lignin. Particular aspects further comprise hydrogenation and/or hydrodeoxygenation (HDO) of the released depolymerized lignin with a catalyst or catalyst system for deconstruction of the released depolymerized lignin into lower molecular weight reactive lignin moieties and oligomers amenable for subsequent removal of oxygen to produce hydrocarbon fuels and/or chemicals and/or compounds. Systems for practicing the methods are also provided, along with highly purified depolymerized lignin.

21 Claims, 30 Drawing Sheets

(51) Int. Cl.
  *C08H 8/00* (2010.01)
  *C08L 97/00* (2006.01)
  *B01J 19/24* (2006.01)
  *C10G 1/00* (2006.01)
  *C10G 3/00* (2006.01)

(52) U.S. Cl.
  CPC .............. *C08H 8/00* (2013.01); *C08L 97/005* (2013.01); *C10G 1/002* (2013.01); *C10G 3/50* (2013.01); *B01J 2219/24* (2013.01); *C10G 2300/1014* (2013.01); *C10G 2400/02* (2013.01); *C10G 2400/04* (2013.01); *C10G 2400/08* (2013.01); *Y02P 30/20* (2015.11)

(56) References Cited

U.S. PATENT DOCUMENTS

| | | |
|---|---|---|
| 7,973,086 B1 | 7/2011 | Saxton et al. |
| 2008/0103344 A1 | 5/2008 | Jones et al. |
| 2009/0069550 A1 | 3/2009 | Belanger et al. |
| 2010/0136642 A1 | 6/2010 | Belanger et al. |
| 2011/0257448 A1 | 10/2011 | Cortright et al. |

OTHER PUBLICATIONS

Yang, B., et al., "Effect of Xylan and Lignin Removal by Batch and Flowthrough Pretreatment on the Enzymatic Digestibility of Corn Stover Cellulose," Biotech. Bioeng., 2004, 86, 88-95.*

Yan, L., et al., "Dilute sulfuric acid cycle spray flow-through pretreatment of corn stover for enhancement of sugar recovery," Bioresource Technology, 2009, 100, 1803-1808.*

Pandey, M. P., et al., "Lignin Depolymerization and Conversion: A Review of Thermochemical Methods," Chem. Eng. Technol. 2011, 34, 29-41.*

Stoye, D. "Solvents," Ullmann's Encyclopedia of Industrial Chemistry, vol. 33, 619-688, 2000.*

Showcase for Undergradute Research and Creative Activities, Washington State University, Mar. 30, 2012. [Retrieved on Sep. 9, 2013]. Retrieved from the internet: <URL:http://universitycollege.wsu.edu/units/undergraduateresearch/SURCA/docsart/SURCAAbstractBooklet2012FINAL.pdf>. p. 121, Abstract.

Sluiter et al., "Determination of Structural Biomass Carbohydrates and Lignin in Biomass," Laboratory Analytical Procedure (LAP). 18 pages. Issued Apr. 2008 and revised Aug. 2012. Retrieved from <http://web.archive.org/web/20150910203314/http://www.nrel.gov/docs/gen/fy13/42618.pdf>.

* cited by examiner

APPARATUS AND PROCESS FOR PREPARING REACTIVE LIGNIN WITH HIGH YIELD FROM PLANT BIOMASS FOR PRODUCTION OF FUELS AND CHEMICALS

CROSS-REFERENCE TO RELATED APPLICATIONS

This application is the United States national phase, under 35 U.S.C. §371, of International Patent Application No. PCT/US2013/038927, filed 30 Apr. 2013 and entitled "APPARATUS AND PROCESS FOR PREPARING REACTIVE LIGNIN WITH HIGH YIELD FROM PLANT BIOMASS FOR PRODUCTION OF FUELS AND CHEMICALS", which claims the benefit of priority to U.S. Provisional Patent Application Ser. No. 61/640,502, filed 30 Apr. 2012 and entitled "JET FUEL PRODUCTION FROM BIOMASS-DERIVED LIGNIN", both of which are incorporated herein by reference in their entirety.

FEDERAL-FUNDING ACKNOWLEDGEMENT

Aspects of the invention were funded at least in part by DARPA Young Faculty Award # N66001-11-1-4141/P00001, and the United States government, therefore, has certain rights in the invention.

FIELD OF THE INVENTION

Aspects of the invention relate generally to preparing reactive lignin for use in producing fuels and other chemicals and compounds, and more particularly to high yield methods comprising use of aqueous catalytic processing (e.g., hydrothermal flowthrough conditions), depolymerization (e.g., selective hydrolysis of hemicellulose and lignin cross-linkages for maximal removal of lignin) and hydrodeoxygenation (HDO) for deconstruction of the complex lignin polymeric framework from plant biomass into low molecular weight reactive lignin moieties and oligomers, amenable for subsequent removal of oxygen to produce hydrocarbon fuels and/or chemicals and compounds.

BACKGROUND

Lignin.

Lignin is a natural amorphous polymer that acts as the essential glue that gives plants their structural integrity. It is a main constituent of lignocellulosic biomass (15-30% by weight, 40% by energy), together with cellulose and hemicelluloses. However, lignin has received little attention relative to cellulose in terms of R&D efforts to biofuel production. In 2004, the pulp and paper industry alone produced 50 million tons of extracted lignin, yet the existing markets for lignin products remain limited and focus on low value products such as dispersing or binding agents. As a result, only approximately 2% of the lignin available from the pulp and paper industry is used commercially with the remainder burned as a low value fuel. Even more lignin waste will be anticipated when large-scale cellulosic production is commercialized.

Unrealized Potential.

The potential and value of lignin as a biomass source for the sustainable production of the nation's high quality liquid fuel requirements, for example, and/or bulk chemicals is undervalued because of current technology and process limitation. The utilization of waste lignin as a feedstock for conversions to hydrocarbons offers a significant opportunity for enhancing the overall operational efficiency, carbon conversion rate, economic viability, and sustainability of biofuels production. Due to its availability, low O/C ratio, and markedly low total oxygen content compared to biomass-derived carbohydrates (~36% versus ~50%, respectively), lignin is a promising feedstock for production of renewable hydrocarbon fuels and chemicals. Lignin's native molecular structure is, however, approximately C800-900 which is far higher than the carbon chain lengths required for fuel applications (~C6-20).

Therefore, lignin must be depolymerized, its H/C ratio needs to be increased, and its O/C ratio must be further decreased.

Limitations of the Lignin Process Art.

Previous attempts to decrease the degree of polymerization and/or the oxygen content of biomass have involved various transformations, including hydrothermal decarboxylation, acid-catalyzed dehydration, metal-catalyzed decarboxylation, pyrolysis, carbonization, and metal-catalyzed hydrogenation. However, there are few commercially viable conversion processes available for converting lignin to fuel-derived products. Pyrolysis, for example, can convert lignin in whole biomass to hydrocarbons, but results with poor selectivity (and as a component of whole biomass).

Traditionally, milled wood lignin (MWL) has been used as a representative source for isolating native lignin. The isolation procedure for MWL involves the production of wood meal by Wiley milling of the wood, followed by vibratory or rotary ball milling, and subsequent extraction with doxane-water. The yield of MWL varies depending on the extent of milling, ranging from 25% to 50%. However, severe chemical modification of the lignin occurs. In fact, increases in carbonyl and phenolic hydroxyl content, as well as decreases in molecular weight and cleavage of aryl ether linkages, have been reported as a result of the MWL isolation procedure. Moreover, MWL is not representative of the whole lignin in wood, but primarily originates in the secondary wall of the cell, with differences in extraction rate after ball milling due to inherent differences in the chemistry of lignin in the middle lamella and the secondary wall being responsible.

To date, virtually no approach has proven successful for converting the lignin that results from biochemical bioprocessing into hydrocarbon liquids or chemicals. Particularly, in this regard, the deconstruction of the complex lignin polymeric framework into low molecular weight reactive moieties amenable for subsequent removal of oxygen to produce hydrocarbons fuels and chemicals has proven to be challenging.

SUMMARY OF ASPECTS OF THE INVENTION

Aspects of the invention disclose and validate effective, efficient, and economic conversion technologies to meet the potential of using lignocellulosic feedstocks for the production, for example, of lignin-derived sustainable alternative fuels.

In broad terms, this disclosure describes: selectively producing soluble lignin polymers from lignocellulosic biomass to provide an understanding of the reaction chemistry of delignification of lignocellulosic biomass; designing catalysts that convert soluble lignin to hydrocarbons (cyclohexanol/cyclohexanone and/or alkanes) with high yield; providing an improved understanding of lignin chemical properties, such as solubility, molecular weight, and monolignol composition in the deploymerization reactions that lead to hydrocarbons via hydrodeoxygenation (HDO) process with high yield; and providing an understanding of the reaction chemistry and kinetics of lignin depolymerization and hydrodeoxygenation.

Particular aspects demonstrate a processing scheme for deploymerization and hydrodeoxygenation of aqueous-phase processing of lignin to, for example, jet fuel. An aqueous catalytic processing of depolymerized lignin into low molecular weight oligomers, then to cyclohexanol/cyclohexanone, and further to alkanes through a series of hydrotreating reactions has been established. Lignin polymer from biomass was deploymerized via hydrothermal pretreatment with or without additives (e.g., without dilute acid) followed by selective hydrolysis of the C—O—C bond. The reactive intermediates generated were further hydrogenated to destroy the aromaticity of phenyl rings and concomitantly undergo HDO of the C—O bonds, thereby transforming lignin to $C_9$ and $C_{14}$-$C_{18}$ alkanes and methanol.

Particular aspects provide methods for enhanced lignin recovery of approximately 90% (e.g., at least 70%, at least 80%, at least 85%, at least 88%, at least 89%, at least 91%, at least 92%, at least 93%, at least 94%, at least 95%), in aqueous phase. In certain embodiments, lignin fractions of >90% purity were isolated under improved hydrothermal pretreatment conditions.

Particular aspects provide methods for obtaining high yields of biofuels and chemicals from inexpensive lignin.

Particular aspects provide methods for generating jet fuel-range hydrocarbon derivatives (aromatic/aliphatic) from both low and high molecular weight lignin under HDO conditions.

Particular aspects provide methods for achieving about 38% to about 45% yields of lignin conversion, with excellent selectivity of HDO aromatic hydrocarbon products (90% 98%).

According to particular aspects, the molecular weight and reactivity of flowthrough lignin were determined as key factors for catalyst selection for HDO of lignin in presence of hydrogen.

Particular aspects provide catalysts that were successfully designed and found to be selective, active and stable for use in the disclosed methods.

Particular aspects provide a catalyst system for production of both aromatics (e.g. 5% Pt/C— Zeolyst) and aliphatic hydrocarbons (e.g. 5% Ru/C— Zeolyst) from biomass-derived lignin.

Particular aspects provide a Simultaneous Depolymerization and Hydrodeoxygenation (SDeHDO) system for conversion of biomass-derived lignin to, for example, jet fuel range hydrocarbons.

Particular aspects provide methods for aqueous isolation of depolymerized lignin in high yield from a lignin-containing biomass composition, comprising: positioning a lignin-containing biomass composition into a flowthrough thermal reactor chamber comprising an input opening and an output opening configured to provide for passage of an aqueous fluid through the reactor chamber, the input opening in communication with a source of aqueous fluid; contacting the lignin biomass composition in the thermal reactor with the aqueous fluid, under elevated temperature conditions sufficient to provide for lignin release and depolymerization, by flowing the aqueous fluid through the reactor chamber under the elevated temperature conditions, to provide an output aqueous fluid comprising released depolymerized lignin; and collecting, from the output opening, the output aqueous fluid comprising the depolymerized lignin, wherein a method for aqueous isolation of depolymerized lignin in high yield from a lignin-containing biomass composition is provided. In certain aspects, contacting the lignin biomass composition under elevated temperature conditions comprises contacting at temperature greater than about 200° C., or a temperature in the range of from 200° C. to 300° C., or in the range of from 220° C. to 260° C., or in the range of from 220° C. to 240° C. In particular aspects, at least 70%, at least 75%, at least 80%, at least 85%, at least 90%, at least 93%, or at least 95% of the original lignin in the lignin-containing biomass composition is collected in the output aqueous fluid comprising the depolymerized lignin. In certain embodiments, collecting the output aqueous fluid under the flowthrough conditions results in dilution of the released, depolymerized lignin. In certain aspects, the flowthrough elevated temperature conditions are sufficient to reduce or eliminate counterproductive recondensation/re-polymerization of the released depolymerized lignin, relative to non-flowthrough or batch conditions/methods. In certain aspects, the depolymerized lignin comprises at least one selected from the group consisting of soluble depolymerized lignin, oligomeric lignin, and insoluble depolymerized lignin comprising native lignin structure. In particular embodiments, the syringyl (S)/guaiacyl (G) ratio of the depolymerized lignin is decreased relative to the original lignin in the lignin-containing biomass composition. In certain aspects of the methods, contacting the lignin biomass composition by passing the aqueous fluid through the reactor chamber under the elevated temperature conditions, comprises passing the aqueous fluid through the reactor chamber in three different time zones, comprising a heating zone, a reaction zone at elevated temperature, and a cooling zone, wherein the heating and the cooling zone may optionally occur inside or outside the thermal reactor. In particular embodiments, the flowthrough thermal reactor chamber comprising the lignin-containing biomass composition is purged using an inert gas prior to contacting the lignin biomass composition in the thermal reactor with the aqueous fluid, preferably wherein the gas is selected from the group consisting of hydrogen, helium or nitrogen. In certain aspects, the aqueous fluid is acidic, or comprises an acid, or an added acid (e.g., wherein the acid comprises $H_2SO_4$ at a concentration in the range of 0.01% to 2%, preferably at least 0.05% $H_2SO_4$).

Certain aspects of the methods further comprise contacting the released depolymerized lignin with a catalyst or catalyst system in a hydrogenation and/or hydrodeoxygenation (HDO) reactor chamber to provide for hydrogenation and/or hydrodeoxygenation (HDO) for deconstruction of the released depolymerized lignin into lower molecular weight reactive lignin moieties and oligomers amenable for subsequent removal of oxygen to produce hydrocarbon fuels and/or chemicals and/or compounds. In particular aspects, the catalyst or catalyst system comprises a combination of one or more noble metal catalysts, with one or more solid supports, in the presence of one or a series of solid acids, to provide for hydrogenation and/or HDO. In particular embodiments, the one or more noble metal catalysts comprises at least one selected from the group consisting of Pt, Pd, Ru, and Rh, wherein the one or more solid support comprises at least one selected from the group consisting $Al_2O_3$, C, $ZrO_2$, and $TiO_2$, and wherein the one or more solid acids comprises at least one selected from the group consisting of solid acid zeolites ZEOLYST CBV 8014 CY 1.6, NH4+ Z—Y 57277-14-1, and FCC (La—Y).

In certain aspects of the methods, contacting the released depolymerized lignin with a catalyst or catalyst system in the hydrogenation and/or hydrodeoxygenation (HDO) reactor chamber to provide for hydrogenation and/or hydrodeoxygenation (HDO) occurs after the released depolymerized lignin exits the flowthrough thermal reactor, preferably in a subsequent hydrogenation and/or hydrodeoxygenation (HDO) reactor chamber in communication with the flowthrough thermal reactor.

In certain aspects of the methods, contacting the released depolymerized lignin with a catalyst or catalyst system in the hydrogenation and/or hydrodeoxygenation (HDO) reactor chamber to provide for hydrogenation and/or hydrodeoxygenation (HDO) occurs within the flowthrough thermal reactor to provide for a simultaneous solubilization, depolymerization, and HDO process comprising integration of depolymerized lignin production with HDO in a single reactor.

In particular aspects of the methods, the hydrogenation and/or hydrodeoxygenation (HDO) reactor chamber is purged using an inert gas, preferably wherein the gas is selected from the group consisting of hydrogen, helium or nitrogen, prior to hydrogenation and/or hydrodeoxygenation.

Additional aspects provide an aqueous-based system for depolymerizing lignin in high yield from a lignin-containing biomass composition, comprising: an aqueous flowthrough thermal reactor chamber comprising an input opening and an output opening configured to provide for passage of an aqueous fluid through the reactor chamber, the input opening in communication with a source of aqueous fluid, the reactor configured for positioning a lignin-containing biomass composition therein to provide for contact with an aqueous fluid flowing therethrough, the input configured to provide for communication with an aqueous fluid source, and with a pressure source suitable to provide for flowing an aqueous fluid through the flowthrough thermal reactor; and a source of heat suitable to provide for an aqueous fluid at a raised temperature within the aqueous flowthrough thermal reactor. Particular system aspects comprise a hydrogenation and/or hydrodeoxygenation (HDO) reactor chamber comprising a catalyst or catalyst system. In certain aspects, the catalyst or catalyst system comprises a combination of one or more noble metal catalysts, with one or more solid supports, in the presence of one or a series of solid acids, to provide for hydrogenation and/or HDO; preferably wherein the one or more noble metal catalysts comprises at least one selected from the group consisting of Pt, Pd, Ru, and Rh, wherein the one or more solid support comprises at least one selected from the group consisting $Al_2O_3$, C, $ZrO_2$, and $TiO_2$, and wherein the one or more solid acids comprises at least one selected from the group consisting of solid acid zeolites ZEOLYST CBV 8014 CY 1.6, NH14+ Z—Y 57277-14-1, and FCC (La—Y). In particular system aspects, the hydrogenation and/or hydrodeoxygenation (HDO) reactor chamber is integrated with the aqueous flowthrough thermal reactor chamber, or is distinct from the aqueous flowthrough thermal reactor chamber.

Further aspects provide a highly-purified soluble or insoluble depolymerized lignin composition, or a fuel comprising at least 20%, at least 30%, at least 40%, at least 50%, at least 60%, at least 70%, at least 80%, or at least 90% aliphatic and/or aromatic hydrocarbons in the C7-C18 range, or a chemical compound or composition prepared by the method of any one of claims 1-17.

DETAILED DESCRIPTION OF ASPECT OF THE INVENTION

Figure 1:
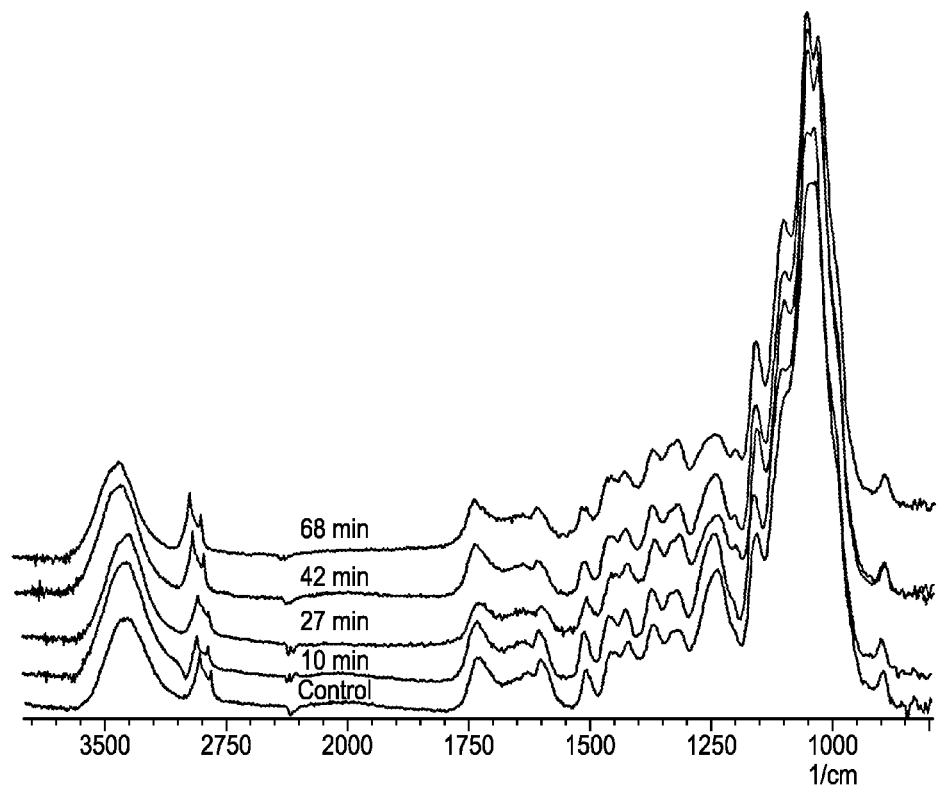
FIG. 1 shows, according to particular aspects, Fourier transform infrared spectroscopy analysis of biomass prior and after water-only flowthrough pretreatment. FTIR spectrum of untreated (bottom, control) and water-only flowthrough pretreated residual solid Miscanthus samples with increasing pretreatment time.

Particular aspects disclose and describe a novel aqueous catalytic processing of biomass-derived lignin into low molecular weight oligomers then to aromatic chemicals and/or hydrocarbon fuels through a series of hydrotreating reactions. Particular aspects disclose and demonstrate/validate processing schemes for deploymerization and hydrodeoxygenation (HDO) of aqueous-phase processing of lignin from biomass to liquid fuel and bulk chemicals.

In certain aspects, strategies for producing chemicals and hydrocarbons fuels from lignin include:
  (i) depolymerization of the complex lignin structure to highly-reactive low molecular weight intermediates via selective C—O—C and C—C bond cleavages;
  (ii) reduction (e.g., substantial reduction) of oxygen content from the lignin intermediates (LI) via catalytic HDO reactions; and
  (iii) optimizing the catalyst systems for high HDO yields for production of aromatics and/or aliphatic hydrocarbons.

Particular aspects provide an advanced flowthrough system for maximizing the selective depolymerization and isolation of lignin fraction from plant biomass (e.g., poplar and switchgrass). In this context, water-only flowthrough pretreatment under various time and temperature conditions (with or without additives) was demonstrated for achieving selective hydrolysis of hemicellulose and lignin cross-linkages for maximal removal of lignin.

According to particular aspects, lignin fragments were swept out of the flow reactor under such flowthrough conditions, restricting the counterproductive condensation/re-polymerization behavior of lignin. This resulted in effective lignin release, and allowed subsequent recovery of representative low molecular weight oligomeric lignin (e.g., 350 Da to 3500 Da) in high yields (e.g., over 90%) (e.g., 85% to 95%) (e.g., at least 70%, at least 80%, at least 85%, at least 88%, at least 89%, at least 91%, at least 92%, at least 93%, at least 94%, at least 95%),) from the aqueous stream of the flowthrough reactor. The reaction chemistry and the mechanism of depolymerization of lignin under the optimized hydrothermal flowthrough conditions for competent recovery of native lignin (e.g., ranging from 75% to 90%) (e.g., at least 70%, at least 75%, at least 80%, at least 85%, at least 88%, at least 89%, at least 90%) were also established.

In additional aspects, applicants were successful in catalytic hydrogenation of the recovered low molecular weight lignin, which was concomitantly made susceptible to HDO of the C—O bonds, thereby transforming lignin to cyclohexane derivatives (hydrocarbon fuels) and aromatics (bulk chemicals).

In certain aspects, combinations of one or more noble metal catalysts, such as Pt, Pd, Ru, and Rh, etc., for example, with one or more solid supports (e.g., $Al_2O_3$, C, $ZrO_2$, and $TiO_2$), in the presence of one or a series of solid acids were tested for hydrogenation/HDO of lignin compounds. In particular embodiments, for example, under the tested conditions for noble metal catalyst, Ru over carbon (3% and 5% wt, respectively) in presence of solid acid zeolites ZEOLYST CBV 8014 CY 1.6 and NH4+ Z—Y 57277-14-1 catalyst was found to be very favorable for hydrogenation and subsequent HDO of lignin compounds (30%~35% conversion yield) towards formation of cyclohexane derivatives (hydrocarbon fuels) with 30%~40% product selectivity. Additionally, for example, a 35%~60% conversion yield of lignin with 90%~95% product selectivity for aromatics (toluene) under various HDO conditions in the presence of 5% Pt/C—, Rh/C— (or Ru/$Al_2O_3$)-Zeolyst (e.g., NH4+ Z—Y 57277-14-1) catalyst matrix was achieved.

Example 1

Corn Stover Lignin was Solubilized and Recovered in High Yield Using Aqueous Phase Depolymerization Using a Flowthrough Reactor Overview.

This example describes an inventive flowthrough treatment that removed a much larger fraction of original lignin than ever reported in the prior art using batch process methods. According to particular aspects, the surprising and superior results are explained by the flow of hot water to remove the lignin as well as the hemicellulose during the reaction, and acid released into the hot water also enhanced their removal. In prior art batch reactions, addition of minute amount of acid (for example 0.05% $H_2SO_4$) further accelerated the lignin reactions to insoluble compounds, whereas in the inventive flowthrough reactions, the dissolved or suspended lignin was swept from the reactor before it significantly reacts and precipitates with acid, resulting in substantially more lignin removal.

Materials and Methods

Flow Reactors.

The flow systems employed in this work were ½-inch (I.D.)×6-inch (length) having an internal volume of 14.3 ml. The units were constructed of 316-stainless steel materials. Stainless steel tubing (316) was used as preheating coil (¼-inch (O.D.)×0.035-inch (Inside wall) and to connect the reactor with other system components as well the cooling coil (⅛-inch (O.D.)×0.028-inch (Inside wall). The preheating coil is long enough to allow the incoming water to reach the desired temperature before it entered the reactor. A high pressure pump with a flow rate range of 0 to 40 ml/min, a pressure gauge, and a back-pressure regulator were used to control flow through the system.

Operations.

To operate the flowthrough system, about 1 gm. of corn stover (leaves and stalks of maize (*Zea mays* ssp. *mays* L.) plants left in a field after harvest and consists of the residue: stalk; the leaf, husk, and cob remaining in the field following the harvest of cereal grain) was loaded into the reactor, which was then connected to the system. Distilled water at room termperature was pumped through the reactor to purge air and then used to pressurize the reactor to a set pressure 350 to 400 PSIG.

Reaction Conditions.

The flow rate of 10 ml/min was applied in this reaction. The reaction temperature and time is 10, 60, 240 for 160° C.; 5, 35 and 60 min for 180° C.; 5, 15, 30 ml for 200° C.; 5, 15, 30 min for 220° C., separately.

Results

Over 90% of the lignin was recovered in the aqueous phase, and the low molecular weight (MW 400-2000) insoluble lignin is 97% pure.

According to additional aspects, the plant biomass is steam pretreated (e.g., in either batch and/or continuous manner) at, for example, a temperature of 140° C. to 240° C., using a reaction time of, for example, 5 min to 60 min, resulting in separating one of more soluble lignin to yield substantially pure lignin, which may optionally be further processed by HDO to hydrocarbons.

Example 2

Soluble and Insoluble Lignin from Miscanthus, Switchgrass and Poplar Lignin was Isolated and Recovered in High Yield Using Aqueous Phase Depolymerization Using a Flowthrough Reactor Overview.

This Example describes lignin solubilization and recovery using the inventive Aqueous Phase Depolymerization; isolation of soluble and insoluble lignin from Miscanthus, Switchgrass and Poplar.

Materials and Methods

Miscanthus and Switchgrass Samples.

Loading: 1 g Miscanthus and Switchgrass;

Flow rate: 10 ml/min distilled water;

Pressure & temperature: 100 psi at 160° C. and 155 psi at 180° C.;

Time: 10, 27 and 60 min for 160° C. and 7, 35 and 56 min for 180° C.

Poplar Samples (at Log $R_0$ ~5)

Loading: 1 g Poplar sieves;

Flow rate: 10 ml/min distilled water;

Temperature & time: A severity parameter was used at different combinations of temperature and time under water-only flowthrough conditions for efficient solubilization and depolymerization of native lignin. The severity parameter for water-only hydrolysis is defined as:

$$R_0 = t \cdot \exp[(T-100)/14.75] \qquad (1)$$

Where, t is reaction time (minutes), and T is the hydrolysis temperature (degrees Celsius) in equation (1). Applicants' work Miscanthus and corn stover revealed that lignin removal (solubilization and depolymerization) in aqueous phase under water only flowthrough conditions correlated well with Log $R_0$, reaching about 85% lignin removed at Log $R_0$=4.8. Thus, solubilization and depolymerization of lignin for poplar samples over a range of Log $R_0$=4~5 under flowthrough conditions were carried out, as depicted in Table 1.

TABLE 1

Severity parameter for water-only flowthrough pretreatment of poplar at 180°~240° C.

| Temperature (degrees Celsius) | Time (Minutes) | $LogR_0$ |
|---|---|---|
| 180° C. | 45 | 4.00 |
| 200° C. | 10 | 3.95 |
| 200° C. | 25 | 4.34 |
| 220° C. | 25 | 4.93 |
| 240° C. | 8 | 5.03 |

Pressure: 155 psi at 180° C., 225 psi at 200° C., and 340 psi at 220° C.

Results

Fourier Transform Infrared Spectrophotometry.

Surface chemical analysis was conducted to determine changes of functional groups by aqueous phase depolymerization (APD) of biomass using a SHIMADZU IRPrestige-21™ Fourier transform infrared Spectrophotometer (Shimadzu Corp., Japan). Spectra were obtained using the triangular apodization in resolution of 4 cm$^{-1}$ with thirty-two scans for each sample from 4000 to 800 cm$^{-1}$.

FIG. 1 shows, according to particular aspects, Fourier transform infrared spectroscopy analysis of biomass prior and after water-only flowthrough pretreatment. FTIR spectrum of untreated (bottom, control) and water-only flowthrough pretreated residual solid Miscanthus samples with increasing pretreatment time.

The FTIR analysis described the mode of deligninfication process under water-only flowthrough pretreatment conditions. These results provided the foundation and/or basis for further improving the performance of water-only pretreatment of biomass for maximizing the delignification and depolymerization process. In this regard, the FTIR spectrum indicated the gradient effects of water-only flowthrough pretreatment on functional groups of biomass (FIG. 1). Compared to untreated sample (control), water-only flowthrough pretreatment resulted in significant changes in the region 1800-800 cm$^{-1}$. The peaks around 1040 cm$^{-1}$, 1060 cm$^{-1}$ and 1120 cm$^{-1}$ have been assigned to C—O stretch and C—C vibration on cellulose. The enhancement of intensity on these peaks after water-only flowthrough pretreatment may be the result of exposure of cellulose, and intermolecular hydrogen bonds breakup. Correspondingly, the intensity disappearance at 1740 cm$^{-1}$ revealed deconstruction of hemicellulose. These results are further supported by chemical composition analysis (previously established). Moreover, significant changes were also observed in lignin regions. The signal changes at band 1250 cm$^{-1}$, 1330 cm$^{-1}$ and 1500 cm$^{-1}$ represented the modification and/or degradation on lignin moiety which were assigned to guaiacyl (G), syringyl (S) and aromatic skeletal vibration, respectively. The reduction at 1250 cm$^{-1}$ and expansion at 1330 cm$^{-1}$ suggested condensation of G unit lignin. Through FTIR analysis, water-only flowthrough pretreatment was shown to result in significant modification and/or degradation on three major chemical components: cellulose, hemicellulose and lignin. The removal of lignin and hemicellulose pointedly improved the exposure of cellulose. However, due to the complexity of lignocellulosic biomass, the vibrations of functional groups could not accurately reveal chemical composition changes which needed to be further verified.

Pyrolysis GC-MS (Py-GC-MS) of Residual Lignin Prior and after Water-Only Flowthrough Pretreatment.

Analytical pyrolysis was next carried out to observe the chemical components and deduce the selectivity in release of lignin sub-units (H, G and S) during water-only flowthrough pretreatment. Py-GC/MS was carried out using a CDS pyroprobe 5000™ connected in-line to an Agilent GC/MS. Both control (raw biomass) and pretreated Miscanthus samples were loaded into a quartz tube and gently packed with quartz wool prior to pyrolysis. The samples were kept briefly in the oven (200° C.) to ensure adequate removal of oxygen prior to pyrolysis and were pyrolyzed by heating nearly instantaneously to 610° C. for 1.0 min. The inlet temperature was maintained at 250° C. The resulting pyrolysis vapors were separated by means of a 30 m×0.25 µm inner diameter (5%-phenyl)-methylpolysiloxane non-polar column, with a split ratio of 50:1. The gas flow rate was 1 ml/min. Linear heating (3° C./min) from 40-280° C. was designated for the oven program, and to ensure that no residuals were retained, the oven was held at 280° C. for 10 minutes. The gas was then sent into a mass spectrometer (Agilent Technologies Inert XL MSD™) to analyze. Carbon dioxide was used as an internal standard. The abundance area (%) of each lignin related compound was referenced against the area (%) of internal standard in each sample.

Figure 2:
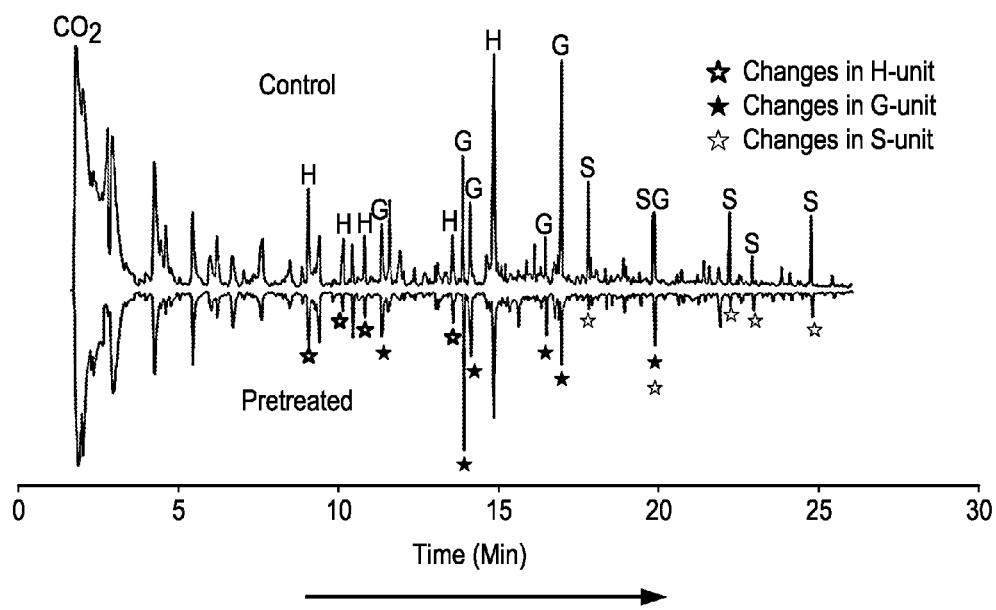
FIG. 2 shows, according to particular aspects, distribution of H, G and S units of untreated (control) and water-only flowthrough pretreatment pretreated residual solid Miscanthus biomass determined by pyrolysis GC/MS; changes in G-unit (dark stars), changes in H-unit (medium stars), and changes in S-unit (light stars).

Our results revealed that reduction in H, G and S lignin of pretreated solid residues progressed along with flowthrough pretreatment time (FIG. 2). FIG. 2 shows, according to particular aspects, distribution of hydroxyphenyl (H), guaiacyl (G) and syringyl (S) phenylpropanoid units of untreated (control) and water-only flowthrough pretreatment pretreated residual solid Miscanthus biomass determined by pyrolysis GC/MS; changes in G-unit (dark stars), changes in H-unit (medium stars), and changes in S-unit (light stars).

Figure 3:
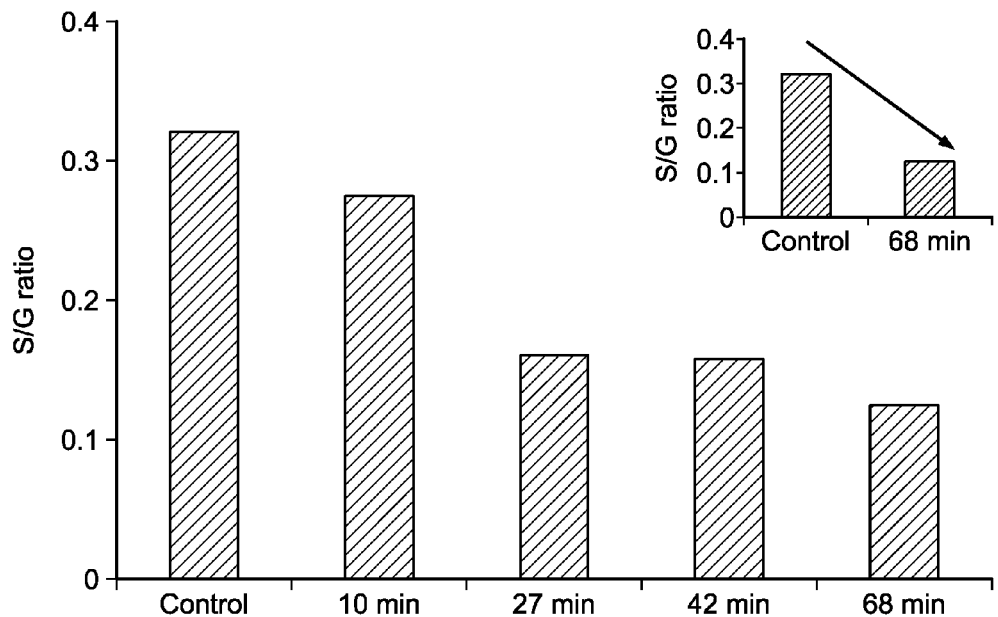
FIG. 3 shows, according to particular aspects, calculation of S/G ratio in untreated (control) and water-only flowthrough pretreatment pretreated residual solid Miscanthus samples. Significant reduction of S/G ratio (>60%) further indicated that the lignin composition of biomass changed with water-only flowthrough pretreatment.

Significant reduction of S/G ratio (>60%) further indicated that the lignin composition of biomass changed with water-only flowthrough pretreatment (FIG. 3). Py-GC/MS was applied to further analyze the lignin composition changes. It was shown that water-only flowthrough pretreatment resulted in different distribution of lignin pyrolytic products compared to untreated sample. The main pyrolyzates derived from hydroxyphenyl (H), guaiacyl (G) and syringyl (S) phenylpropanoid include: phenol; phenol, 2-methyl; phenol, 2-methoxy; phenol, 4-ethyl; naphthalene; phenol, 2-methoxy-4-methyl; benzofuran, 2,3-dihydro; phenol, 4-ethyl-2-methoxy; 2-methoxy-4-vinylphenol; phenol, 2,6-dimethoxy-; 1,2,4-trimethoxybenzene; isoeugenol; 3',5'-dimethoxyacetophenon; phenol, 2,6-dimethoxy-4-[2-propenyl]- and acetosyringone. After correction of main peaks, the H/S/G ratio for each sample was calculated. It is clear that water-only flowthrough pretreatment led to relative reduction of the S unit group. Consequently, the total S/G ratio was changed from 0.32 (control) to 0.28 (10 min), 0.16 (27 min), 0.16 (48 min) and 0.13 (68 min). The preferential removal of S unit rather than G unit is possibly due to the difference of chemical bonding. The occupancy on 3 and 5 positions make S units appear linear arrangement in the lignin matrix with β-O-4 linkage, which is easier to be hydrolyzed. And this bond breakdown would reduce the stability of S unit. This release may result in chain reaction on lignin moiety giving rise to modification on more condensed G units.

In summary: isolation of depolymerized lignin (about 70-75% of original lignin) in aqueous phase was successfully achieved; the reduction in H, G and S lignin of pretreated solid residues progressed along with water-only flowthrough pretreatment time, as established by FTIR and Pyrolysis GC-MS analyses; and significant reduction of S/G ratio (>60%) associated with the change of lignin composition of biomass as achieved through water-only flowthrough reaction.

Example 3

Lignin Removal and Recovery from Poplar, Under Various Severity Parameters for Flowthrough Conditions with or without Additives (e.g. 0.05% $H_2SO_4$), and Determination of Purity of the Recovered Lignin was Achieved Overview.

Figure 4:
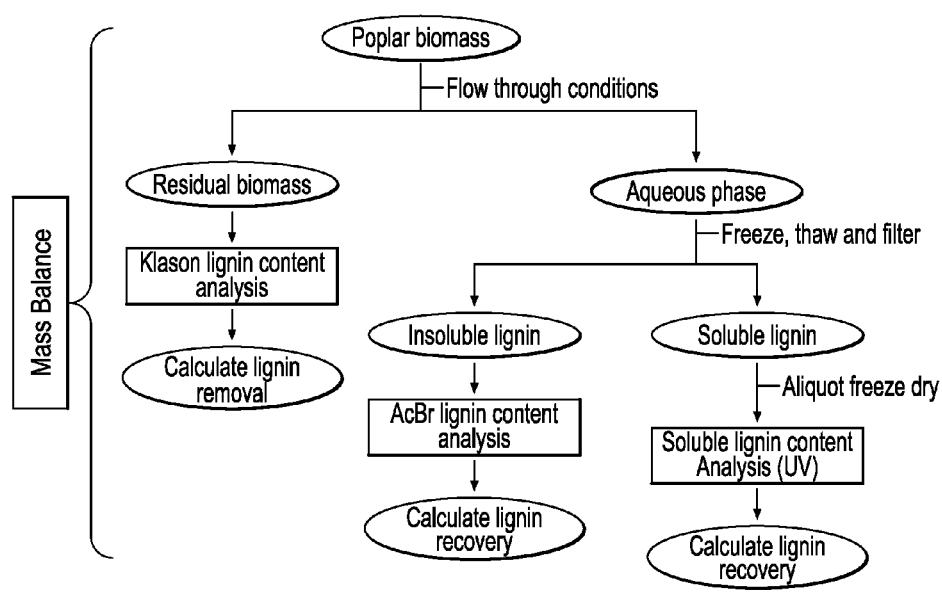
FIG. 4 shows, according to particular aspects, a representative scheme for lignin removal/recovery and analysis from poplar samples.
Figure 5A:
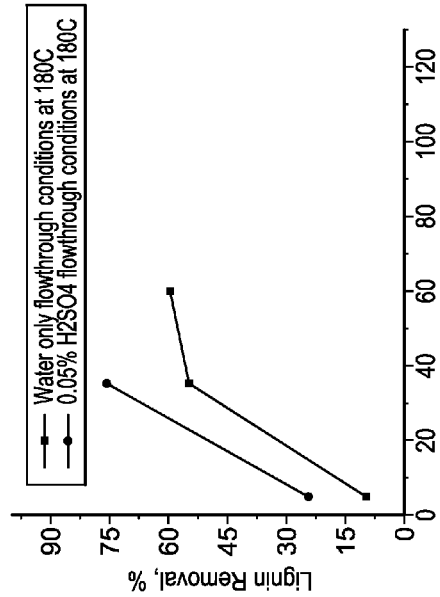
FIG. 5 shows, according to particular aspects, the effect of water-only and 0.05% $H_2SO_4$ flowthrough pretreatment on lignin removal (A) at 160° C., (B) at 180° C., (C) at 200° C. and (D) at 220° C.
Figure 5B:
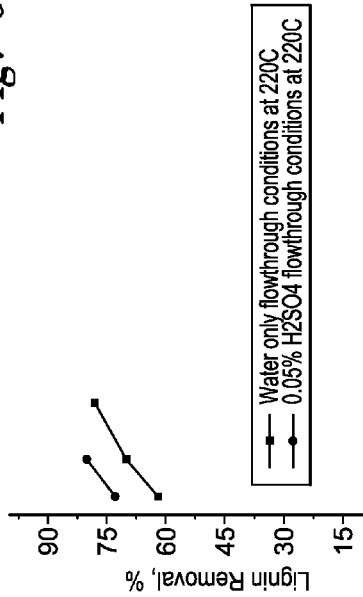
Figure 5C:
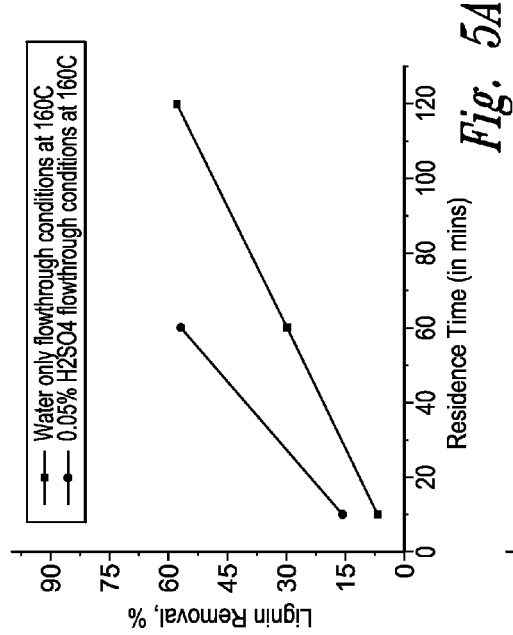
Figure 5D:
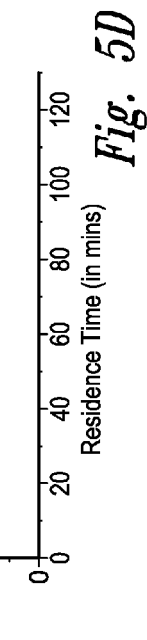

This Example describes data for lignin removal under various severity parameters (Eqn. 1 above) for poplar samples pretreated by flowthrough pretreatment with water-only or with 0.05% $H_2SO_4$, and provides additional insight into how lignins in their native form are recovered in aqueous phase (FIG. 4). FIG. 4 shows, according to particular aspects, a representative scheme for lignin removal/recovery and analysis from poplar samples.

Lignin Recovery; Comparison of Water-Only and 0.05% $H_2SO_4$ Conditions.

Tables 2 and 3 illustrate the different conditions utilized for lignin recovery during flowthrough pretreatment of poplar with water-only and 0.05% $H_2SO_4$ at 25 ml/min flow rate.

TABLE 2

Water-only flowthrough pretreatment conditions for lignin recovery from poplar (25 ml/min flow rate)

| Temperature (degrees Celsius) | Time (Minutes) | $LogR_0$ |
|---|---|---|
| 160° C. | 10 | 2.76 |
| 160° C. | 60 | 3.54 |
| 160° C. | 240 | 4.14 |
| 180° C. | 5 | 3.05 |
| 180° C. | 35 | 3.89 |
| 180° C. | 60 | 4.13 |
| 200° C. | 5 | 3.64 |
| 200° C. | 15 | 4.12 |
| 200° C. | 30 | 4.42 |
| 220° C. | 5 | 4.23 |
| 220° C. | 15 | 4.70 |
| 220° C. | 30 | 5.01 |

TABLE 3

Dilute acid (0.05% $H_2SO_4$) flowthrough pretreatment conditions for lignin recovery from poplar (25 ml/min flow rate)

| Temperature (degrees Celsius) | Time (Minutes) | $LogR_0$ |
|---|---|---|
| 160° C. | 10 | 2.76 |
| 160° C. | 60 | 3.54 |
| 180° C. | 5 | 3.05 |
| 180° C. | 35 | 3.89 |
| 200° C. | 5 | 3.64 |
| 200° C. | 15 | 4.12 |
| 220° C. | 5 | 4.23 |
| 220° C. | 15 | 4.70 |

To determine the effect of severity parameter on lignin removal from poplar biomass, Klason lignin content analysis was carried out on residual poplar samples after flowthrough pretreatment. The acid-insoluble lignin contents of pretreated residual poplar samples were determined using the Klason lignin procedure published as NREL LAP 003. The Klason-lignin content for 300 mg control poplar sample (untreated) was determined as 71.53 mg (23.84% of total biomass) and was used as comparison to establish extent of lignin removal in residual poplar samples.

The calculated K-lignin content (in mg) of residual poplar samples under different severity parameter (time and temperature) for both water-only and 0.05% $H_2SO_4$ at 25 ml/min flow rate, are depicted in Tables 4 and 5, respectively. The results indicate that under the above conditions (Tables 4 and 5), maximal removal of lignin could be achieved at 220° C. for 30 minutes (for water-only) and 200° C. for 15 minutes (for 0.05% $H_2SO_4$). It is evident that under flowthrough conditions for both water-only and 0.05% $H_2SO_4$, a large fraction of the original Klason lignin were removed (FIG. 5). FIG. 5 shows, according to particular aspects, the effect of water-only and 0.05% $H_2SO_4$ flowthrough pretreatment on lignin removal (A) at 160° C., (B) at 180° C., (C) at 200° C. and (D) at 220° C. By comparison, lignin removal (%) for 0.05% $H_2SO_4$ operation was much higher than that with water-only at all temperature range (160° C. to 220° C.). Interestingly, approx. 86% of original lignin was removed under 0.05% $H_2SO_4$ conditions (200° C., 15 mins) as compared to approx. 78% removal under water-only conditions (220° C., 30 mins).

TABLE 4

K-lignin contents of residual poplar samples (in 300 mg) after water-only flowthrough pretreatment (25 ml/min flow rate)

| Temperature (degrees Celsius) | Time (Minutes) | K-lignin (in mg) |
|---|---|---|
| 160° C. | 10 | 66.41 |
| 160° C. | 60 | 49.98 |
| 160° C. | 240 | 29.99 |
| 180° C. | 5 | 64.26 |
| 180° C. | 35 | 32.13 |
| 180° C. | 60 | 28.51 |
| 200° C. | 5 | 39.27 |
| 200° C. | 15 | 32.13 |
| 200° C. | 30 | 23.57 |
| 220° C. | 5 | 27.13 |
| 220° C. | 15 | 21.42 |
| 220° C. | 30 | 15.71 |

TABLE 5

K-lignin contents of residual poplar samples (in 300 mg) after
0.05% $H_2SO_4$ flowthrough pretreatment (25 ml/min flow rate)

| Temperature (degrees Celsius) | Time (Minutes) | K-lignin (in mg) |
|---|---|---|
| 160° C. | 10 | 59.97 |
| 160° C. | 60 | 30.71 |
| 180° C. | 5 | 53.55 |
| 180° C. | 35 | 17.14 |
| 200° C. | 5 | 25.71 |
| 200° C. | 15 | 10.01 |
| 220° C. | 5 | 19.27 |
| 220° C. | 15 | 14.28 |

TABLE 6

Carbohydrate analysis of hydrolysate after water-only
or 0.05% $H_2SO_4$ flowthrough pretreatment under different
severity parameters at 25 ml/min flow rate

| | | | xylose yield (%) | xyloolig-omer yield (%) | Total yield (%) |
|---|---|---|---|---|---|
| Water-only conditions | | | | | |
| 160° C. | 10 min | 25 mL/min | 0 | 0 | 0 |
| 160° C. | 60 min | 25 mL/min | 0 | 25.1175 | 25.1 |
| 160° C. | 240 min | 25 mL/min | 0 | 39.6 | 39.6 |
| 180° C. | 5 min | 25 mL/min | 0 | 9.09 | 9.09 |
| 180° C. | 35 min | 25 mL/min | 0 | 41.4 | 41.4 |
| 180° C. | 60 min | 25 mL/min | 0 | 62.7 | 62.7 |
| 200° C. | 5 min | 25 mL/min | 0 | 21.9925 | 21.99 |
| 200° C. | 15 min | 25 mL/min | 0 | 54.06 | 54.06 |
| 200° C. | 30 min | 25 mL/min | 0 | 87.36 | 87.36 |
| 220° C. | 5 min | 25 mL/min | 0 | 77.0925 | 77.09 |
| 220° C. | 15 min | 25 mL/min | 0 | 85.68 | 85.68 |
| 220° C. | 30 min | 25 mL/min | 0 | 99.96 | 99.96 |
| 0.05% $H_2SO_4$ conditions | | | | | |
| 160° C. | 10 min | 25 mL/min | 0 | 16.2 | 16.2 |
| 160° C. | 60 min | 25 mL/min | 0 | 20.475 | 20.475 |
| 180° C. | 5 min | 25 mL/min | 11.655 | 24.9 | 36.555 |
| 180° C. | 35 min | 25 mL/min | 18.711 | 78.435 | 97.146 |
| 200° C. | 5 min | 25 mL/min | 24.381 | 48.3525 | 72.7335 |
| 200° C. | 15 min | 25 mL/min | 44.325 | 46.5 | 90.825 |
| 220° C. | 5 min | 25 mL/min | 44.415 | 54.1 | 98.515 |
| 220° C. | 15 min | 25 mL/min | 56.11275 | 40.1625 | 96.27525 |

Determination of Purity of Recovered Lignin by Acetyl Bromide (AcBr) Method: Lignin Content Analysis of Insoluble Lignin in the Aqueous Phase.

Figure 6A:
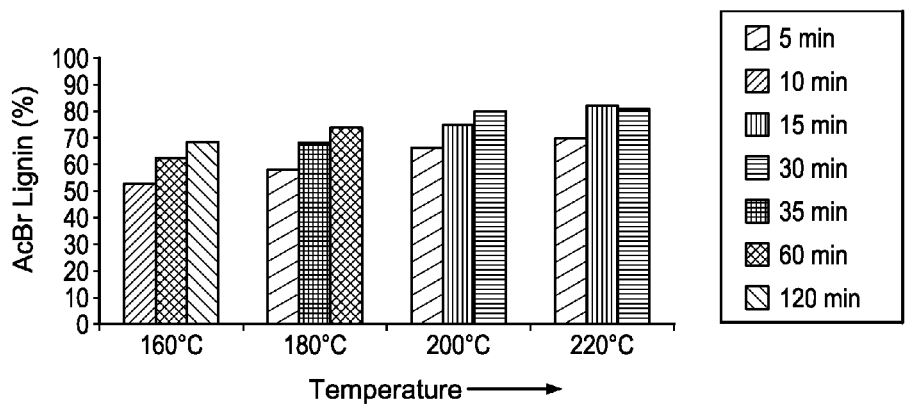
FIG. 6 shows, according to particular aspects, Acetyl Bromide (AcBr) lignin content analysis of insoluble lignin fractions from (A) water-only and (B) 0.05% $H_2SO_4$ flowthrough pretreatment.
Figure 6B:
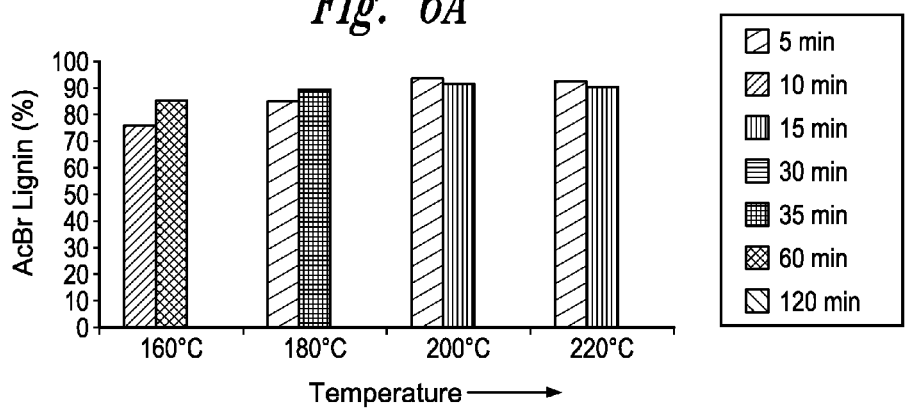

The recovered insoluble lignin in the aqueous phase (hydrolysate) as obtained from filtration of aqueous phase (FIG. 6) were frozen, freeze dried and then subjected to Acetyl bromide analysis (AcBr). FIG. 6 shows, according to particular aspects, Acetyl Bromide (AcBr) lignin content of insoluble lignin fractions from (A) water-only and (B) 0.05% $H_2SO_4$ flowthrough pretreatment. The lignin contents of insoluble lignin samples from aqueous phase of water-only and 0.05% $H_2SO_4$ conditions were estimated in terms of weight percentage of the extractive free dried biomass. The lignin contents were estimated using AcBr extinction coefficients as reported earlier in literature. The AcBr analysis showed that the insoluble lignin fractions isolated from water-only pretreatment at lower temperature range (160° C. and 180° C.) were less pure than that with higher temperature range (200° C. and 220° C.), and the lignin contents thus were determined to be from 50% to 60% and 70% to 80%, respectively (FIG. 6). However, the lignin content of insoluble lignin fraction as obtained from 0.05% $H_2SO_4$ pretreatment were found to be above 80% at almost all temperature and time range, with a maximum purity of lignin at >90% at higher severity parameters (93% for 200° C. at 5 min and 92% for 220° C. at 5 min).

Recovery of Aqueous Phase Insoluble and Soluble Lignin; Comparison of Water-Only and 0.05% $H_2SO_4$ Flowthrough Conditions.

Figure 7A:
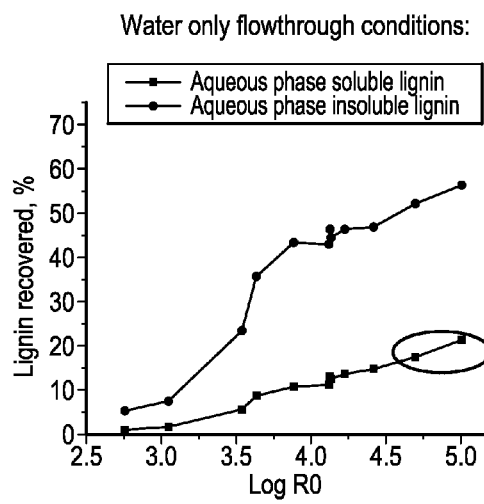
FIG. 7 shows, according to particular aspects, recovery profiles of insoluble and soluble lignin from aqueous phase under (A) water-only and (B) 0.05% $H_2SO_4$ flowthrough conditions.
Figure 7B:
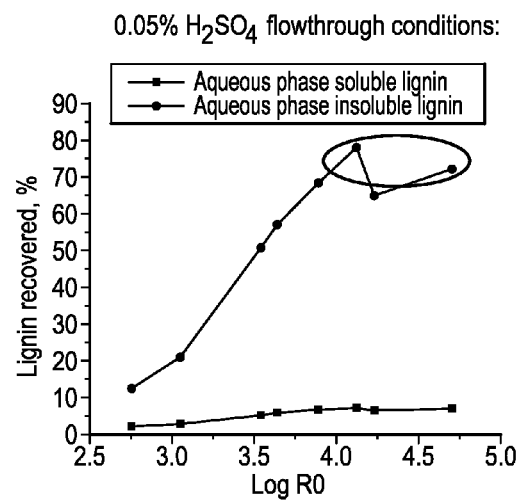

The percentage (%) of insoluble lignin recovered from aqueous phase under both water-only and 0.05% $H_2SO_4$ flowthrough conditions were calculated by combination of the corresponding AcBr values and the amount (weight) of recovered aqueous phase insoluble fraction in comparison to the original lignin content of the untreated biomass (i.e. 23.84% of total biomass). Whereas, the soluble lignin content (%) was determined by UV analysis measuring absorbance at 320 nm (NREL LAP 002, 003, 004, 007, 019 methods). The percentage of recovered lignin at various severity parameters (Log $R_0$) were plotted in FIG. 7. FIG. 7 shows, according to particular aspects, recovery profiles of insoluble and soluble lignin from aqueous phase under (A) water-only and (B) 0.05% $H_2SO_4$ flowthrough conditions. The results indicated that at higher severity parameters with 0.05% $H_2SO_4$, 75~80% of lignin (insoluble form) could be recovered. By comparison, solubilization of 15~20% of native lignin could be achieved at higher severity parameters under water-only conditions.

Figure 8A:
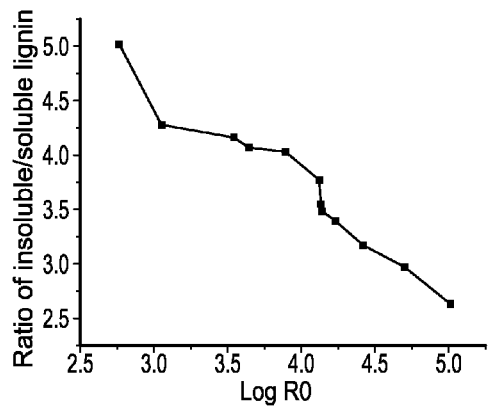
FIG. 8 shows, according to particular aspects, effect of severity parameter on solubilization of lignin (A) water-only flowthrough conditions and (B) 0.05% $H_2SO_4$ flowthrough conditions.
Figure 8B:
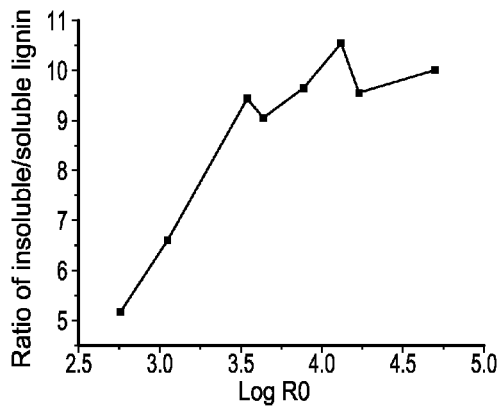

Further to validate the effect of severity parameter on solubilization of lignin, the ratios of recovered amount of insoluble to soluble lignin under water-only and 0.05% $H_2SO_4$ flowthrough conditions were calculated and plotted discretely vs. severity Log $R_0$ (FIG. 8). FIG. 8 shows, according to particular aspects, effect of severity parameter on solubilization of lignin (A) water-only flowthrough conditions and (B) 0.05% $H_2SO_4$ flowthrough conditions. Results indicated that with increase in severity parameters the ratio of insoluble/soluble lignin content decreased for water-only pretreatment, whereas a reverse trend was documented with 0.05% $H_2SO_4$ pretreatment. This indicated that water-only flowthrough conditions led to increased solubilization of lignin (soluble lignin content increases), in comparison with 0.05% $H_2SO_4$ pretreatment at higher severity.

Figure 9A:
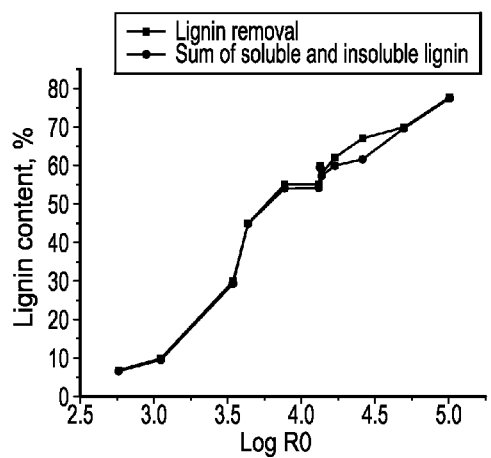
FIG. 9 shows, according to particular aspects, mass balance of lignin recovery with respect to lignin removal with increasing severity parameters under flowthrough conditions: (A) water-only and (B) 0.05% $H_2SO_4$.
Figure 9B:
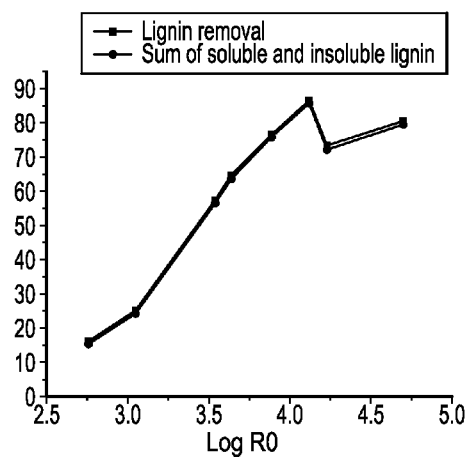

Additionally, mass balance calculations for lignin recovery were carried out for both water-only and 0.05% $H_2SO_4$ flowthrough pretreatment at all severity parameters. The sum amount of insoluble and soluble lignin recovered from aqueous phase correlated well with the lignin removal data (FIG. 9). FIG. 9 shows, according to particular aspects, mass balance of lignin recovery with respect to lignin removal with increasing severity parameters under flowthrough conditions: (A) water-only and (B) 0.05% $H_2SO_4$.

In Summary:

Enhanced lignin removal (both soluble and insoluble) of approximately 86% (previously 70~75%) in aqueous phase was successfully achieved; lignin fractions with over 90% purity were isolated under improved flowthrough conditions; significant recovery (75~80%) of native lignin (insoluble fraction in aqueous phase) could be achieved through flowthrough systems; flowthrough conditions were established for increased solubilization of lignin in aqueous phase; and mass balance of lignin recovery was achieved successfully.

Solution State 1D and 2D NMR Analysis of Depolymerized Lignin.

Figure 10A:
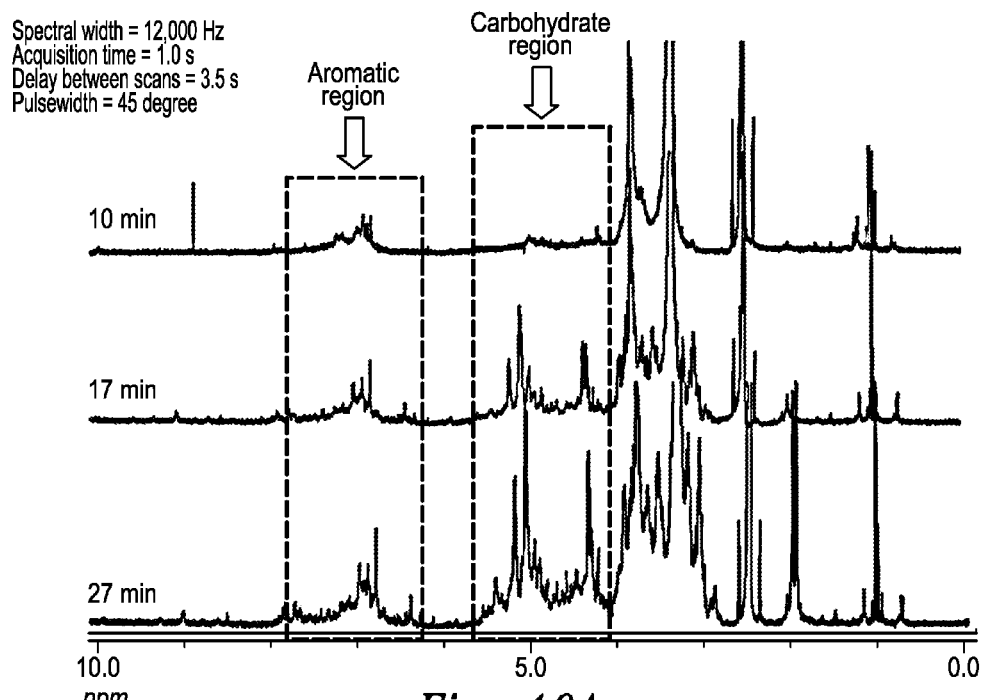
FIGS. 10A and 10B show, according to particular aspects, A) comparison of 1D Proton NMR spectra of hydrolyzates from Miscanthus samples collected at 10, 17 and 27 min, (B) comparison of 1D Proton NMR spectra of hydrolyzates from Miscanthus samples collected at 27, 42 and 68 min.
Figure 10B:
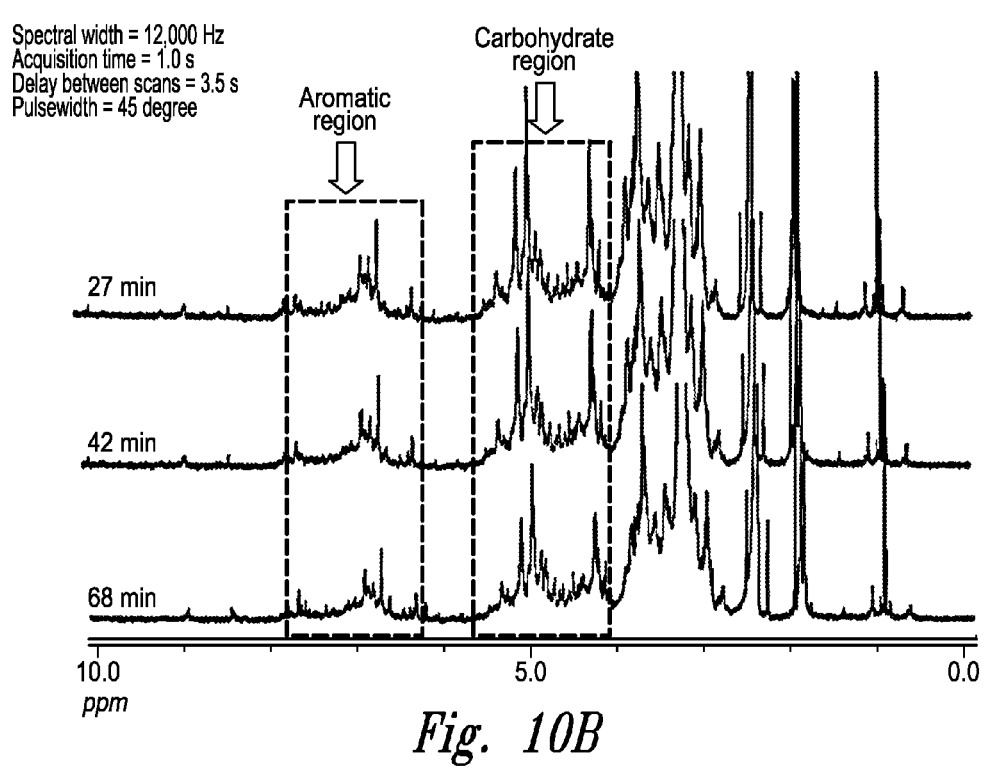
Figure 11:
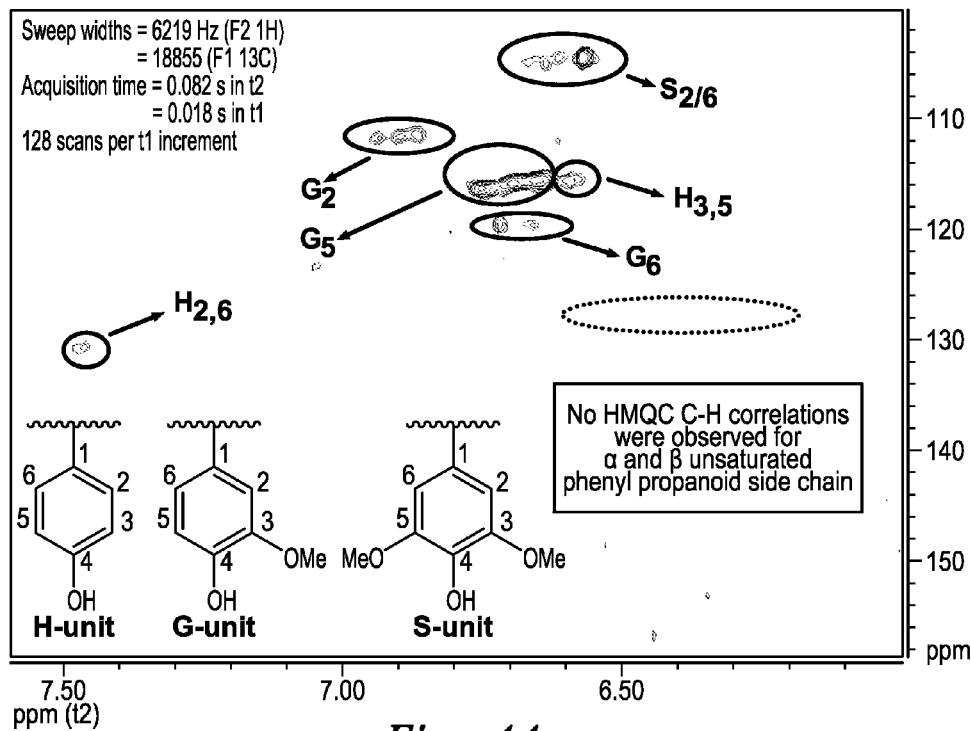
FIG. 11 shows, according to particular aspects, gradient selected 2D HSQC NMR analysis of the aromatic region of pretreated hydrolyzate at 27 min.

To acquire a more precise understanding of the depolymerized lignin framework released in the aqueous phase, NMR ($^1$H, and 2D HMQC) spectroscopic analyses were performed (FIGS. 10 and 11. 1D Proton NMR spectra of aqueous phase collected at 10, 17, 27, 42 and 68 mins respectively, were acquired for each sample with a spectral width of 12,000 Hz and an acquisition time of 1.0 s, a delay between scans of 3.5 s and a 45 degree pulsewidth (FIG. 10). FIGS. 10A and 10B show, according to particular aspects, A) comparison of 1D Proton NMR spectra of hydrolyzates from Miscanthus samples collected at 10, 17 and 27 min, (B) comparison of 1D Proton NMR spectra of hydrolyzates from Miscanthus samples collected at 27, 42 and 68 min.

Both 1D and 2D NMR analysis of pretreated hydrolysate indicated that the conservation of original aromatic properties of native lignin, i.e., dehdroxylation and methoxylation of aromatic ring, is not evident. Both compositional and 2D NMR analysis of pretreated hydrolysate strongly suggested the preferential removal and degradation of S-lignin over H and G-lignin as a result of water-only flowthrough pretreatment. The 2D NMR analysis showed non-existence of α and β unsaturated side chains, suggesting plausible modification of side chains of the released lignin end groups (H, G and/or S).

Two dimensional phase-sensitive, gradient selected HMQC spectra (FIG. 11) were acquired using sweep widths of 6219 Hz (F2 $^1$H) and 18855 (F1 $^{13}$C) using the echo-antiecho method of phase discrimination in F1. Data was collected with acquisition times of 0.082 s in t2 (1024 complex points) and 0.018 s in t1 (2×340 points) using 128 scans per $t_1$ increment and a 1 s delay between scans for a total acquisition time of 27 h. FIG. 11 shows, according to particular aspects, gradient selected 2D HMQC NMR analysis of the aromatic region of pretreated hydrolyzate at 27 min.

FTIR Analysis of Aqueous Phase Lignin.

Figure 12:
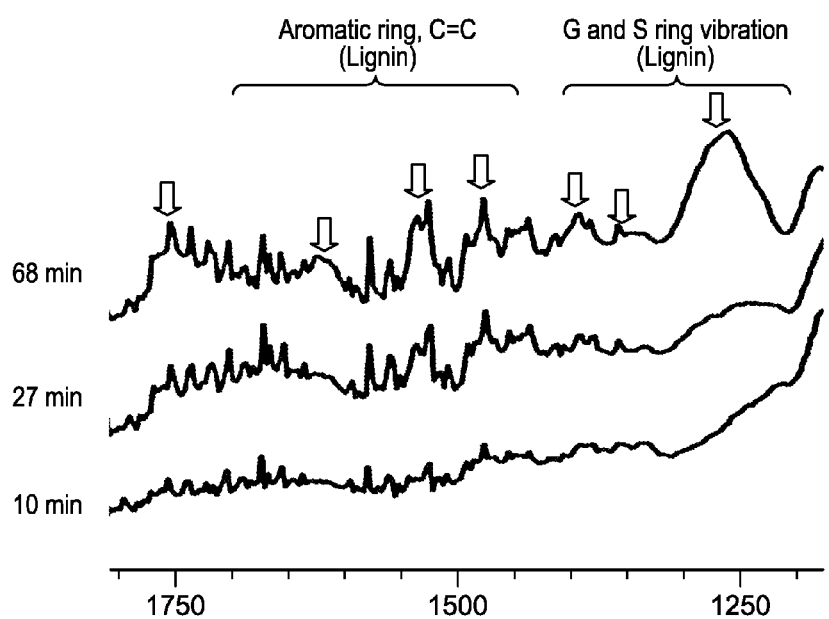
FIG. 12 shows, according to particular aspects, expanded lignin region of FTIR spectra of aqueous phase lignin recovered at 160° C. at different residence time.

FTIR analysis of the aqueous phase lignin revealed that the intensities of aromatic ring vibrations of phenyl-propane (C9) skeleton and aromatic C—H in plane deformation, typical for S unit, increased with increase in residence time (FIG. 12). This is indicative of preferential release of S-unit during depolymerization process. FIG. 12 shows, according to particular aspects, expanded lignin region of FTIR spectra of aqueous phase lignin recovered at 160° C. at different residence time.

Aromatic Content in Aqueous Phase.

Figure 13:
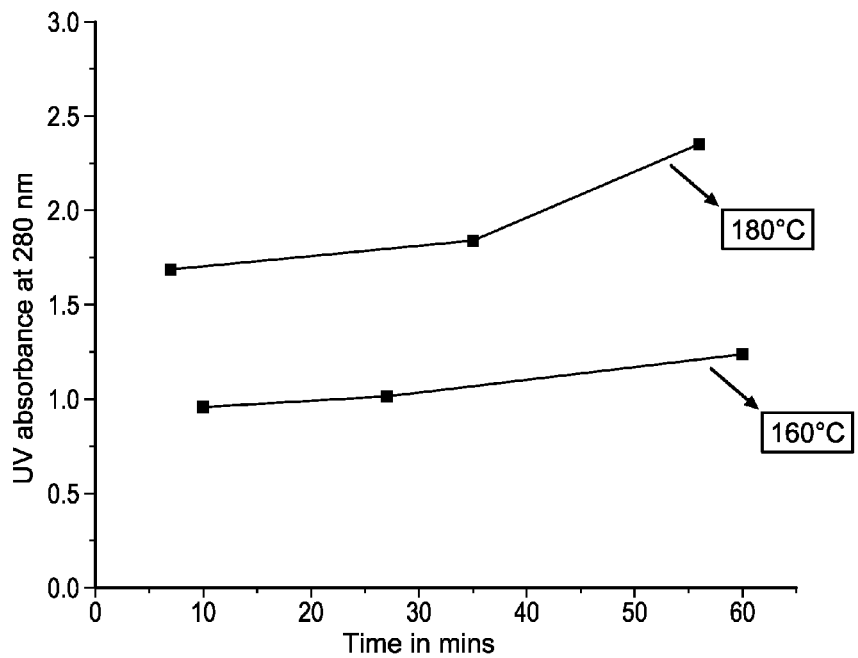
FIG. 13 shows, according to particular aspects, aromatic content of soluble lignin recovered at different temperature and time from Miscanthus samples.

UV analysis (at 280 nm) on the aqueous phase solutions from APD of Miscanthus samples at both 160° C. and 180° C. were carried out to determine the aromatic content (FIG. 13). Our results indicated that the aromatic content in soluble lignin increased with increase in residence time at both 160° C. and 180° C., signifying greater extent of solubilization of reactive lignin fragments. FIG. 13 shows, according to particular aspects, aromatic content of soluble lignin recovered at different temperature and time from Miscanthus samples.

Monomer Release and Bond Cleavage Pattern of Lignin in APD.

Low amounts of monomeric and dimeric lignin derivatives were detected by GC-MS analysis of the organic extract of aqueous phase solution indicated that the majority of lignin-derived fragments released possibly remained as soluble oligomeric lignin-derived entities. Thus, the majority of lignin derived fragments released in the water extract are soluble oligomeric lignin derived entities which are beyond the detection limit by GC/MS analysis. This is also evident in the 1D NMR spectra, as the line width of the aromatic chemical resonance shifts are much broader resembling soluble oligomeric phenolic polymer (lignin derived). The molecular weight distribution of these soluble oligomeric lignin polymers is addressed below. The monomeric lignin derived units released as detected in the GC/MS spectra resulting from the APD are shown below:

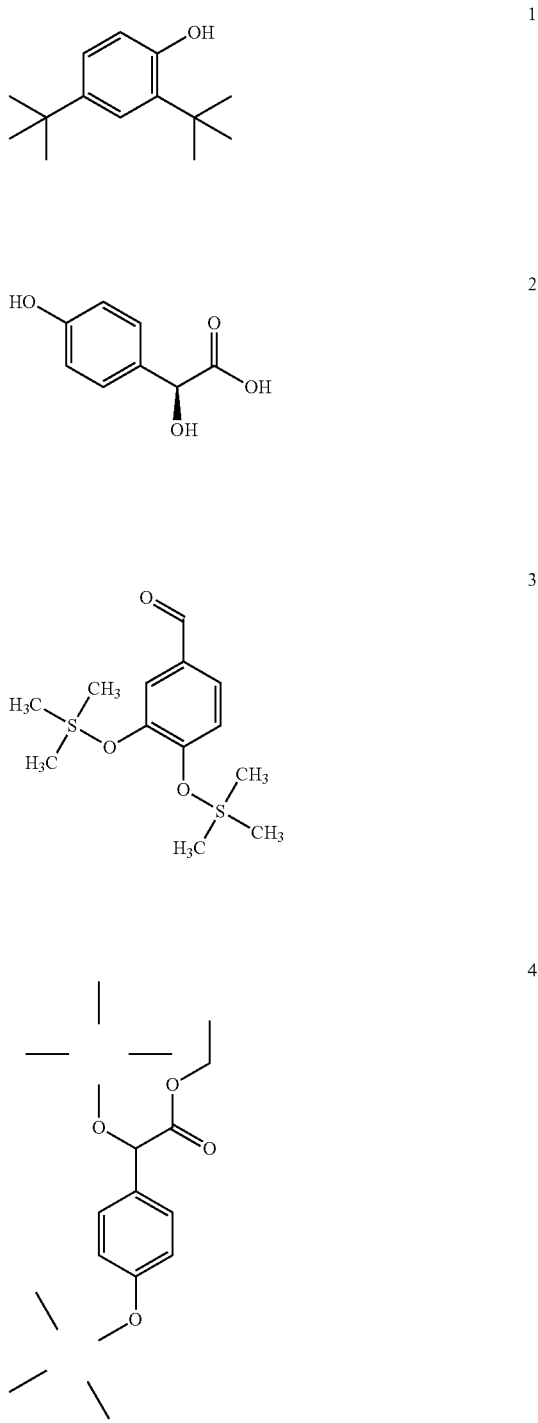

The compound 1 is phenol derived and could be possibly generated due to rearrangement of mass fragmentation units during GC analysis. However, the origin of compound 2 and 4 in the GC/MS spectra can be speculated as partially cleaved and/or oxidized product of the β-O-4 (8-O-4') inter unit linkages, whereas 3 could result from oxidation at Cα-Cβ position of end groups. These are depicted as below:

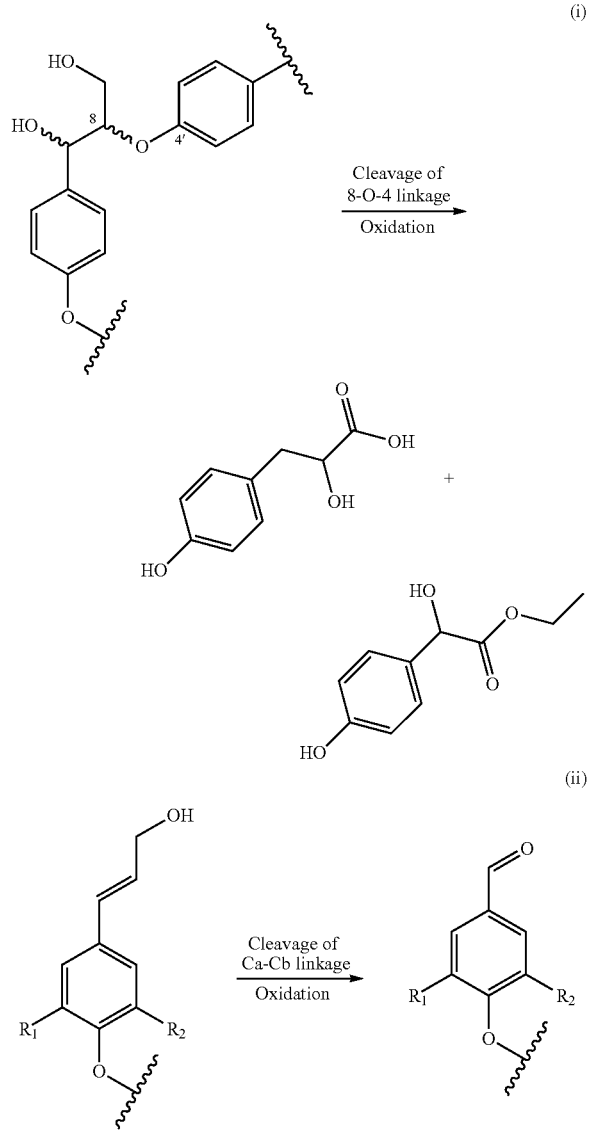

In Summary:

the preferential removal and degradation of S-lignin over H and G-lignin as a result of water-only flowthrough pretreatment was validated; the majority of lignin-derived fragments released in the aqueous phase were determined as soluble oligomeric lignin-derived entities; and bond cleavage of β-O-4 structure and β-ether linkage preceded by oxidative cleavage at Cα-Cβ position of end groups of lignin was verified during APD.

Determination of Molecular Weight Profiles of Depolymerized Lignin Released in Aqueous Phase.

The molecular weight range of depolymerized lignin during flowthrough pretreatment were evaluated. Specifically, the molecular weight profiles in such depolymerization processes were established by Gel Permeation Chromatography (GPC) of soluble and insoluble lignin/extractives in the aqueous phase. The insoluble lignin samples, collected under both water-only (160° C. for 60 min; 180° C. for 60 min; 200° C. for 15 min; and 200° C. for 15 min) and 0.05% H$_2$SO$_4$ (160° C. for 10 min; 180° C. for 35 min; 200° C. for 5 min; and 200° C. for 5 min) conditions, were acetylated to allow dissolution in tetrahydrofuran (THF) for GPC analysis.

Figure 14:
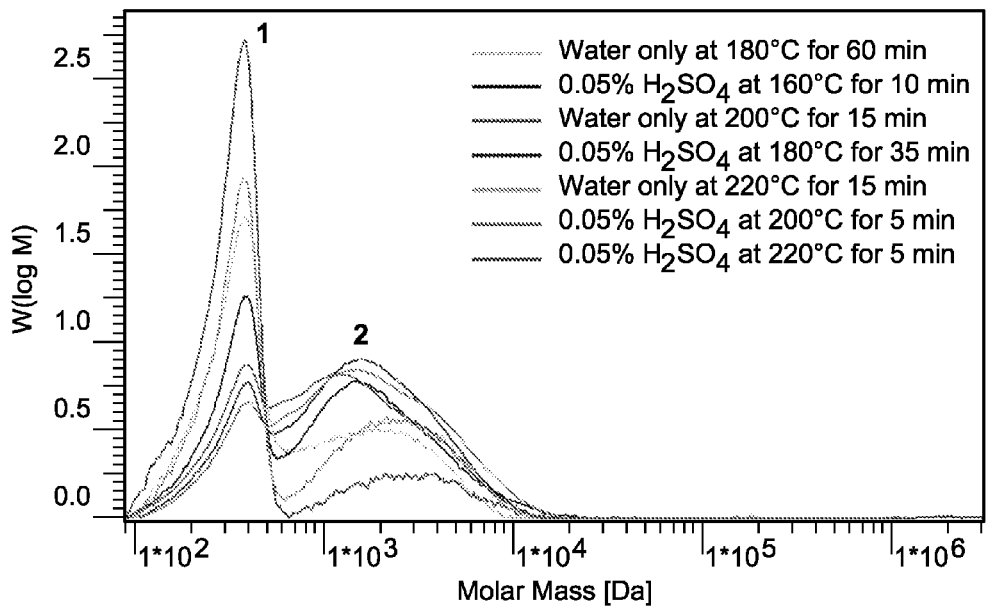
FIG. 14 shows, according to particular aspects, molecular weight distribution of insoluble lignin fraction derived from water-only and 0.05% $H_2SO_4$ flowthrough pretreatment.

FIG. 14 shows, according to particular aspects, molecular weight distribution of insoluble lignin fraction derived from water-only and 0.05% H$_2$SO$_4$ flowthrough pretreatment. Table 9 shows the molecular weight of peaks in the GPC curve of FIG. 14.

Figure 32:
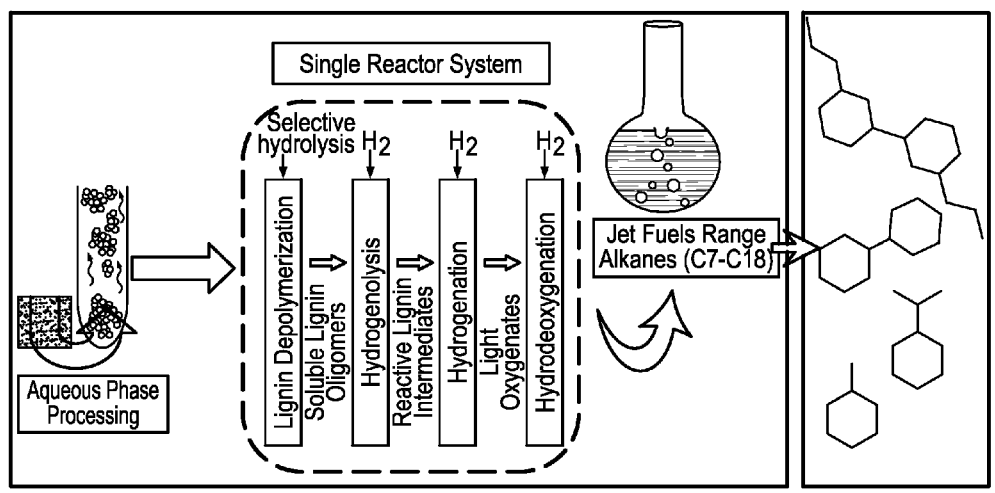
FIG. 32 shows, according to particular aspects, a schematic of a method and single reactor system for the simultaneous-solubilization, depolymerization, and hydrodeoxygenation process.

The lignin samples were stirringly acetylated with 2 mL of acetic anhydride/pyridine (1/1, v/v) at room temperature for 24 hours. After acetylation, the acetylated lignin sample was then dissolved in THF for GPC analysis using Agilent 1200 series liquid chromatography containing ultraviolet (UV) detector. The sample was filtered through a 0.45 μm membrane filter prior to injection and 20 μl of sample was automatically injected. GPC analyses were carried out using a UV detector on a 4-column sequence of Waters™ Styragel columns (HR0.5, HR2, HR4 and HR6) at 1.00 ml/min flow rate. Polystyrene standards were used for calibration. WinGPC Unity software (Version 7.2.1, Polymer Standards Service USA, Inc.) was used to collect data and determine molecular weight profiles (FIG. 32). The GPC results for the acetylated lignin samples were summarized in Table 10, which provide strong evidence for low molecular weight nature of the recovered lignin under both water only and 0.05% H$_2$SO$_4$ flowthrough conditions.

TABLE 9

Molecular weight of peaks in GPC curve in FIG. 13.

| Peak ID | Peak MW |
|---------|---------|
| 1 | 393 |
| 2 | 1700 |

TABLE 10

Weight-average molecular weight (g/mol)

| Sample | High MW portion | Low HW portion |
|--------|-----------------|----------------|
| Water-only at 160° C. for 60 min | 3280 | 334 |
| 0.05% H$_2$SO$_4$ at 160° C. for 10 min | 2450 | 342 |
| Water-only at 180° C. for 60 min | 2830 | 326 |
| 0.05% H$_2$SO$_4$ at 180° C. for 35 min | 2641 | 361 |
| Water-only at 200° C. for 15 min | 3197 | 319 |
| 0.05% H$_2$SO$_4$ at 200° C. for 5 min | 2951 | 374 |
| Water-only at 220° C. for 15 min | 3164 | 322 |
| 0.05% H$_2$SO$_4$ at 220° C. for 5 min | 2488 | 364 |

Investigation of Characteristic Features of Soluble and Insoluble Low Molecular Weight Lignin Fragments Released in Aqueous Phase.

Figure 15:
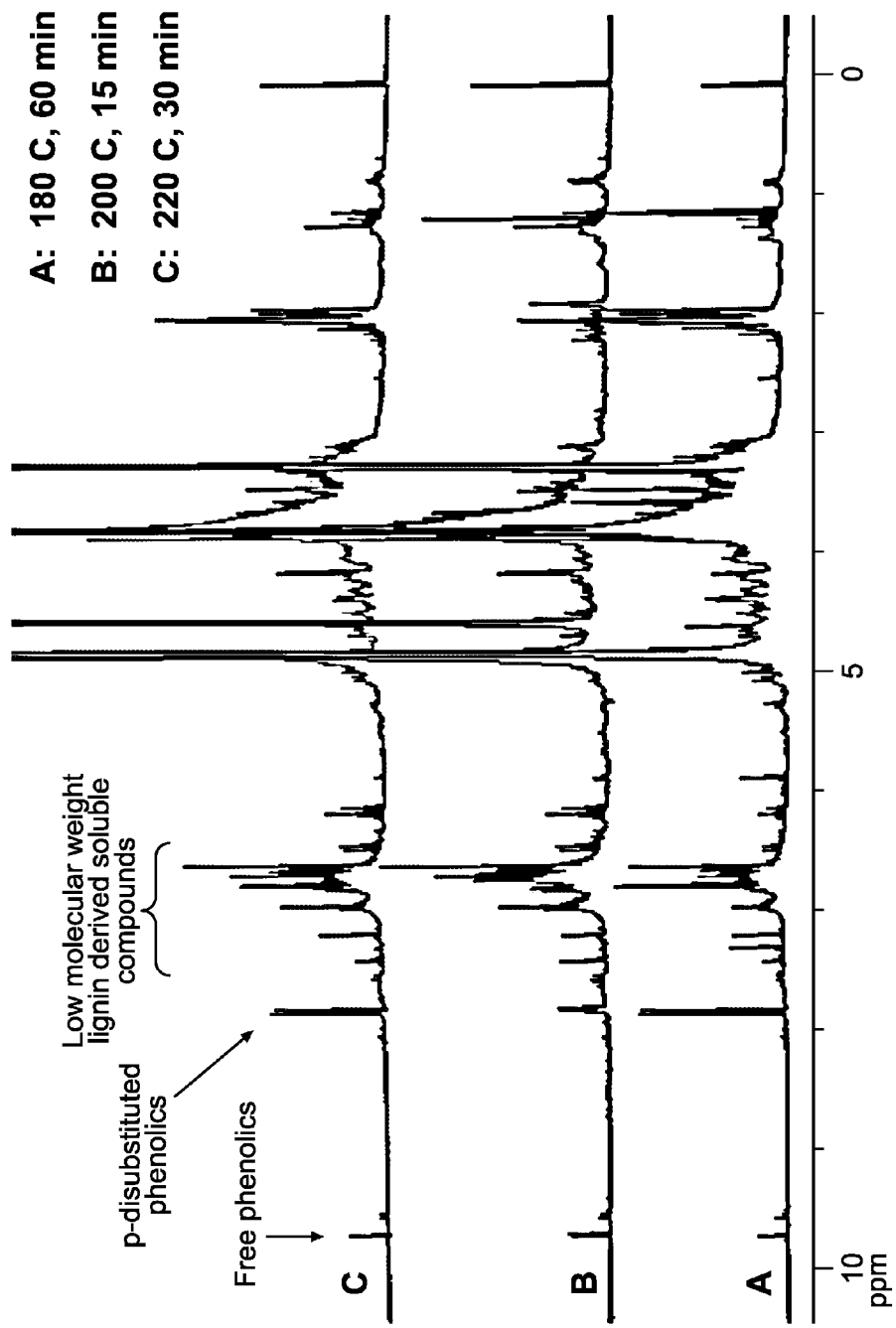
FIG. 15 shows, according to particular aspects, 1D $^1$H-NMR spectra of soluble lignin from water only flowthrough conditions.
Figure 16:
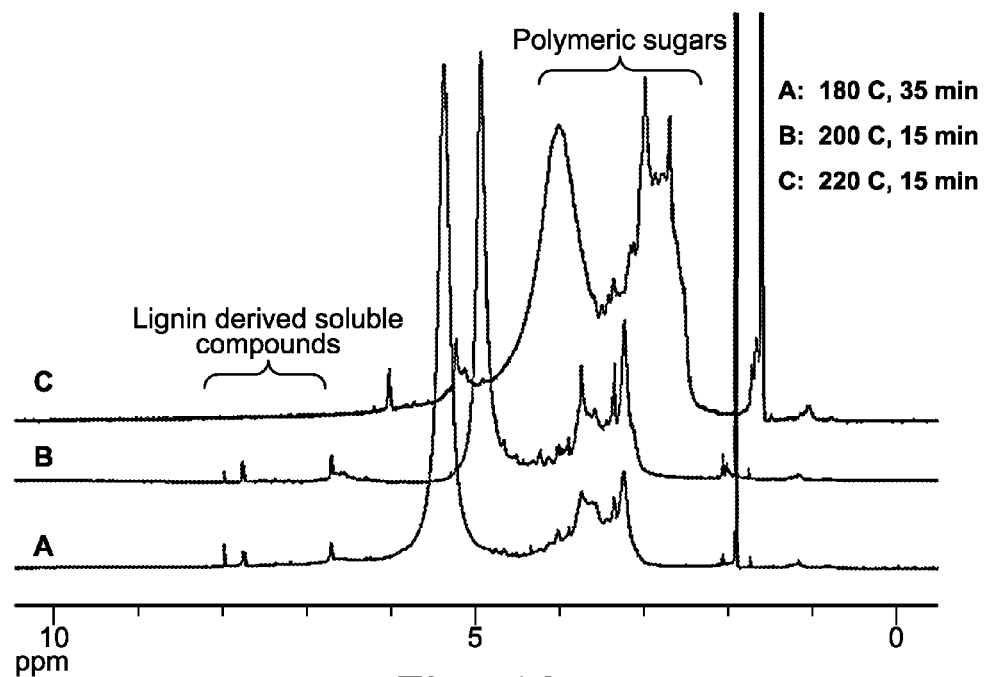
FIG. 16 shows, according to particular aspects, 1D $^1$H-NMR spectra of soluble lignin derived from 0.05% $H_2SO_4$ flowthrough pretreatment.

Proton NMR spectra of soluble lignin in aqueous phase obtained from both water-only and 0.05% H$_2$SO$_4$ flowthrough pretreatment, were carried out with a spectral width of 12,000 Hz and an acquisition time of 1.0 s, a delay between scans of 3.5 s and a 45 degree pulsewidth (FIGS. 15 and 16). FIG. 15 shows, according to particular aspects, 1D $^1$H-NMR spectra of soluble lignin from water only flowthrough conditions. FIG. 16 shows, according to particular aspects, 1D $^1$H-NMR spectra of soluble lignin derived from 0.05% H$_2$SO$_4$ flowthrough pretreatment.

The NMR spectroscopic analysis revealed that soluble lignin produced under water only flow through conditions contained lignin derived small molecules (very low molecular weight) with mainly free phenolic groups. By comparison, very low amount of these lignin derived compounds were detected in the hydrolysate under 0.05% $H_2SO_4$ flowthrough conditions. In contrast, none of these aromatic derived compounds were detected in the aqueous extract of untreated raw biomass, indicating the release and existence of these compounds in the hydrolysate phase were the result of flowthrough pretreatment.

To establish the characteristic features of low molecular weight insoluble lignin produced in the hydrolysate, 1D $^1$H NMR and $^{13}$C NMR were performed. The isolated insoluble lignin (~30 mg) from both water-only and 0.05% $H_2SO_4$ flowthrough conditions were dissolved in DMSO-$d_6$ (0.5 ml) and subjected to 1D inverse-gated $^{13}$C NMR spectra experiments for quantification studies. These were performed on a Varian Inova 600™ spectrometer equipped with a Nalorac dual broad band probe. Inverse-gated $^{13}$C NMR spectra were collected with a sweep width of 29,304 Hz, in 3 blocks of 10,000 scans and 1 block of 5,400 scans co-added for a total of 35,400 scans. Spectra were acquired using a 90° flip angle, 10 sec delay between scans and an acquisition time of 1.3 sec during which time the protons were decoupled. The 1D spectra were apodized using an exponential weighting function (lb=20 Hz) and zero filled to 128 k points prior to Fourier transformation followed by a baseline correction.

Figure 17:
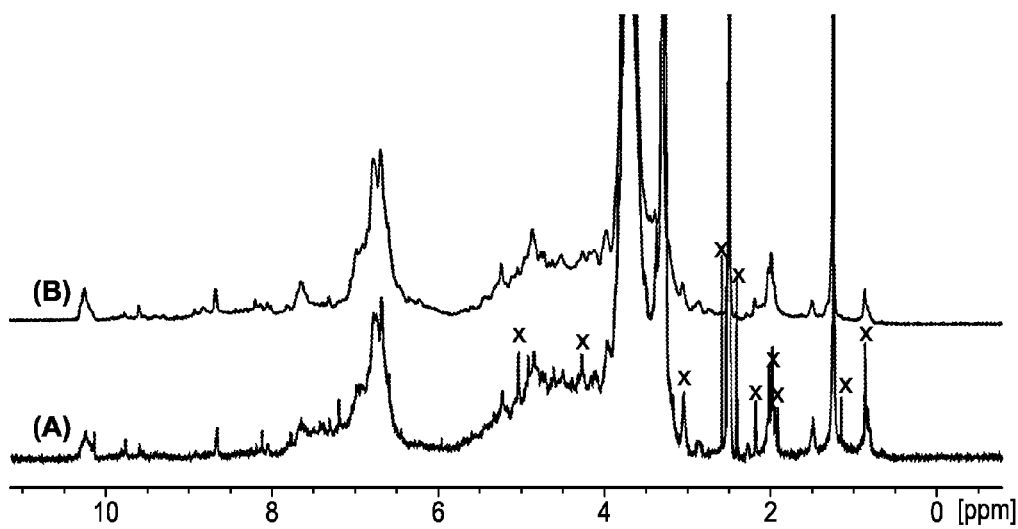
FIG. 17 shows, according to particular aspects, 1D $^1$H-NMR spectra of insoluble lignin from; (A) water-only flowthrough pretreatment and (B) 0.05% $H_2SO_4$ flowthrough pretreatment.

Initially, the 1D $^1$H NMR solution spectra of the insoluble lignin derived from water-only pretreatment was compared to that from 0.05% $H_2SO_4$ flowthrough pretreatment, which almost displayed identical aromatic chemical resonances values ($\delta_H$ ~6.5 to 7.8 ppm), signifying that the majority of inter-unit linkages of both the lignin-derived isolates were analogous. However, a direct comparison of the overall pattern in aliphatic region in the 1D $^1$H NMR spectra, of lignin-derived isolates from the water-only pretreatment, revealed a considerable difference in the distribution of the proton aliphatic resonances as marked by 'X' in the range of $\delta_H$ ~0.75 to 2.5 ppm and 4.25 to 5.00 ppm (FIG. 17). FIG. 17 shows, according to particular aspects, 1D $^1$H-NMR spectra of insoluble lignin from; (A) water-only flowthrough pretreatment and (B) 0.05% $H_2SO_4$ flowthrough pretreatment. This indicated that the lignin isolates from the water-only pretreatment was less pure in comparison with that derived from 0.05% $H_2SO_4$ flowthrough pretreatment. These results well correlated with the AcBr analysis (herein above).

Figure 18:
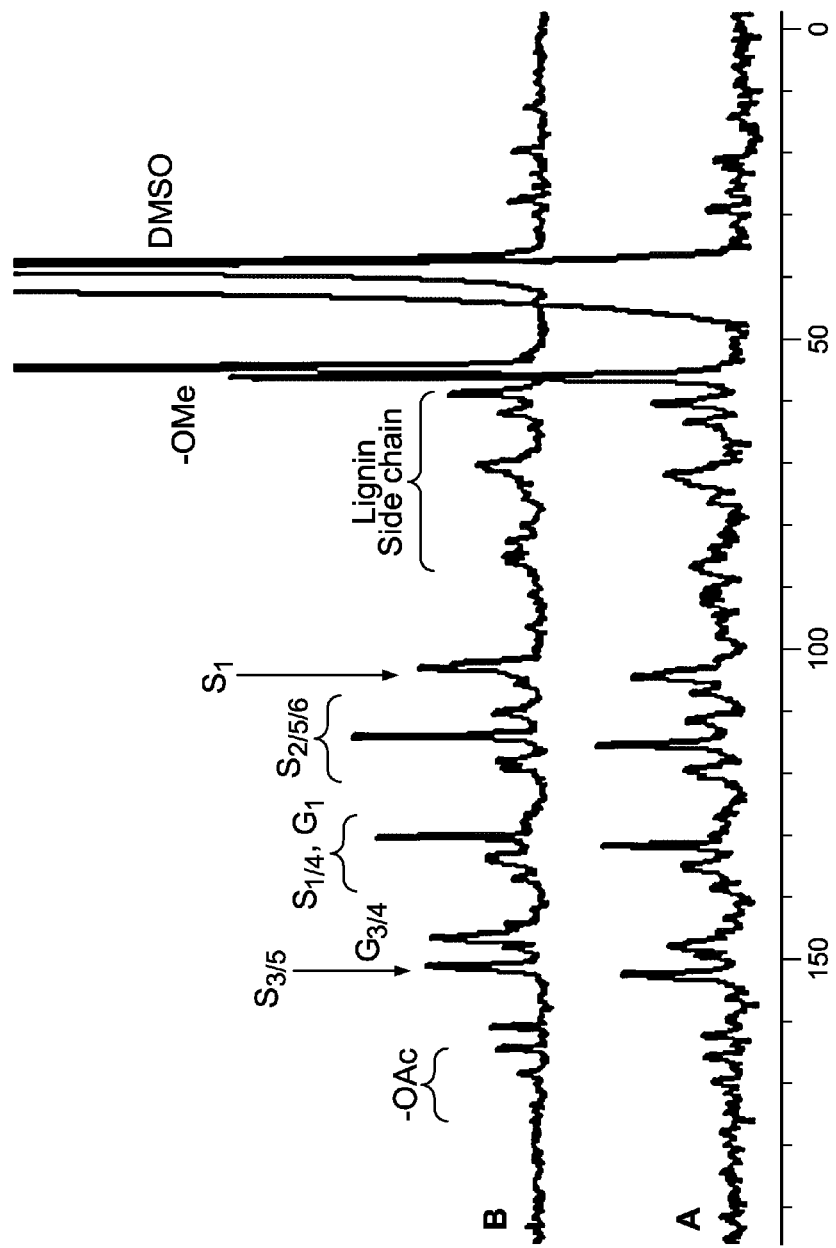
FIG. 18 shows, according to particular aspects, $^{13}$C-NMR spectra of insoluble lignin from; (A) Water-only flowthrough pretreatment and (B) 0.05% $H_2SO_4$ flowthrough pretreatment.

Attention was next directed towards analysis of solution state 1D $^{13}$C-NMR, a powerful technique capable of revealing a large amount of lignin compositional and structural information. The 1D $^{13}$C-NMR spectrum of both the insoluble lignin isolates were also similar in terms of distribution of overall lignin resonances, indicating the presence of comparable inter-unit linkages that resemble native lignin structure (FIG. 18). In this regard, the expected domain G/S aromatic ring resonances, together with characteristic methoxyl group (—OMe) signals at $\delta c$~55.8 ppm with readily discernible resonances for the G tertiary carbons-2, 5 and 6 ($\delta c$ ~107-124 ppm) and quaternary carbons-3 and 4 ($\delta c$ ~145-154 ppm) along with the S aromatic ring tertiary carbons-2 and 6 ($\delta c$ ~102-107 ppm) and quaternary carbons-3 and 5 ($\delta c$ ~150-154 ppm), were observed in the 1D $^{13}$C NMR spectra of insoluble lignin isolates from both water-only and 0.05% $H_2SO_4$ flowthrough pretreatment, respectively (FIG. 18). FIG. 18 shows, according to particular aspects, $^{13}$C-NMR spectra of insoluble lignin from; (A) Water-only flowthrough pretreatment and (B) 0.05% $H_2SO_4$ flowthrough pretreatment.

In Summary:

molecular weight profiles of low molecular weight depolymerized lignin were successfully established; the insoluble lignin-derived fragments released in the aqueous phase were determined as retaining the native lignin structure; and soluble lignin released in the aqueous phase during depolymerization reactions were derived as small molecules with free phenolic groups.

Characterization of Substructures (Inter-Unit Linkages) and Oxygenated Aliphatic Region of Recovered Low Molecular Weight Oligomeric Lignin from APD.

Figure 19:
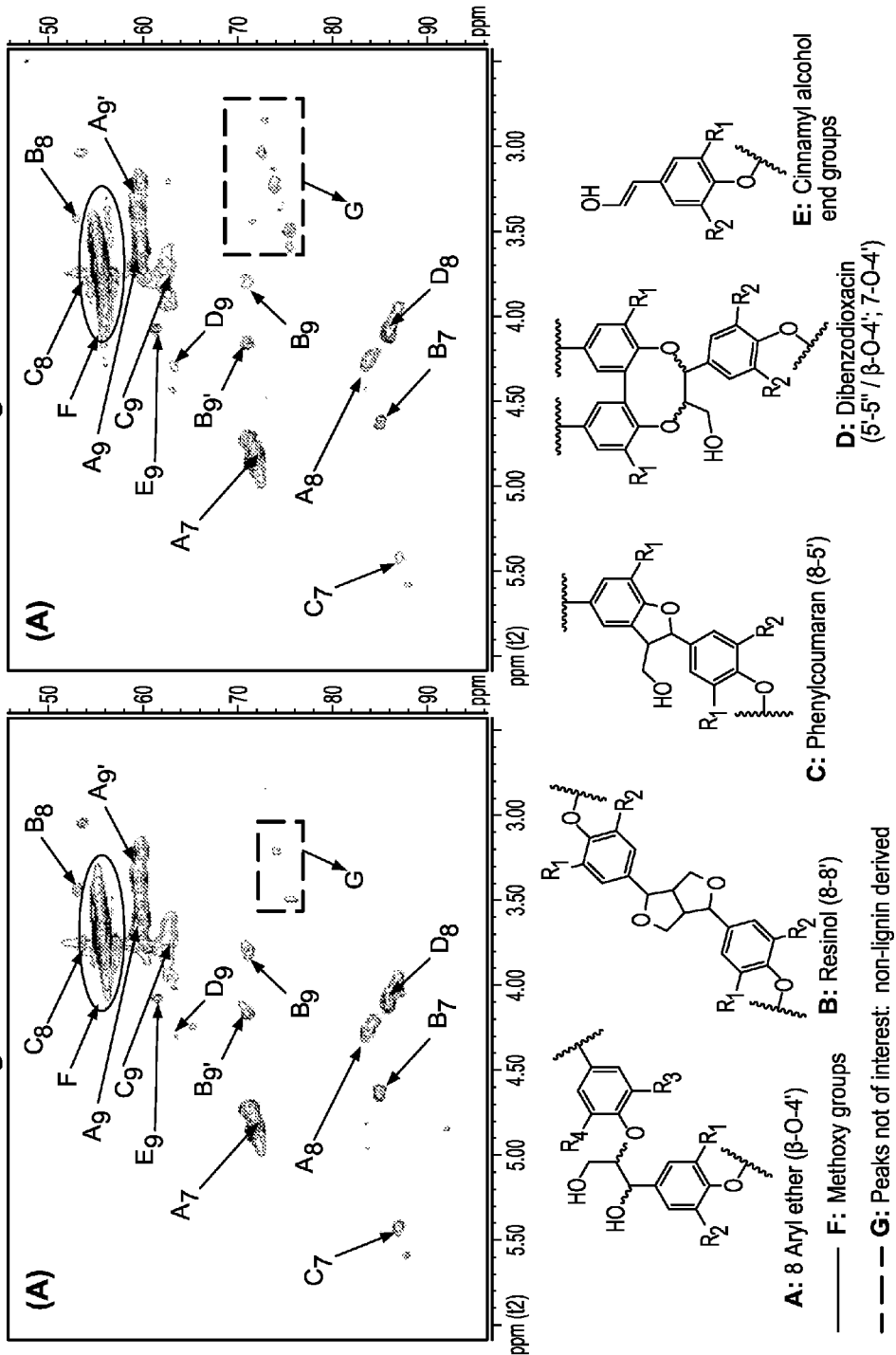
FIGS. 19A and 19B show, according to particular aspects, gradient selected 2D HSQC analysis of insoluble lignin in hydrolysate; (A) Insoluble lignin recovered after 0.05% $H_2SO_4$ pretreatment at 200° C., 5 min, and (B) Insoluble lignin recovered after water-only pretreatment at 180° C., 60 min.

Two dimensional (2D) solution-state NMR methods were used to identify the framework of the oligomeric lignin, its structural units and the corresponding inter-unit linkages. This type of detailed analysis is the chief advantage of NMR spectroscopy over degradative methods (e.g. acetyl bromide, alkaline nitrobenzene oxidation, thioacidolysis and DFRC methods), which measure content and not structure. Thus in order to acquire a precise understanding of the various lignin inter-unit linkages and compositions, the insoluble lignin samples collected from both water-only (180° C. for 60 min) and 0.05% $H_2SO_4$ (200° C. for 5 min) pretreatment were subjected to 2D HSQC NMR analysis [FIGS. 19 (A) and (B)]. FIGS. 19A and 19B show, according to particular aspects, gradient selected 2D HSQC analysis of insoluble lignin in hydrolysate; (A) Insoluble lignin recovered after 0.05% $H_2SO_4$ pretreatment at 200° C., 5 min, and (B) Insoluble lignin recovered after water-only pretreatment at 180° C., 60 min.

The selected region of the HSQC spectrum of the lignin-isolates from wateronly (180° C. for 60 min) and 0.05% $H_2SO_4$ (200° C. for 5 min) flowthrough pretreatment as shown in FIGS. 19A and 19B, with peaks in the $^{13}$C projection and the resultant contours in the HSQC spectrum marked in color for the carbon-proton correlations to provide definite information of the nature substructure and/or inter-unit linkages present in the oligomeric lignin framework. This analysis thus confirmed that both the lignin-isolates contained the expected lignin substructures A-E, namely: 8-O-4' aryl ether (substructure A), resinol-like (substructure B), phenylcoumaran (substructure C), dibenzodioxocin (substructure D) and cinnamyl alcohol end groups (substructure E). The substructures were detected individually by their characteristic cross-peak $\delta c/\delta H$ correlations between: i.e. 72.3/4.61 (C7/H7), 85.8/4.17 (C8/H8), 60.3/3.45 (C9/H9) and 60.3/3.21 (C9/H9') ppm for 8-O-4' aryl ether substructure A; 86.1/4.57 (C7/H7), 54.1/3.48 (C8/H8), 70.8/3.57 (C9/H9) and 70.8/4.16 (C9/H9') ppm for resinol-like substructure B; 88.2/5.33 (C7/H7), 56.1/3.61 (C8/H8) and 63.8/3.53 (C9/H9) ppm for phenylcoumaran substructure C, 85.6/4.07 (C8/H8), and specifically with the correlation at 64.3/4.09 (C9/H9) ppm could be observed for dibenzodioxocin substructure D, as well as 63.3/4.01 (C9/H9) ppm for cinnamyl alcohol end groups E. The latter resonances, however, correspond only to coniferyl (G) alcohol end groups, with no sinapyl (S) alcohol end group being detected even down to noise level, thereby providing further evidence of the preferential cleavage of S-units of lignin during the flowthrough pretreatment. Although the overall pattern in chemical resonances of 2D HSQC NMR solution spectra of the lignin-isolates derived from water-only (180° C. for 60 min) and 0.05% $H_2SO_4$ (200° C. for 5 min) flowthrough pretreatment revealed that the inter-unit linkages in the lignin structure were nearly identical. However, a direct comparison of both the spectra of lignin isolates showed a slight divergence in the distribution of the aliphatic carbon-proton correlation shift values in the region of $\delta H$~3.50 to 3.00 ppm and $\delta c$~74.0 to 76.00 ppm as marked by gray box in FIGS. 19 (A) and (B), indicating that the recovery of much pure lignin isolates (>90% purity) was achievable under 0.05% $H_2SO_4$ (200° C. for 5 min) flowthrough conditions in comparison to water-only (180° C. for 60 min) conditions.

In Summary:

the inter-unit linkages of insoluble lignin-derived fragments released in the aqueous phase under both water only (180° C. for 60 min) and 0.05% $H_2SO_4$ (200° C. for 5 min) flowthrough conditions were determined; the released insoluble lignin-derived fragments which were recovered with over 90% purity retained the lignin sub-structures, such as 8-O-4', 5'-5"/7-O-4', 8-O-4", 8-8', and 8-5', and were deploymerized to relatively low degree of polymerization (DP) ranging from 350 to 1750; and the preferential cleavage and degradation of S-lignin over G-lignin under both water only and 0.05% $H_2SO_4$ flowthrough conditions was further substantiated via 2D HSQC NMR analysis.

Example 4

Py-GC/MS Analysis of Water-Only (Low Molecular Weight) and 0.05% $H_2SO_4$ (High Molecular Weight) Flowthrough Recovered Lignin from Poplar was Achieved; and FTIR Analysis of Low and High Molecular Weight Lignin Derived from Flowthrough Pretreatment was Achieved Overview.

In this Example, Py-GC/MS analysis of water-only (low molecular weight) and 0.05% $H_2SO_4$ (high molecular weight) flowthrough recovered lignin was achieved, and with FTIR analysis of low and high molecular weight lignin derived from flowthrough pretreatment.

Materials and Methods

Pretreatment Conditions:

1 g Poplar wood with 60 mesh sizes were pretreated at temperature of 200° C. with DI water for 15 min and 0.05% (w/w) sulfuric acid for 5 min, respectively. The reaction was operated at a 10% solid loading in a 15 ml batch reactor (4520 Series, Parr Instruments, Moline, Ill.) in a 4-kW fluidized sand bath (model SBL-2D, Omega engineering, Inc., Stamford, Conn.), at flow rate of 25 mL/min.

Lignin Collection:

Hydrolyzates were frozen then stored at −20° C. for 24 hrs and then thawed under −4° C. Standard filter paper was used to filter lignin from aqueous solution and dried at room temperature for further analysis (Py-GC/MS and FTIR). For the filtrate fraction after filtration, extraction (Dichloromethane: liquid=1:2, 30 min, 3 times) was operated to extract lignin. Later, distillation was carried out to separate the solvent. The resulted lignin was freeze dried at −80° C.

Results

Py-GC/MS Analysis of Water-Only (Low Molecular Weight) and 0.05% $H_2SO_4$ Flow Through Recovered Lignin.

Py-GC/MS was essentially carried out to determine the chemical components of lignin recovered through 0.05% $H_2SO_4$ (at 200° C. for 5 min) and water-only (at 200° C. for 15 min) flowthrough pretreatment. The Py-GC/MS was processed with a CDS 5000 pyrolysis autosampler (Oxford, Pa., USA) which is attached to a Thermo Trace GC 6890N/MSD 5975B gas chromatography/mass spectrometry system (Bellevue, Wash., USA). Approximately 0.5 mg samples were loaded in to a quartz tube which was filled in a slight quartz wool in advance. The initial temperature performed on each sample was 250° C. (3° C./min from 0° C.) for 6 s and then pyrolyzed up to a temperature of 610° C. within 1 min and the generated vapors were separated by 30 m 0.25 µm inner diameter (5% phenyl)-methylpolysiloxane column. The pyrolyzed gas was held in the pyrolysis oven for 56 min and finally sent to mass spectrometer which was operated in EI mode (70 Ev) for analysis.

Figure 20:
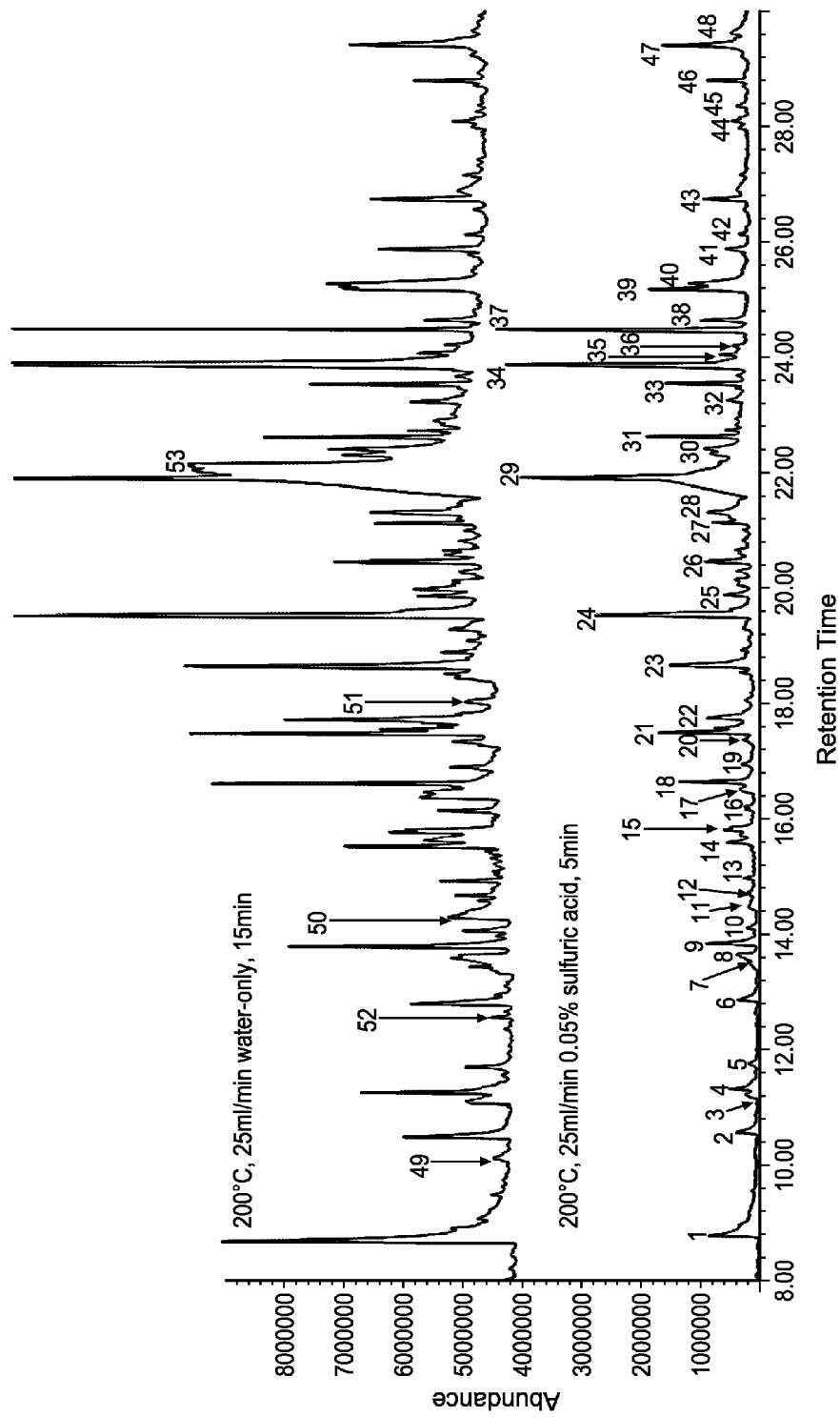
FIG. 20 shows, according to particular aspects, pyrograms of recovered flowthrough lignin from pretreated poplar biomass. (a) 200° C., 25 ml/min water-only, 15 min; (b) 200° C., 25 ml/min 0.05% $H_2SO_4$, 5 min.

For pyrolysis of flowthrough lignin, a wide range of products was yielded and most of them are fractions from guaiacol and syringyl derivatives. Pyrograms of Py-GC/MS showed that the composition of the lignin-derived fractions from lignin collected under water-only conditions was vaguely different from that under 0.05% $H_2SO_4$ flowthrough conditions. In this regard, the pyrograms of both water-only and 0.05% $H_2SO_4$ flowthrough recovered lignin samples displayed a series of products characteristic of pyrolysis of phenylpropanoid derived compounds (FIG. 20). FIG. 20 shows, according to particular aspects, pyrograms of recovered flowthrough lignin from pretreated poplar biomass. (a) 200° C., 25 ml/min water-only, 15 min; (b) 200° C., 25 ml/min 0.05% $H_2SO_4$, 5 min. The main pyrolyzed products from water-only pretreatment with retention time of 15 min are syringyl lignin derivatives (peaks 1, 24, 29, 34, 37) and guaiacol (peak 4). In comparison, for lignin obtained under 0.05% $H_2SO_4$ flowthrough conditions at reaction time of 5 min, the newly appearing pyrolyzed compounds (peaks 49-52) indicated modification of the H and G lignin or demethoxylation of S lignin over H/G units. The hydroxylation of the H lignin units was evident from existence of peaks: 11, 14, 17, 30, 41; modification on the G lignin was derived from appearance of peak 25; and degradation and/or demethoxylation of the S lignin units were evident from peaks: 38, 42, 44, 46, and 47; while lignin depolymerization was dictated by existence of peaks 41 and 47; respectively. The decreased pyrolyzed units at peak 25 also indicated dehydroxylation of the H lignin and modification on the S-lignin (peaks 21, 34, 40, and 43). Overall, the major pyrolysis products of lignin isolates recovered under 0.05% $H_2SO_4$ flowthrough pretreatment conditions (at 200° C. for min) were identified as G-derived (peaks: 24 and 29) and S-derived (peaks: 34 and 37) lignin units.

Figure 21A:
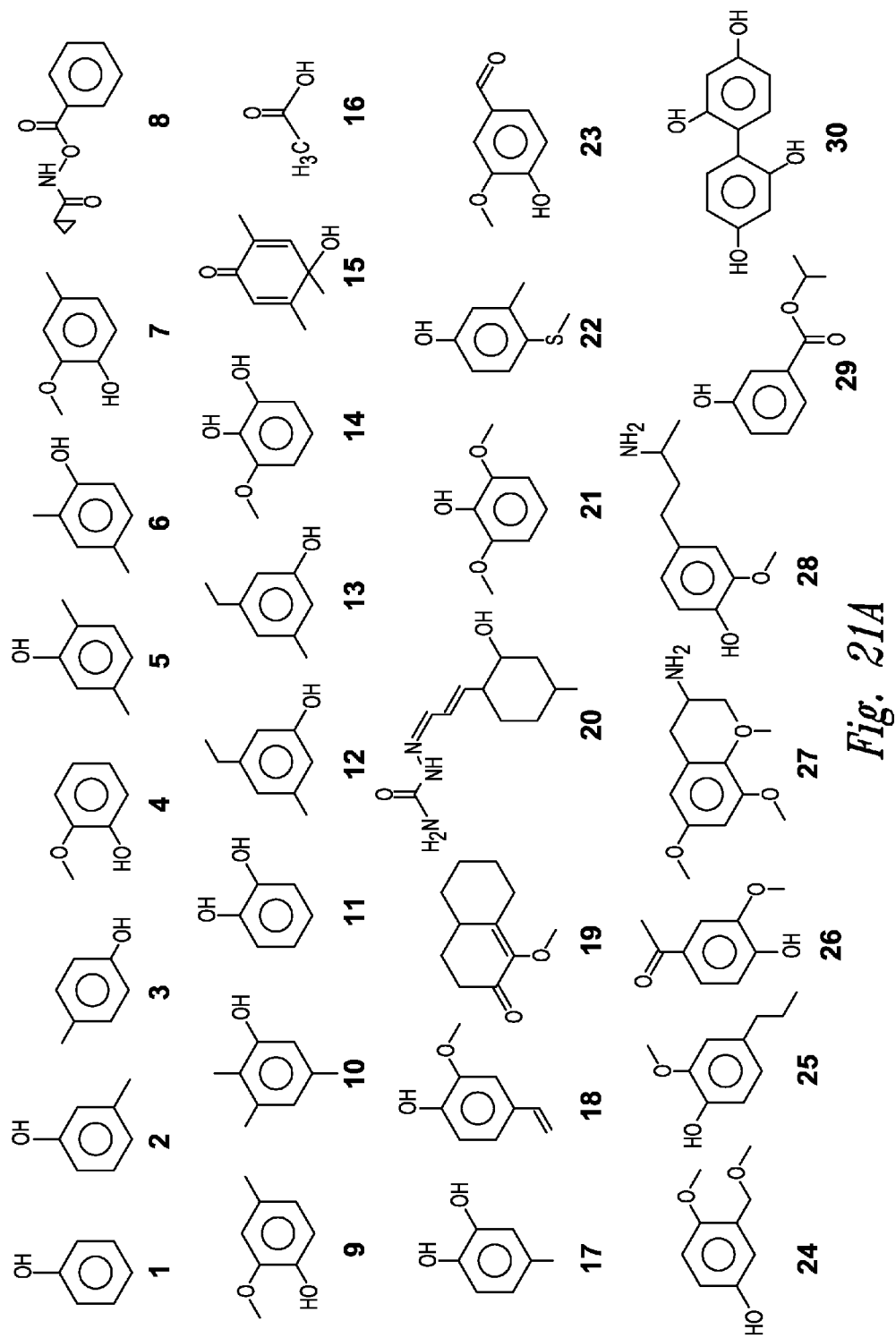
FIGS. 21A and 21B show identified products from the deconstructions of flowthrough lignin samples under pyrolytic conditions (Py-GC/MS conditions).
Figure 21B:
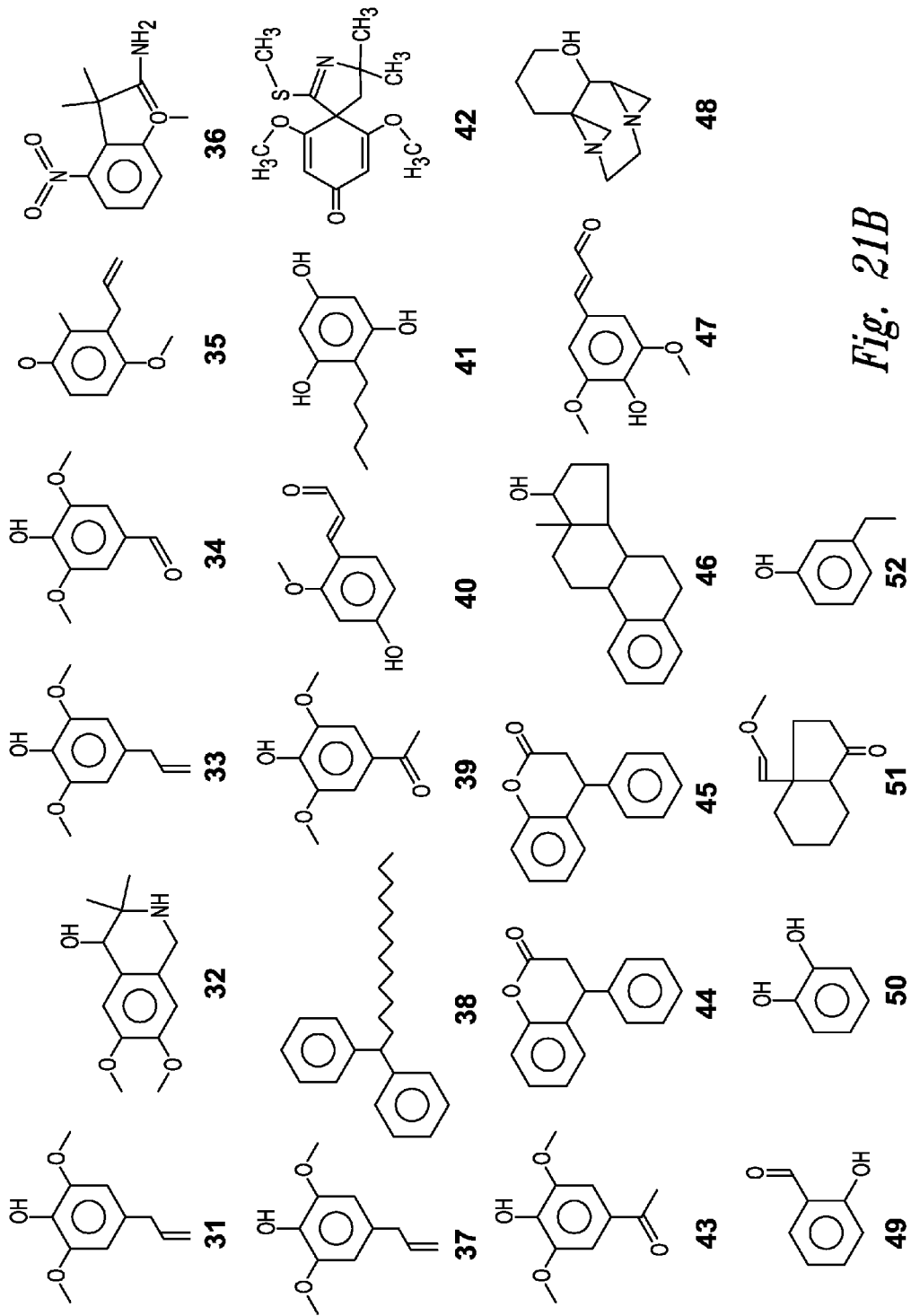

FIGS. 21A and 21B show identified products from the deconstructions of flowthrough lignin samples under pyrolytic conditions (Py-GC/MS conditions).

Table 11 shows a list of pyrolytic products from lignin with their corresponding retention time.

TABLE 11

List of pyrolytic products from lignin with their corresponding retention time.

| No. | Retention time/min | Compounds |
|---|---|---|
| 1 | 8.74 | Phenol |
| 2 | 10.55 | Phenol, 3-methyl- |
| 3 | 11.21 | Phenol, 4-methyl- |
| 4 | 11.32 | Phenol, 2-methoxy- |
| 5 | 11.75 | Phenol, 2,5-dimethyl- |
| 6 | 12.86 | Phenol, 2,4-dimethyl- |
| 7 | 13.50 | Phenol, 2-methoxy-4-methyl- |
| 8 | 13.64 | Cyclopropanecarboxamide, N-benzoyloxy- |
| 9 | 13.84 | Phenol, 2-methoxy-4-methyl- |
| 10 | 14.13 | Phenol, 2,3,5-trimethyl- |
| 11 | 14.48 | 1,2-Benzenediol |
| 12 | 14.73 | Phenol, 3-ethyl-5-methyl- |
| 13 | 14.98 | Phenol, 3-ethyl-5-methyl- |
| 14 | 15.60 | 1,2-Benzenediol, 3-methoxy- |
| 15 | 15.80 | 4-Hydroxy-2,4,5-trimethyl-2,5-cyclohexadien-1-one |
| 16 | 16.18 | Acetic acid |
| 17 | 16.50 | 1,2-Benzenediol, 4-methyl- |
| 18 | 16.65 | 2-Methoxy-4-vinylphenol |

TABLE 11-continued

List of pyrolytic products from lignin with their corresponding retention time.

| No. | Retention time/min | Compounds |
|---|---|---|
| 19 | 16.94 | 2(3H)-Naphthalenone, 4,4a,5,6,7,8-hexahydro-1-methoxy- |
| 20 | 17.36 | (−)-2-(2-Hydroxy-4-methylcyclohexyl)acrylaldehyde semicarbazone |
| 21 | 17.49 | Phenol, 2,6-dimethoxy- |
| 22 | 17.76 | Phenol, 3-methyl-4-(methylthio)- |
| 23 | 18.66 | Vanillin |
| 24 | 19.54 | Phenol, 4-methoxy-3-(methoxymethyl)- |
| 25 | 19.88 | Phenol, 2-methoxy-4-propyl- |
| 26 | 20.48 | Ethanone, 1-(4-hydroxy-3-methoxyphenyl)- |
| 27 | 21.16 | Trimethoxyamphetamine, 2,3,5- |
| 28 | 21.32 | 4-(3-Aminobutyl)-2-methoxyphenol |
| 29 | 21.92 | Benzoic acid, 3-hydroxy-, 1-methylethyl ester |
| 30 | 22.43 | 3,4-Hexanediol, 3,4-bis(4-hydroxyphenyl)- |
| 31 | 22.65 | Phenol, 2,6-dimethoxy-4-(2-propenyl)- |
| 32 | 23.27 | Isoquinolin-4-ol, 1,2,3,4-tetrahydro-6,7-dimethoxy-3,3-dimethyl- |
| 33 | 23.56 | Phenol, 2,6-dimethoxy-4-(2-propenyl)- |
| 34 | 23.87 | Benzaldehyde, 4-hydroxy-3,5-dimethoxy- |
| 35 | 24.07 | 2-Allyl-1,4-dimethoxy-3-methyl-benzene |
| 36 | 24.20 | Benzeneacetic amide, à,à-dimethyl-2-methoxy-6-nitro- |
| 37 | 24.47 | Phenol, 2,6-dimethoxy-4-(2-propenyl)- |
| 38 | 24.62 | Benzene, 1,1′-tetradecylidenebis- |
| 39 | 25.20 | Ethanone, 1-(4-hydroxy-3,5-dimethoxyphenyl)- |
| 40 | 25.29 | 4-Hydroxy-2-methoxycinnamal |
| 41 | 25.89 | 2-Pentanone, 1-(2,4,6-trihydroxyphenyl) |
| 42 | 26.15 | 6,10-Dimethoxy-3,3-dimethyl-1-methylsulfanyl-2-aza-spiro[4.5]deca-1,6,9-trien-8-one |
| 43 | 26.75 | Ethanone, 1-(4-hydroxy-3,5-dimethoxyphenyl)- |
| 44 | 28.12 | 2H-1-Benzopyran-2-one, 3,4-dihydro-4-phenyl- |
| 45 | 28.37 | 1-Propyl-3,6-diazahomoadamantan-9-ol |
| 46 | 28.79 | Estra-1,3,5(10)-trien-17á-ol |
| 47 | 29.44 | 3,5-Dimethoxy-4-hydroxycinnamaldehyde |
| 48 | 29.66 | 1-Propyl-3,6-diazahomoadamantan-9-ol |
| 49 | 10.13 | Benzaldehyde, 2-hydroxy- |
| 50 | 14.13 | 1,2-Benzenediol |
| 51 | 18.03 | Bicyclo[4.3.0]nonan-7-one, 1-(2-methoxyvinyl)- |
| 52 | 12.58 | Phenol, 3-ethyl- |

FTIR Analysis of Low and High Molecular Weight Lignin Derived from Flowthrough Pretreatment.

FTIR analysis provided the information on lignin structural changes including the functional groups as result of flowthrough pretreatment (water-only vs. 0.05% $H_2SO_4$). The spectra (4500-800 cm$^{-1}$) were obtained with a SHIMADZU IRPrestige-21 Fourier transform infrared spectrophotometer (Shimadzu, Japan) using ~2 mg of each sample. The PIKE Technologies MIRacle ATR accessory with a high-pressure clamp (Vendor, Japan) was used. Spectra were obtained using the triangular apodization, a resolution of 4 cm$^{-1}$, and an interval of 1 cm$^{-1}$. We conducted 64 scans for each background and sample spectra. Baseline and ATR corrections for penetration depth and frequency variations were applied using the Shimadzu IRsolution 1.30 software supplied with the equipment. Lignin derived from two pretreatment processes was analyzed by FTIR to understand the modification of lignin functional groups resulting from different pretreatment conditions (0.05% $H_2SO_4$ at 200° C. for 5 min and water-only at 200° C. for 15 min).

Figure 22:
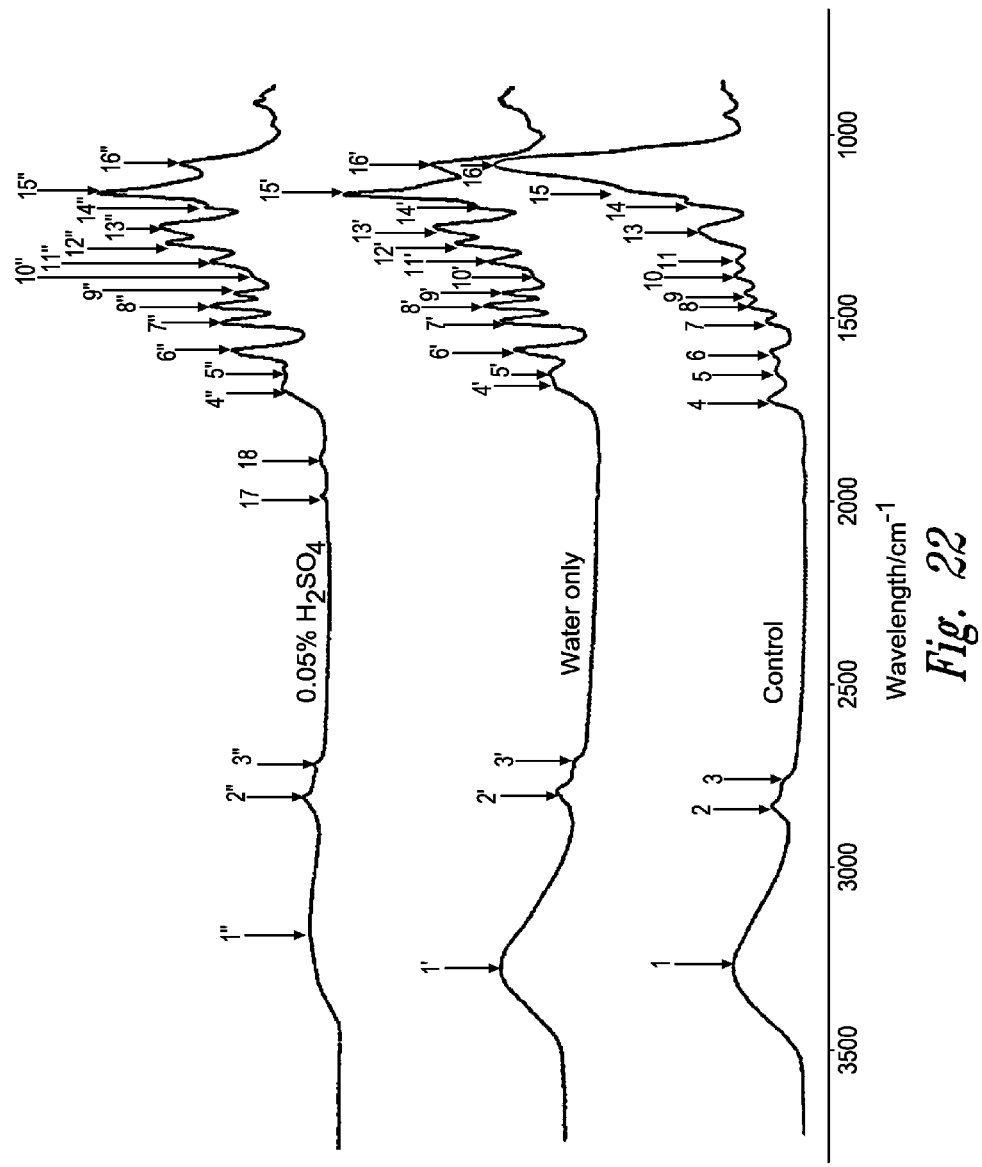
FIG. 22 shows, according to particular aspects, FTIR spectra, 4500-800 cm$^{-1}$ region for flowthrough lignin (water-only and 0.05% $H_2SO_4$ conditions). See Table 12 for assignment of FTIR signals.

FIG. 22 shows the FTIR spectra of two different flowthrough pretreated lignin (water-only and 0.05% $H_2SO_4$ conditions), whereas, Table 12 shows the assignments of the functional groups in the two respective samples. The spectrum of water-only and 0.05% $H_2SO_4$ pretreated lignin showed changed intensity peaks in comparison to its native poplar biomass-lignin region, indicating the deconstruction of aromatic rings during pretreatment (also supported by decreases in peak 5). The change in shape of peak 6 can be attributed to the metabolism of —$CH_3$ and —$CH_2$ groups. Interestingly, peak 9 consistently changed in shape, indicating structural modification of the syringyl derivatives (change in peak 10). Additionally, minor changes in the intensities of both peak 12 and 13 were also observed, indicating a slight modification of the aromatic ring and the ester linkage within the lignin proper.

In summary, the FTIR results showed that flowthrough conditions under both water-only and 0.05% $H_2SO_4$ conditions have induced: (1) metabolism of the C═O bond and aromatic ring, (3) cleavage of the C═O bond in the syringyl methoxyl groups. In this regard, the results suggest that lignin modifications occurred on the S lignin sites; such modifications are indicative of specific degradation of the S unit within the lignin polymeric framework during water-only and 0.05% $H_2SO_4$ flowthrough pretreatment.

TABLE 12

Main Assignments of FTIR Band

| No. | Wavenumber (cm$^{-1}$) | Assignment |
|---|---|---|
| 1 | 3000-3550 | Hydrogen Bonds |
| 2 | 2900-3000 | C—H stretching |
| 3 | 2820 | —$CH_2$— stretching |
| 4 | 1714-1725 | stretching of C═O unconjugated to aromatic rings (oxidized side-chains) |
| 5 | 1655 | stretching of C═O conjugated to aromatic rings |
| 6 | 1594-1609 | aromatic ring vibrations and C═O stretching |
| 7 | 1504-1515 | aromatic ring vibrations |
| 8 | 1462-1464 | asymmetric C—H bending (in $CH_3$ and —$CH_2$—) |
| 9 | 1421-1424 | aromatic ring vibrations |
| 10 | 1375 | C—H deformation in cellulose and hemicellulose |
| 11 | 1320-1330 | C—H in cellulose and $C_1$—O vibration in syringyl derivatives |
| 12 | 1270 | vibrations of guaiacyl rings and stretching vibrations of C═O bonds in lignin, C═O in guaiacyl —$OCH_3$ group |
| 13 | 1244 | syringyl ring and C—O stretch in lignin and xylan |
| 14 | 1160 | deformation vibrations of C—H bonds on benzene rings |
| 15 | 1115 | vibrations of ester linkage |
| 16 | 1048 | C—O stretch in cellulose and hemicellulose |

Example 5

Hydrogenation and HDO of Recovered Oligomeric Lignin to Hydrocarbon Range Jet Fuels was Achieved Hydrogenation and Hydrodeoxygenation (HDO) of Recovered Oligomeric Lignin to Hydrocarbon Range Jet Fuels.

Figure 23:
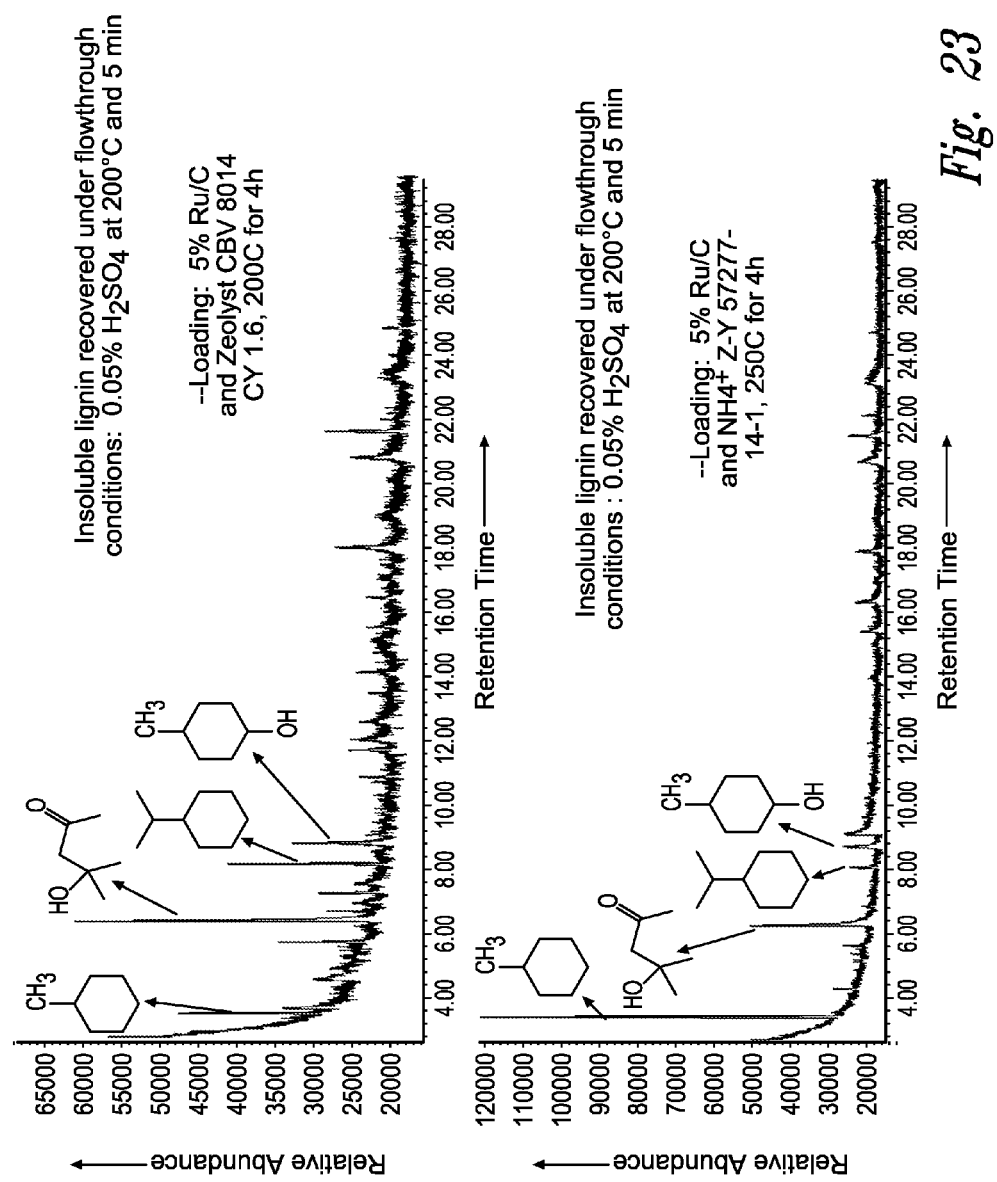
FIG. 23 shows, according to particular aspects, GC-MS analysis of HDO of insoluble lignin in hydrolysate.

The HDO of the insoluble lignin fragments in presence of solid acid zeolites ZEOLYST CBV 8014 CY 1.6 and NH4+ Z—Y 57277-14-1 with metal catalyst Ru/C (5% wt) resulted in more favorable products than that of model lignin substrate guaiacol. Under tested conditions, both C7 and C9 cyclohexane derivatives (jet fuel range hydrocarbons) were formed predominantly with the recovered lignin from biomass in comparison to the cyclohexanol intermediates as evident for model compounds (FIG. 23). Moreover, the results indicated that the formation of methyl-cyclohexane (C7) increased with the increase in acidity of the solid acid (e.g., NH4+Z—Y 57277-14-1) when used in combination with noble metal catalyst such as Ru/C (5% wt).

FIG. 23 shows, according to particular aspects, GC-MS analysis of HDO of insoluble lignin in hydrolysate.

Figure 24:
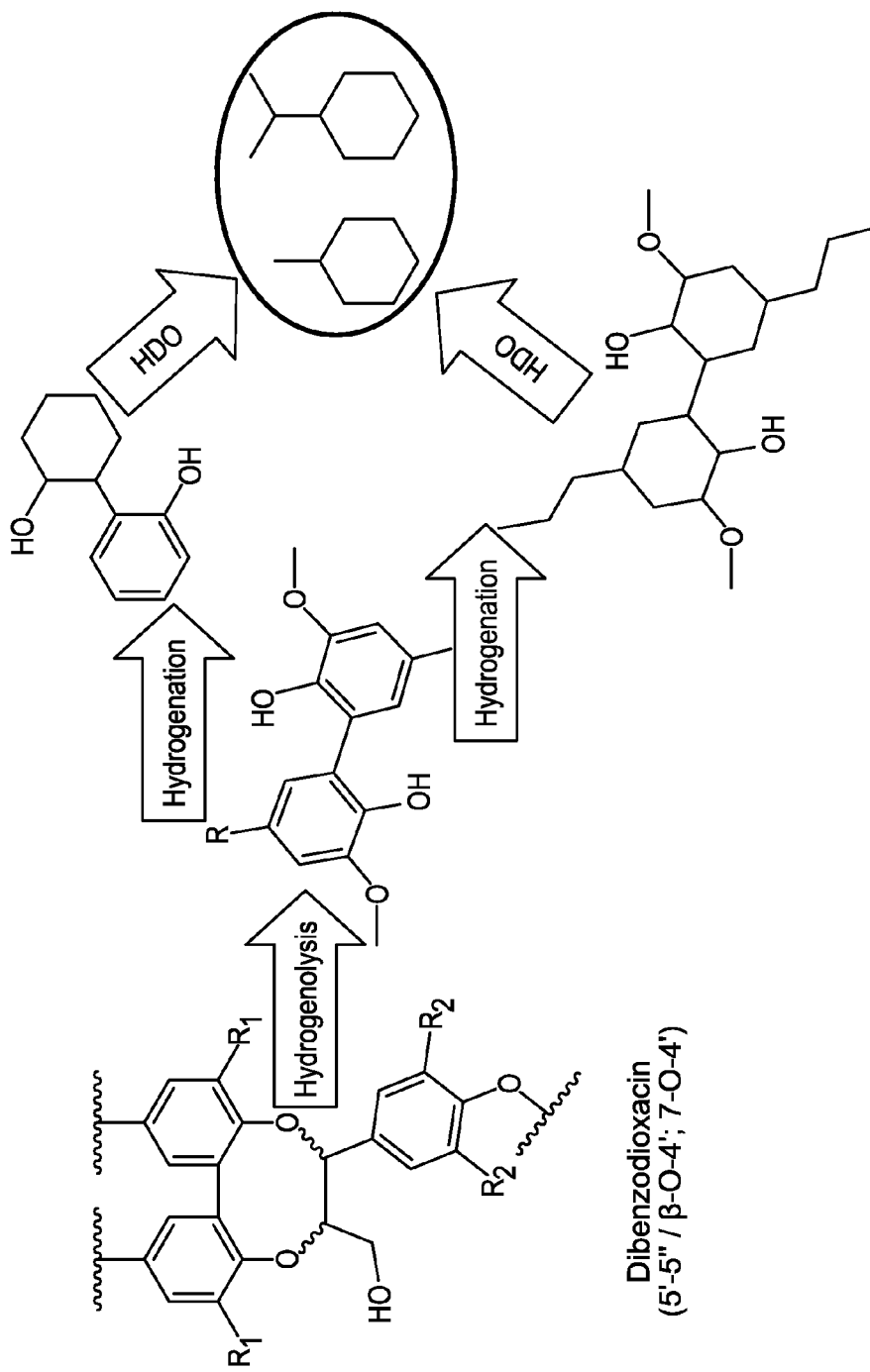
FIG. 24 shows, according to particular aspects, a possible pathway for formation of methyl-cyclohexane derivatives from depolymerized lignin.

Based on these results, the reaction pathway for formation of cyclohexane derivatives from lignin in presence of noble metal support catalysts/solid acids and hydrogen was indicated to proceed via simultaneous hydrogenation, hydrogenolysis and HDO of Dibenzodioxacin (5'-5"/β-O-4'; 7-O-4') structures generated from lignin during aqueous phase depolymerization process (FIG. 24).

Figure 25:
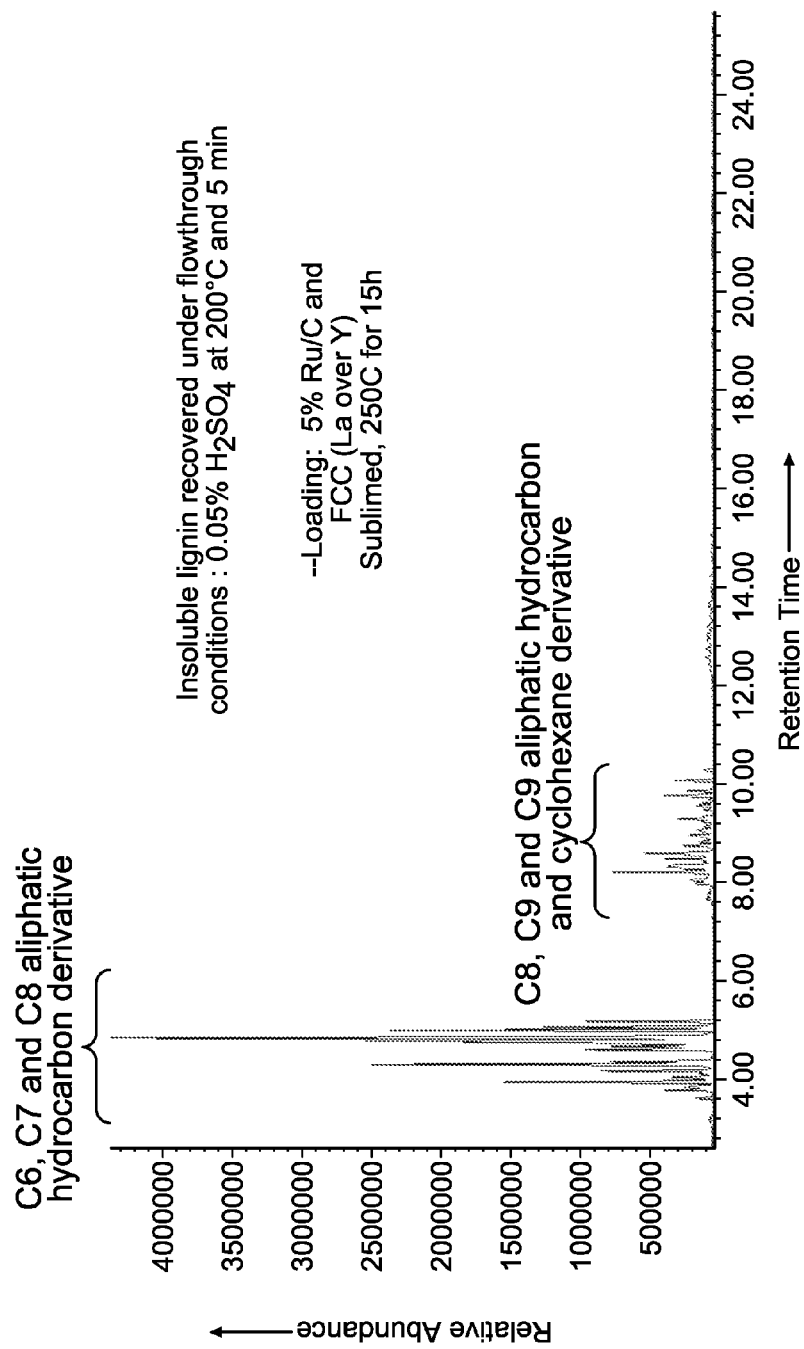
FIG. 25 shows, according to particular aspects, GC/MS chromatogram of hydrocarbon product mixtures after reaction of oligomeric lignin with Ru/C (5% wt) over FCC (La—Y) under hydrogen atmosphere (5-6 MPa) at 250° C.

Overall, the results evaluated the potential to obtain jet fuel from inexpensive lignin and have successfully demonstrated chemistry with both model compounds and real lignin. Applicants have achieved the HDO of oligomeric lignin (insoluble lignin recovered under 0.05% $H_2SO_4$ flowthrough conditions) to C6 to C10 aliphatic and cyclohexane hydrocarbon derivatives (FIG. 25). Reaction of oligomeric lignin was carried out in presence of Ru/C (5% wt) over highly acidic solid catalyst such as; FCC (La—Y), under hydrogen atmosphere (5-6 MPa) at 250° C. Under these conditions, de-aromatization of lignin with subsequent ring opening and deoxygenation to significant extent were observed for production of aliphatic hydrocarbons (C6 to C10). FIG. 25 shows, according to particular aspects, GC/MS chromatogram of hydrocarbon product mixtures after reaction of oligomeric lignin with Ru/C (5% wt) over FCC (La—Y) under hydrogen atmosphere (5-6 MPa) at 250° C.

In summary; appropriate catalyst and reaction condition for effective hydrogenation and HDO of lignin was established; HDO of inexpensive lignin to C7 and C9 cyclohexane derivatives (jet fuel range hydrocarbons) has been successfully demonstrated; and a possible reaction pathway for formation of methyl-cyclohexane derivatives (C7 and C9) during HDO of lignin was elucidated.

Example 6

State-of-Art NMR Techniques (e.g. HR-MAS NMR) to Probe Structural Features, Modification and Yields of Lignin Intermediates and Products Under Hydrogen and Metal Supported Solid Acid Catalyst Conditions were Achieved State-of-Art NMR Techniques (e.g. HR-MAS NMR) to Probe Structural Features, Modification and Yields of Lignin Intermediates and Products Under Hydrogen and Metal Supported Solid Acid Catalyst Conditions:

HR-MAS spectroscopy was exploited to profile the substrate (lignin) and product stream (hydrocarbons) in HDO reaction mixture comprised of solid support noble metal catalyst matrix using a T2 filter (CPMG pulse sequence). Such technique would essentially reduce broad signals arising from solid particles, such as carbon supported catalyst matrix and zeolites thereby, expediting superior analysis of soluble substrate/products in HDO reaction mixture without prior work-up and purification process.

Spin-lattice relaxation times (500 MHz) for the aromatic (located at 7.5 to 6.0 ppm) and aliphatic envelope (located at 1.5 to 5.0 ppm) of the HDO reaction mixture signal and the doped TMSP trimethyl signal of the internal standard (1S) using the standard Inversion Recovery method (using pre-saturation of the water peak) were chosen for acquisition to allow full relaxation of both aromatic/aliphatic signals and the reference signals between scans. $^1H$ HR-MAS spectra were recorded at 600 MHz on a Varian VNMRS spectrometer (599.7 MHz $^1H$ frequency) using a Varian gHX Nano Probe at a spinning speed of 3,000 Hz. To achieve lock, 4 μl of $D_2O$ was added to a 30 μl sample of HDO reaction mixture, which was then placed into a 4 mm glass microcell rotor (Varian-Agilent part number 0099259100). A spectral width of 8,000 Hz was used with an acquisition time of 1.5 s. A 90 degree read pulse was used and a total of 32 transients were signal averaged. The resulting FID was apodized with 0.2 Hz of exponential line broadening prior to Fourier Transformation to obtain the NMR spectra (FIG. 26).

Figure 26:
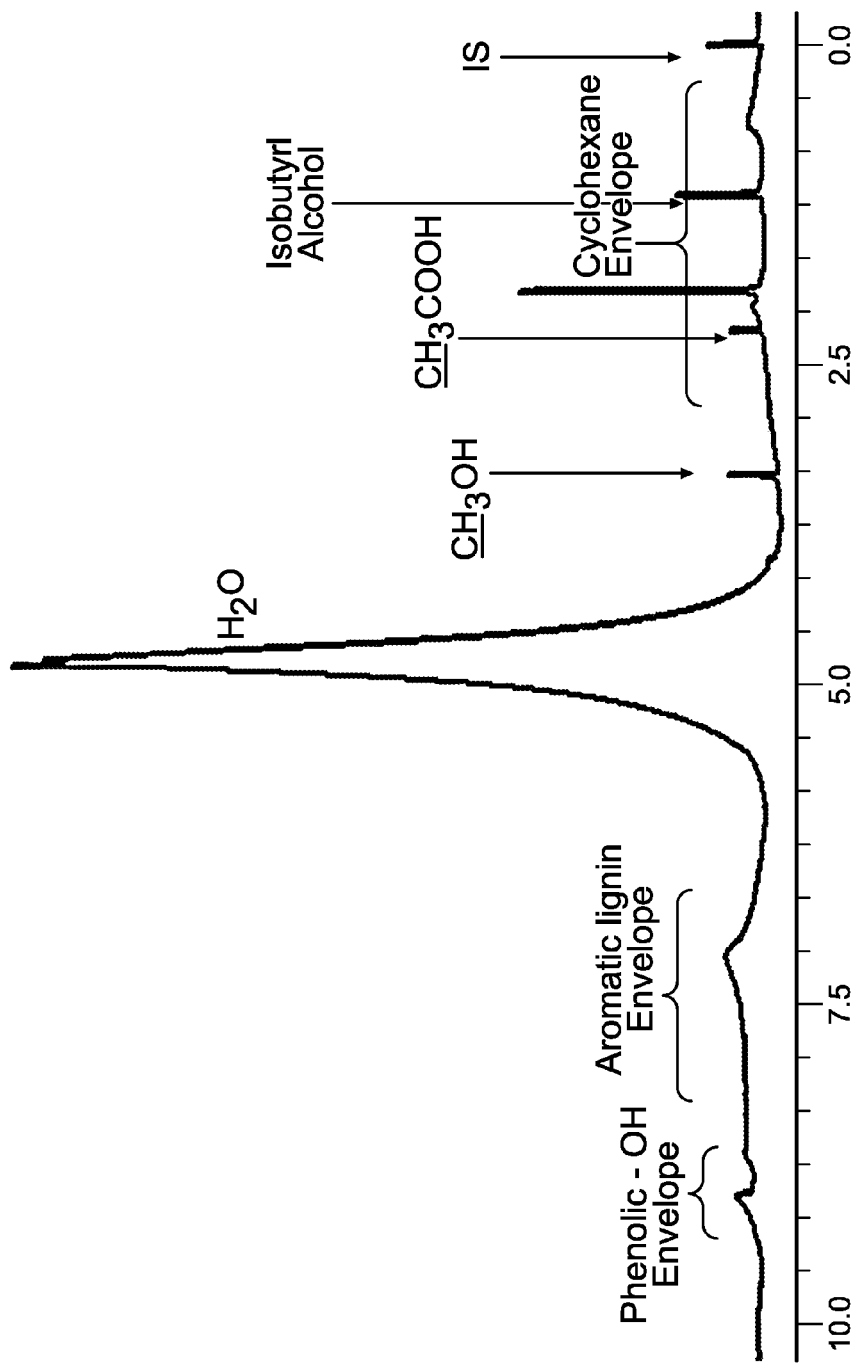
FIG. 26 shows, according to particular aspects, HR-MAS spectra of crude HDO lignin reaction mixture with catalyst matrix (Zeolyst NH4+Z—Y 57277-14-1 with metal catalyst Ru/C (5% wt)).

FIG. 26 shows, according to particular aspects, HR-MAS spectra of crude HDO lignin reaction mixture with catalyst matrix (Zeolyst NH4+ Z—Y 57277-14-1 with metal catalyst Ru/C (5% wt)).

As evident from the HRMAS spectra, light oxygenates such as; methanol, acetic acid, isobutyryl alcohol, etc. generated during HDO of lignin showed well resolved chemical resonance signal peaks due to their enhanced ability to merge into the solution from the catalyst matrix. However, under the tested condition, chemical shift values of unreacted lignin and cyclohexane derivatives were documented as unresolved broad envelope of resonance signal. This indicated adsorption of lignin and cyclohexane derivatives on catalyst matrix during NMR acquisition, resulting in unresolved peaks that were not able to merge out from broad signals arising from larger solid particle such as; carbon supported catalyst matrix and zeolites. To validate and use of HRMAS technique for calculating yield of lignin and hydrocarbon, our future work is directed towards applying new acquisition parameters with higher spinning speed (above 5000 Hz) and minor addition of additives (e.g. 3 to 5% (v/v) of deuterated pyridine) during NMR acquisition for complete release of substrate/products from the catalyst matrix to solution for better resolution and quantification of the desired resonance peaks from substrate/products. Aliphatic hydrocarbon and lignin intermediates will be quantified in HDO reaction mixture from the resultant HR-MAS spectra as below:

$$\text{Yield (\%)} = C[HC]/C[LI] \times 100 \qquad (1)$$

Where, $$C[LI] = \frac{I_{LI}\exp(t/T_{2.LI})}{I_{TMSP}\exp(t/T_{2.TMSP})} \frac{\eta TMSPM_{LI}}{Mrm} \qquad (2)$$

$$C[HC] = \frac{I_{HC}\exp(t/T_{2.HC})}{I_{TMSP}\exp(t/T_{2.TMSP})} \frac{\eta TMSPM_{HC}}{Mrm - HDO} \qquad (3)$$

Where, C[LI] and C[HC] represents the concentration of substrate lignin intermediates and product hydrocarbons in the reaction mixture (mg/g); IHC, ILI and ITMSP, the integral of the signal from the of aromatic, aliphatic and the substrate lignin, product hydrocarbon and external std. TMSP protons, respectively; t, the total duration of the CPMG sequence (s); T2.LI, T2.HC and T2.TMSP, the T2 values of H-1 of lignin, hydrocarbon and TSP protons in the samples (s), respectively; nTMSP, the amount of TSP present in the rotor (mol); MLI and MHC, the average molecular mass of lignin intermediates and product hydrocarbon (g/mol); and Mrm and Mrm-HDO, the fresh weight of the reaction sample (g) prior and after HDO reaction.

Example 7

Reaction Kinetics of Lignin Conversion and Product Formation Under Different HDO Conditions were Investigated Reaction Kinetics of Lignin Conversion and Product Formation Under Different HDO Conditions.

Lignin residue left after HDO in presence of solid acid Zeolyst NH4+ Z—Y 57277-14-1 with metal catalyst Ru/C (5% wt) were used to measure the kinetic behaviors of catalysis of lignin and to analyze conversion product distributions. Thus, intermediate solid samples were collected at various reaction time intervals (1, 2, 4, 6, 8, 10 and 15 hours, respectively) during HDO condition at 250° C. and were subsequently quantified (% of original lignin, i.e., amount of initial substrate prior to HDO, designated as 0h condition) by UV analysis as described herein above. Moreover, the HDO of lignin resulted in a weight loss of sample by releasing volatile products/gas and accumulating unreacted lignin in the solid mixture which is referred to as residual lignin. Consequently, the weight loss of reaction mixture was calculated by weighing the reactor after completion of reaction at chosen reaction time intervals 1, 2, 4, 6, 8, 10 and 15 hours, respectively. The difference in weight loss after completion of reaction (in each time intervals) from original amount of reaction mix was accounted for the content (in terms of % original lignin) of volatiles/gas formed during each HDO reactions.

Figure 27:
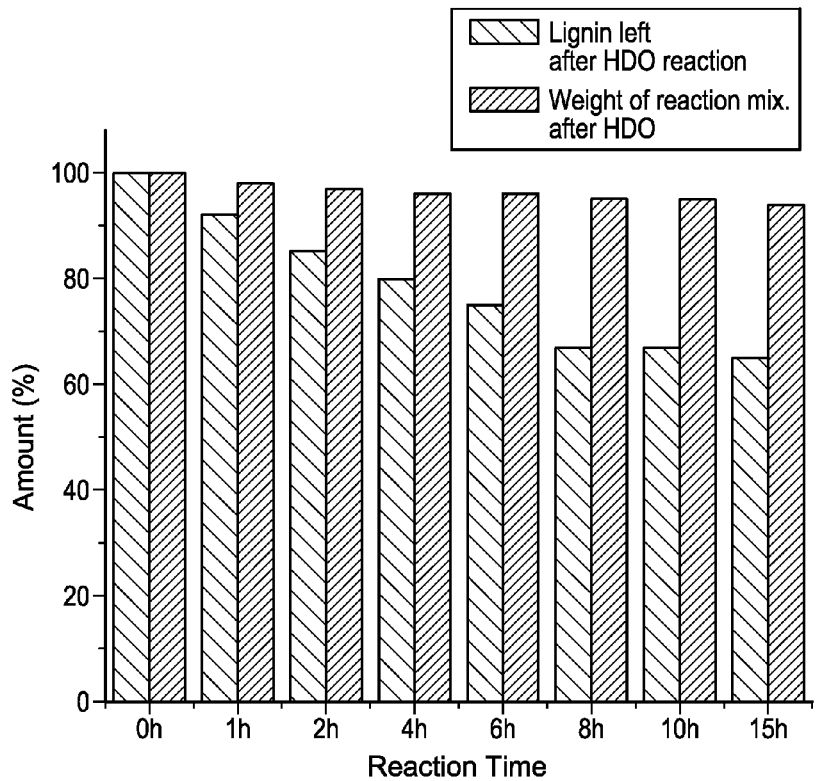
FIG. 27 shows, according to particular aspects, comparison of amount (%) weight loss of reaction mixture versus residual lignin at various time intervals during HDO process.

Finally, the conversion yield of hydrocarbon (cyclohexane derivatives) and light oxygenates were calculated from the difference of content of volatiles/gas from amount (%) of residual lignin during the course of each HDO reaction from time interval of 1 to 15 hours, respectively. The UV analysis of residual lignin at various time intervals were measured, calculated and plotted in comparison to amount weight loss of reaction mixture to examine how the concentration (%) of residual lignin changes with variation in HDO reaction as function of time (as shown in FIG. 27). FIG. 27 shows, according to particular aspects, comparison of amount (%) weight loss of reaction mixture versus residual lignin at various time intervals during HDO process.

Figure 28:
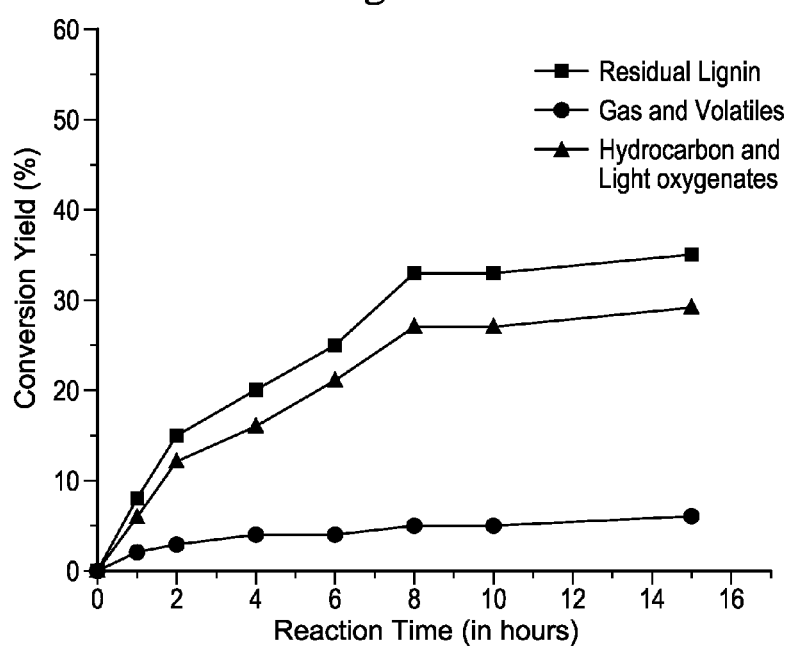
FIG. 28 shows, according to particular aspects, conversion yield profile of HDO products (hydrocarbon, light oxygenates and gas/volatiles) from lignin as function of reaction time (0 to 15 hour).

It is evident from FIG. 27, that with increasing HDO reaction time, the weight fraction of residual lignin (92% in 1 h to 65% in 15 h) and reaction mix (98% in 1 h to 94% in 15 h) in the samples decreased in comparison to original lignin and reaction mixture content (100%, 0h condition). In contrast, the hydrocarbon and light oxygenates yield (ranging >25% between 8 to 15 hours) from HDO of lignin increased with reaction time as shown in FIG. 28. FIG. 28 shows, according to particular aspects, conversion yield profile of HDO products (hydrocarbon, light oxygenates and gas/volatiles) from function of reaction time (0 to 15 hour). In this regard, 30-35 wt % conversion of original lignin to hydrocarbon/light oxygenate (~25%) and gas/volatiles (~5%) under HDO conditions in 8 to 15 hours can be achieved. The corresponding yields of HDO products were calculated as shown below:

$$\text{Total Yield of Hydrocarbon and Light oxygenates (\%)} =$$
$$[(\text{Conversion Yield of Lignin}) - (\text{Conversion Yield of Gas/Volatiles})]$$

Where, $$\text{Conversion Yield of Gas/Volatiles} =$$
$$\frac{[(\text{Wt. of Reactor before } HDO) - (\text{Wt. of Reactor after } HDO)]}{[(\text{Original Amount of Lignin before } HDO)]} \times 100\%$$

$$\text{Conversion Yield of Lignin} = (\text{Amount of Lignin Changes after } HDO/\text{Total Amount of Original Lignin}) \times 100\%$$

In summary: conversion yield of lignin, gas/volatiles and hydrocarbon/light oxygenates during HDO of lignin was verified; the kinetic behaviors of catalysis of lignin and data of conversion product distributions were derived; and reaction time course for effective hydrogenation and HDO of lignin was successfully investigated.

Example 8

Suitable Catalyst Matrix for High Lignin Conversion Yields Under Various HDO Reaction Conditions were Derived Derivation of Suitable Catalyst Matrix for High Lignin Conversion Yields Under Various HDO Reaction Conditions.

To study various HDO reaction conditions to alter the product selectivity, a series of noble metal supported catalyst (Rh, Pt, Ru) over solid acids zeolites (CBV 8014 CY 1.6 and NH4+ Z—Y 57277-14-1) were tested on the HDO of flowthrough lignin (see Table 13). Under HDO conditions at 200-250° C., 4-6 MPa $H_2$, and 6-12 h, both high molecular weight (0.05% $H_2SO_4$ at 200° C. for 5 min) and low molecular weight (water-only at 200° C. for 15 min) flowthrough lignin (as indicated in FIG. 14) were initially tested for their respective conversion yields. General procedure for HDO reactions and calculation of lignin conversion yields were carried out as described earlier herein. The corresponding conversion yields under the various tested conditions are depicted in Table 13. The results indicated that solid acids zeolite ZEOLYSTCBV 8014 CY 1.6 in presence of noble metal catalyst such as Rh, Pt, and Ru with carbon (C) support documented for lower conversion yields (10 to 20%) under HDO conditions at 200-250° C. for 6 to 8 hours with both low and high molecular weight flowthrough lignin. Moreover, no further enhancement in conversion yields was observed with increase of reaction time (to 12 hours) under these conditions. However, catalytic activity of the tested noble metal catalysts (Rh, Pt, and Ru over carbon support) augmented drastically with the use of NH4+ Z—Y 57277-14-1. As evident from Table 13, high HDO lignin conversion yields (45.3%) were obtained with low molecular weight (water-only at 200° C. for 15 min) flowthrough lignin in the presence of Ru/C with NH4+ Z—Y 57277-14-1 at 250° C. In contrast, comparable yields with relatively high molecular weight (0.05% $H_2SO_4$ at 200° C. for 5 min) flowthrough lignin were also obtained under HDO conditions with Pt/C (42.1%) and Rh/C (38.6%) in presence of NH4+ Z—Y 57277-14-1 at 250° C.

TABLE 13

Matrix catalyst system tested for recovered flowthrough lignin conversion under different HDO conditions.

| Metal Catalyst | Support | Solid acid | Lignin Substrate | Reaction Temperature/Time | $H_2$/ Press | Lignin Conversion (%) |
|---|---|---|---|---|---|---|
| Rh | Carbon | Zeolyst CBV 8014 CY. 1.6 | FLTR-lignin, 0.05% H2SO4, 200° C., 5 min | 200 C./6 h | 5-6 Mpa | 12.3% |
| Pt | Carbon | Zeolyst CBV 8014 CY. 1.6 | FLTR-lignin, 0.05% H2SO4, 200° C., 5 min | 200 C./6 h | 5-6 Mpa | 15.1% |
| Ru | Carbon | Zeolyst CBV 8014 CY. 1.6 | FLTR-lignin, 0.05% H2SO4, 200° C., 5 min | 200 C./6 h | 5-6 Mpa | 8.2% |
| Rh | Carbon | Zeolyst CBV 8014 CY. 1.6 | FLTR-lignin, 0.05% H2SO4, 200° C., 5 min | 250 C./8 h | 5-6 Mpa | 18.5% |
| Pt | Carbon | Zeolyst CBV 8014 CY. 1.6 | FLTR-lignin, 0.05% H2SO4, 200° C., 5 min | 250 C./8 h | 5-6 Mpa | 15.6% |
| Ru | Carbon | Zeolyst CBV 8014 CY. 1.6 | FLTR-lignin, 0.05% H2SO4, 200° C., 5 min | 250 C./8 h | 5-6 Mpa | 15.2% |
| Rh | Carbon | Zeolyst NH4+ Z-Y 577277 | FLTR-lignin, 0.05% H2SO4, 200° C., 5 min | 250 C./12 h | 4-5 Mpa | 38.6% |
| Pt | Carbon | Zeolyst NH4+ Z-Y 577277 | FLTR-lignin, 0.05% H2SO4, 200° C., 5 min | 250 C./12 h | 4-5 Mpa | 42.1% |
| Ru | Carbon | Zeolyst NH4+ Z-Y 577277 | FLTR-lignin, 0.05% H2SO4, 200° C., 5 min | 250 C./12 h | 4-5 Mpa | 32.7% |
| Ru | Carbon | Zeolyst CBV 8014 CY. 1.6 | FLTR-lignin, water-only, 200° C., 15 min | 200 C./8 h | 5-6 Mpa | 21.2% |
| Ru | Carbon | Zeolyst NH4+ Z-Y 577277 | FLTR-lignin, water-only, 200° C., 15 min | 250 C./12 h | 4-5 Mpa | 45.3% |

Determination of Product Selectivity Under Different HDO Conditions with High Lignin Conversion.

Figure 29:
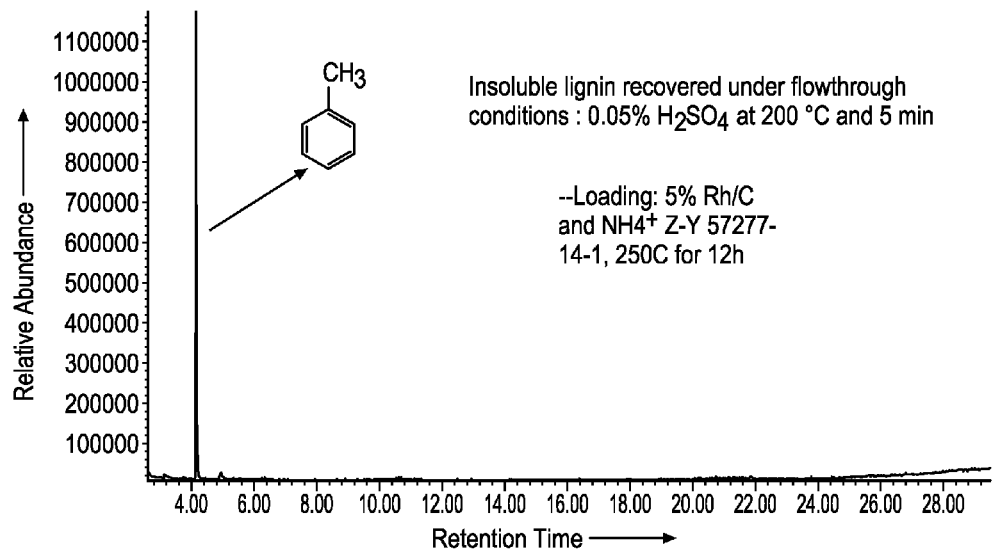
FIG. 29 shows, according to particular aspects, GC-MS analysis of HDO of flowthrough lignin (0.05% $H_2SO_4$ at 200° C. and 5 min) with Rh/C over zeolite NH4+ Z—Y 57277-14-1 catalyst matrix.
Figure 30:
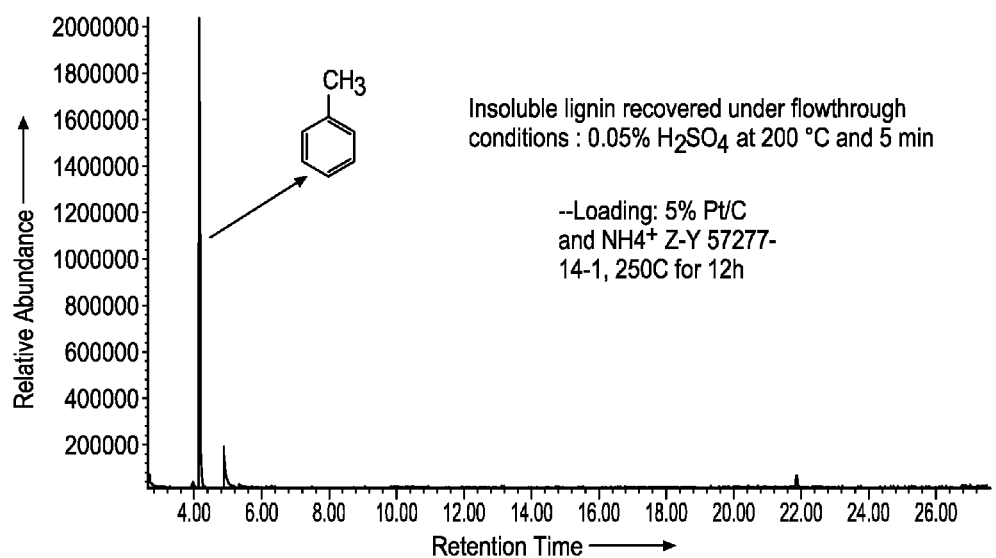
FIG. 30 shows, according to particular aspects, GC-MS analysis of HDO of flowthrough lignin (0.05% $H_2SO_4$ at 200° C. and 5 min) with Rh/C over zeolite NH4+ Z—Y 57277-14-1 catalyst matrix.

The GC-MS analysis of the recovered HDO treated flowthrough lignin (0.05% $H_2SO_4$ at 200° C. and 5 min) with Rh/C and Pt/C over zeolite NH4+ Z—Y 57277-14-1 catalyst matrix was preformed (FIGS. 29 and 30). FIG. 29 shows, according to particular aspects, GC-MS analysis of HDO of flowthrough lignin (0.05% $H_2SO_4$ at 200° C. and 5 min) with Rh/C over zeolite NH4+ Z—Y 57277-14-1 catalyst matrix. FIG. 30 shows, according to particular aspects, GC-MS analysis of HDO of flowthrough lignin (0.05% $H_2SO_4$ at 200° C. and 5 min) with Rh/C over zeolite NH4+ Z—Y 57277-14-1 catalyst matrix.

Figure 31:
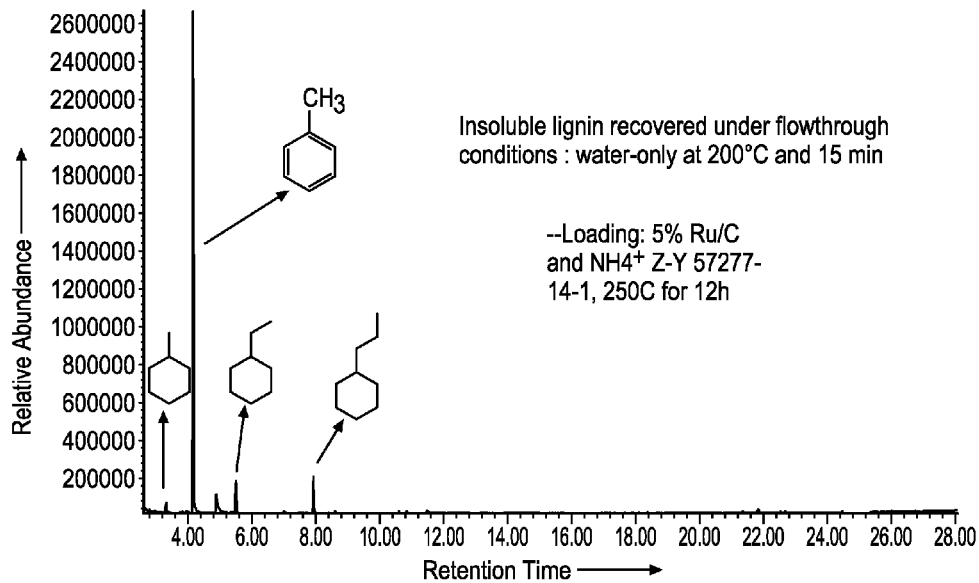
FIG. 31 shows, according to particular aspects, GC-MS analysis of HDO of flowthrough lignin (water-only at 200° C. and 15 min) with Ru/C over zeolite NH4+ Z—Y 57277-14-1 catalyst matrix.

Results indicated that hydrogenolysis of C—O—C lignin bonds and deoxygenation of C—O bonds occurred under these HDO conditions without losing aromaticity to produce aromatic hydrocarbon (toluene) as the major product as shown in FIGS. 29 and 30, respectively. However, GC-MS analysis of the recovered HDO treated flowthrough lignin (water-only at 200° C. and 15 min) with Ru/C over zeolite NH4+ Z—Y 57277-14-1 catalyst matrix indicated formation of both HDO and hydrogenation products (aromatic ring reduction). Under such conditions, formations of various cyclohexane-derived products were also observed, providing evidence of conversion of lignin to C7 to C9 aromatic and aliphatic hydrocarbon derivatives (FIG. 31). FIG. 31 shows, according to particular aspects, GC-MS analysis of HDO of flowthrough lignin (water-only at 200° C. and 15 min) with Ru/C over zeolite NH4+ Z—Y 57277-14-1 catalyst matrix.

The product distribution of HDO treated 0.05% $H_2SO_4$ flowthrough lignin (at 200° C. and 5 min) with both 5% Rh/C and Pt/C over NH4+ Z—Y 57277-14-1 catalyst matrix showed higher product selectivity for aromatic hydrocarbon (toluene) (98% and 95% respectively) in comparison to that of water-only flowthrough lignin (at 200° C. and 15 min) with 5% Ru/C over zeolite NH4+ Z—Y 57277-14-1 catalyst matrix (90% product selectivity). However, the product selectivity for formation of cyclohexane derivatives with water-only flowthrough lignin (at 200° C. and 15 min) was higher in comparison to 0.05% $H_2SO_4$ flowthrough lignin either with Rh/C or Pt/C over NH4+ Z—Y 57277-14-1 catalyst matrix, as depicted in Table 14. This indicated that the higher reactivity and catalytic activity of water-only flowthrough lignin intermediates to undergo both deoxygenation and hydrogenation reactions in presence of 5% Ru/C over zeolite NH4+ Z—Y 57277-14-1 catalyst matrix to form a wide array of aromatic and aliphatic hydrocarbon with product selectivity range from 5% to 90%.

TABLE 14

Product distribution and selectivity of HDO treated flowthrough lignin with noble metal catalyst matrix

| Catalyst | Feed and T (° C.) | Lignin Conv.(%) | Selectivity (%) methyl-phenyl | methylcyclohexane | ethylcyclohexane | propylcyclohexane |
|---|---|---|---|---|---|---|
| 5% Rh/C NH$_4^+$ Z—Y | FLTR-lignin (0.05% H$_2$SO$_4$, 200° C., 5 min) @ 250° C. | 38.6 | 98 | 0 | 0 | 0 |
| 5% Pt/C NH$_4^+$ Z—Y | FLTR-lignin (0.05% H$_2$SO$_4$, 200° C., 5 min) @ 200° C. | 42.1 | 95 | 0 | 0 | 0 |
| 5% Ru/C NH$_4^+$ Z—Y | FLTR-lignin (water-only, 200° C., 15 min) @ 250° C. | 45.3 | 90 | 1.2 | 3.5 | 5.1 |

In summary: demonstrated generation of hydrocarbon derivatives (aromatic/aliphatic) from both low and high molecular weight flowthrough lignin under HDO conditions; high yields of lignin conversion (38%~45%) with excellent selectivity of HDO aromatic hydrocarbon products (90%~98%) were achieved; the molecular weight and reactivity of flowthrough lignin were determined as key factors for catalyst selection for HDO of lignin in presence of hydrogen; and catalysts were successfully designed and were found to be selective, active and stable.

Example 9

Simultaneous Solubilization, Depolymerization, and Hydrodeoxygenation Process

Particular aspects provide for a simultaneous solubilization, depolymerization, and hydrodeoxygenation process comprising integration of lignin production with hydrodeoxygenation (HDO) in a single reactor, to provide for directly producing cycloalkanes from lignocellulosic biomass (FIG. 32). FIG. 32 shows, according to particular aspects, a schematic of a method and single reactor system for the simultaneous-solubilization, depolymerization, and hydrodeoxygenation process.

In certain aspects, this process is carried out in a batch and/or flowthrough reactor to perform three reactions: solubilization of lignin polymers; depolymerization of the lignin polymers to the low degree oligomers and/or monomers; and hydrogenation and HDO of the lignin monomers to directly produce cycloalkanes.

Example 10

An Advanced Flowthrough System to Prepare Solubilized Lignin Fraction with a Range of Features from Cellulosic Biomass as Intermediates for Further Conversion to Hydrocarbons has been Developed An Advanced Flowthrough System to Prepare Solubilized Lignin Fraction with a Range of Features from Cellulosic Biomass as Intermediates for Further Conversion to Hydrocarbons.

Figure 33:
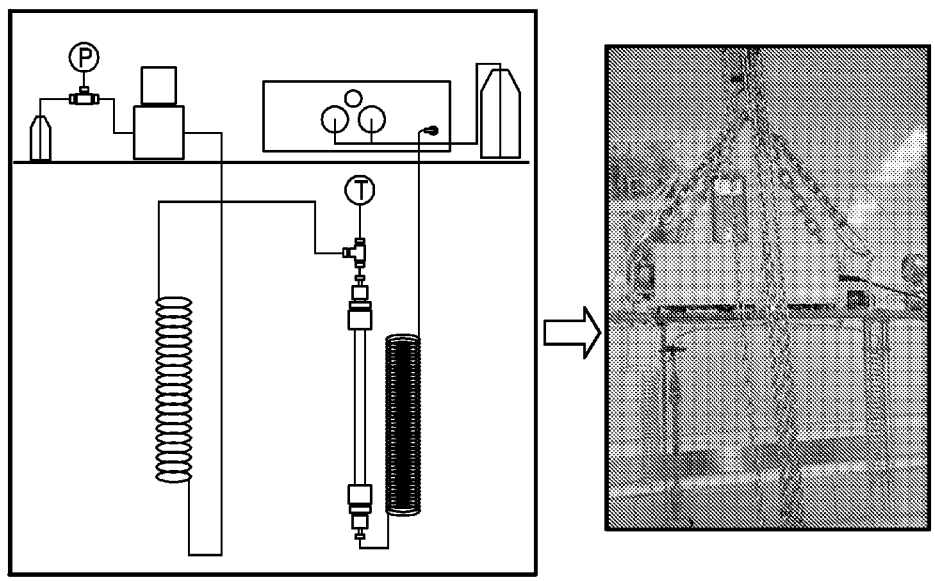
FIG. 33 shows, according to particular aspects, a schematic diagram and picture of the advanced flowthrough reactor system built at WSU (Dr. Bin Yang's lab).

An exemplary flowthrough reactor (FIG. 33) and are carrying out wide-range of experiments under various severity parameter conditions using different combination of temperature and time for maximizing the selective depolymerization and solubilization of lignin fraction in aqueous phase. The schematic diagram and picture of the flowthrough reactor is as shown below in FIG. 33. FIG. 33 shows, according to particular aspects, a schematic diagram and picture of the advanced flowthrough reactor system built at WSU (Dr. Bin Yang's lab).

Material and Methods

Poplar biomass samples were cut to shorter lengths, then grounded to a particle size of 200-400 μm with a laboratory mill (model:MF10 basic, IKA® works, Inc, NC, Wilmington) and then passed through a 20-40 mesh to obtain particles utilized for solubilization of biomass lignin under advanced flowthrough conditions. 0.5 g of the resulting poplar samples were loaded to the tubular reactor (1.3 cm i.d.×15.2 length with an internal volume of 14.3 mL), which was then connected to the advanced flowthrough system (FIG. 33). Distilled water (50 mL) at room temperature was pumped through the reactor to purge air and the loaded biomass was completely wetted by this procedure. The reactors were heated to under target temperature range of 220-260° C. in a 4-kW fluidized sand bath (model SBL-2D, Omega engineering, Inc., Stamford, Conn.), at flow rate of 25 mL/min (water or 0.05% H$_2$SO$_4$). Finally, back pressure of 2.3 Mpa at 220° C., 3.4 Mpa at 240° C., 4.0 Mpa at 250°

C. and 4.7 Mpa at 260° C., were set up respectively for both water only and 0.05% $H_2SO_4$ flowthrough conditions. Each of complete flowthrough tests was classified in three different time zones to describe the mode and pattern of lignin solubilzation under the tested flowthrough conditions. The first accounted for time period of heating up the tubular reactor to the desired temperature (220-260° C.) which was termed as 'heating' zone, which usually took 2 mins in most cases. Next, a 'reaction' zone was assigned in which the reactor was kept in the set temperature for certain time interval (0 to 10 mins). Finally, the third zone described for the quenching the reactor in cold water. This zone was denoted as 'cooling' which usually needed 2 mins to cool down the reactor to room temperature. The dissolved lignin content in the hydrolysate collected under these various flowthrough conditions were determined according to NREL Laboratory Analytical Procedure (LAP) of "Determination of Structural Carbohydrates and Lignin in Biomass" (NREL, 2008).

Results

Solubilization of Lignin Under Water-Only Flowthrough Conditions.

Figure 34:
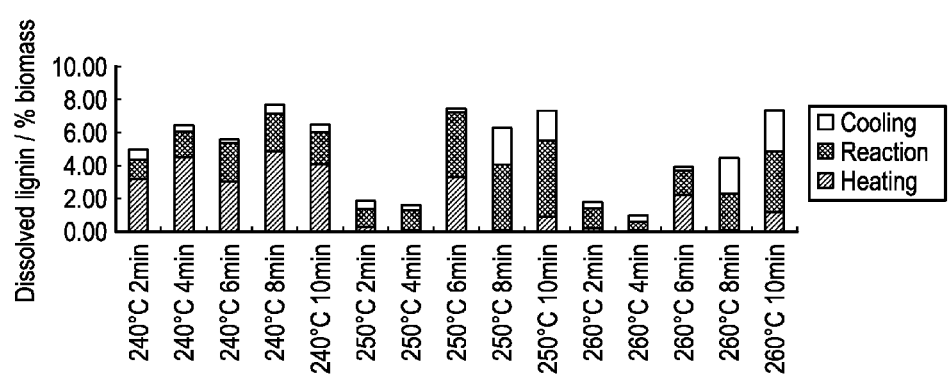
FIG. 34 shows, according to particular aspects, percentage of dissolved lignin in biomass under 240° C., 250° C. and 260° C. for 2 min, 4 min, 6 min, 8 min, and 10 min, reaction time respectively, under water only flowthrough conditions.

The trends for solubilization of lignin in the hydrolyzates during different zones (Heating, Reaction and Cooling) under water-only flowthrough conditions are depicted in FIG. 34. FIG. 34 shows, according to particular aspects, percentage of dissolved lignin in biomass under 240° C., 250° C. and 260° C. for 2 min, 4 min, 6 min, 8 min, and 10 min, reaction time respectively, under water only flowthrough conditions. The maximum yield of dissolved lignin was achieved under 240° C. for 8 min and was calculated to be ~7.72% of biomass. In contrast, the least lignin solubilization (approximately 0.99% of total biomass) was documented under flowthrough conditions at 260° C. with reaction time of 4 mins. It is evident from FIG. 34 that at 240° C., solublization of lignin mostly occurred in the 'heating' zone. While, under 250° C. and 260° C., most lignin was removed and solubilized under 'reaction' period, with only minimal portion of lignin was dissolved in 'heating' and/or 'cooling' zone during the flowthrough conditions. These observations strongly suggested that temperature and reaction time had significant effects on the release and subsequent solublization of lignin during flowthrough pretreatment. It is also interesting to note that the content (percentage) of dissolved lignin under different temperature (240° C. to 260° C.) varied mainly in the 'heating' zone. Such variations were predominant at higher temperature range (e.g. 250° C. and 260° C.) which accounted for gradual increase in lignin solublization followed by sudden decrease of lignin content at intervals with respect to increasing reaction time. The occurrence of such phenomenon indicated the possibility for reaction shift from lignin depolymerization to counterproductive condensation/repolymerization, thereby limiting the solubilization process of depolymerized lignin fractions. Thus, it is evident that under water-only flowthrough conditions, productive lignin depolymerization reactions with enhanced solubilization of lignin occurred during the 'heating' zone at 240° C. However, the same was feasible at 250° C. and 260° C. in the 'reaction' zone. These results lay the basis for tuning the flowthrough reaction parameters with desired solublization conditions to achieve various lignin-derived soluble fractions.

Figure 35:
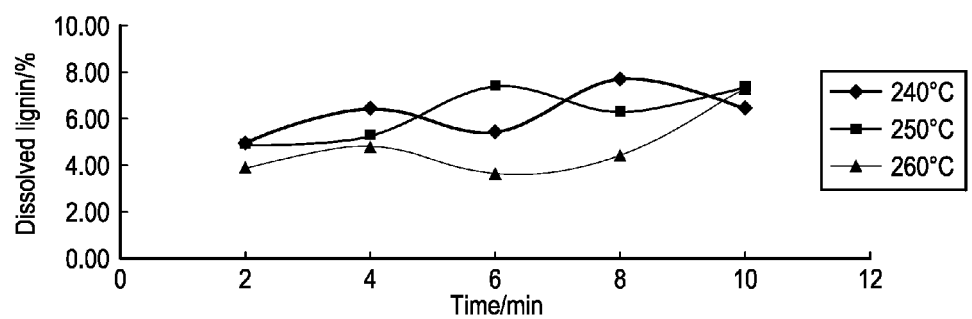
FIG. 35 shows, according to particular aspects, percentage of total dissolved lignin content at 240° C., 250° C. and 260° C. under water-only flowthrough reactions.

FIG. 35 shows the variation of total dissolved lignin under flowthrough conditions at various temperatures ranging from 240° C. to 260° C., while accounting for the changes by combination of the heating, reaction, and cooling zones. FIG. 35 shows, according to particular aspects, percentage of total dissolved lignin content at 240° C., 250° C. and 260° C. under water-only flowthrough reactions. As shown in FIG. 35, both depolymerization and condensation reactions occurred progressively during the lignin degradation process under flowthrough conditions. Thus there was no stable trend for solubilization of lignin with the progression of reaction time. For example, at 240° C., with the increase in reaction time, dissolved lignin content increased first and then decreased from 4 to 6 min. However, it increased to maximum at 8 min reaction time and then decreased eventually at 10 mins.

Figure 36:
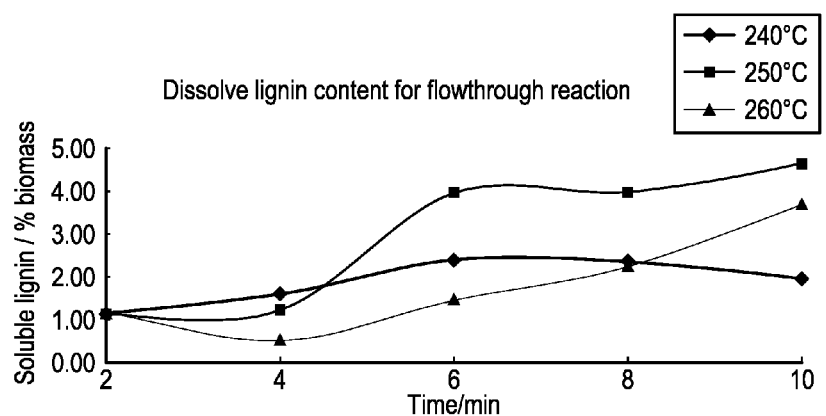
FIG. 36 shows, according to particular aspects, dissolved lignin content (in percentage) within the reaction zone at all temperatures (240° C., 250° C. and 260° C.).

In the reaction zone, soluble lignin content at 250° C. was found to be more in comparison to that at 240° C. and 260° C. (FIG. 36). FIG. 36 shows, according to particular aspects, dissolved lignin content (in percentage) within the reaction zone at all temperatures (240° C., 250° C. and 260° C.). This indicated that reactions at higher temperature not only lead to enhanced depolymerization/fractionation of lignin but also cause resulting dissolved lignin fractions to repolymerize back via condensation reactions. At 240° C., with the increasing reaction time, dissolved lignin increased initially and declined progressively with increase in reaction time. However, at 250° C., during 2 min to 4 min, content of soluble (dissolved) lignin remained constant and increased gradually, reaching maximum of soluble lignin content at 6 min, that remained almost constant with increase in reaction time. By comparison, the dissolved lignin content increased from 4 min to 10 min at 260° C., after small decrease from 2 min to 4 min reaction time.

Figure 37:
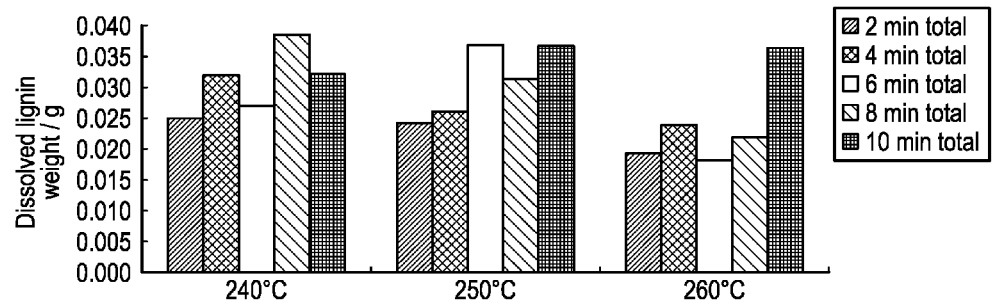
FIG. 37 shows, according to particular aspects, weight of dissolved lignin released under 240-260° C. (Water-only).

The total weight of released lignin in hydrolysate under water-only conditions is shown in FIG. 37. FIG. 37 shows, according to particular aspects, weight of dissolved lignin released under 240-260° C. (Water-only). The maximum yield of dissolve lignin was approximately 39 mg with respect to 0.5 g of original biomass which was achieved under 240° C. at 8 min reaction time.

Solubilization of Lignin Under 0.05% $H_2SO_4$ Flowthrough Conditions.

Figure 38:
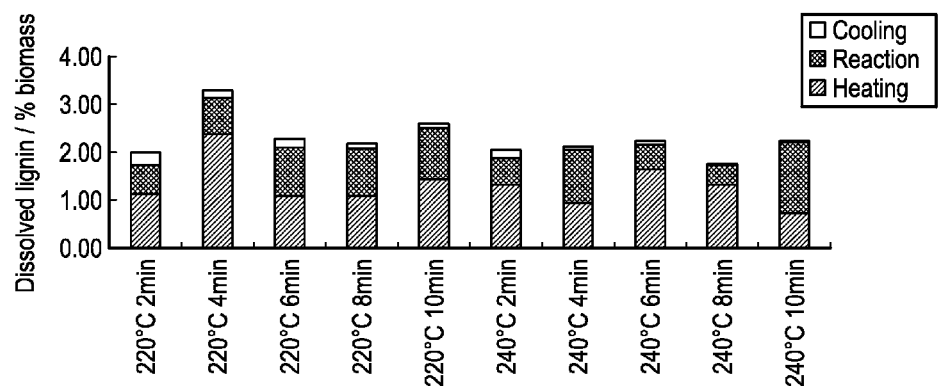
FIG. 38 shows, according to particular aspects, percentage of soluble lignin content in hydrolyzates under 0.05% $H_2SO_4$ flowthrough conditions at 220° C. and 240° C. for heating, reaction and cooling zones, respectively.

For dilute acid flowthrough reaction, results are shown in FIG. 38. FIG. 38 shows, according to particular aspects, percentage of soluble lignin content in hydrolyzates under 0.05% $H_2SO_4$ flowthrough conditions at 220° C. and 240° C. for heating, reaction and cooling zones, respectively.

The maximum dissolved lignin content was found to be 3.3% of biomass which appeared at 220° C. within reaction time of 4 min. In addition, under these conditions most of the soluble lignin was released during the 'heating' zone. Compared to water-only flowthrough conditions, lignin was generally less dissolved under 0.05% $H_2SO_4$ flowthrough conditions.

Figure 39:
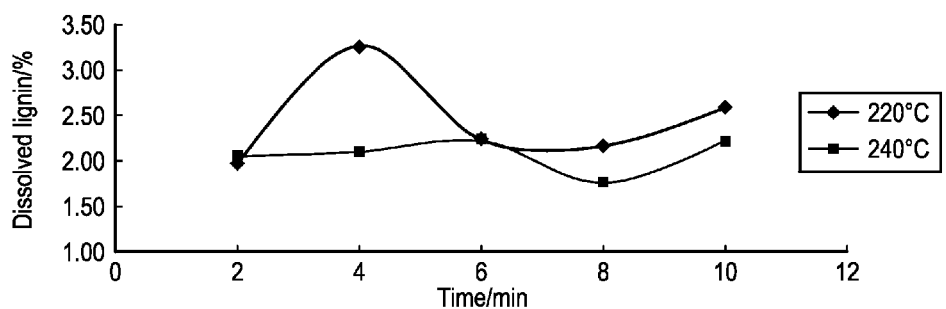
FIG. 39 shows, according to particular aspects, overall dissolved lignin content at 220° C. and 240° C. under 0.05% $H_2SO_4$ flowthrough conditions.

The contents of total dissolved lignin in different time zones (heating+reaction+cooling) under 0.05% $H_2SO_4$ flowthrough conditions are shown in FIG. 39. FIG. 39 shows, according to particular aspects, overall dissolved lignin content at 220° C. and 240° C. under 0.05% $H_2SO_4$ flowthrough conditions. At 220° C., the soluble lignin content increased first (4 mins) and then declined with increase in reaction time, which further remained almost unchanged from 6 to 10 mins. In contrast, dissolved lignin content at 240° C., remained constant from 2 min to 6 min of reaction time, but displayed a fluctuation (decrease and then increase) in the reaction time range from 6 to 10 mins.

Figure 40:
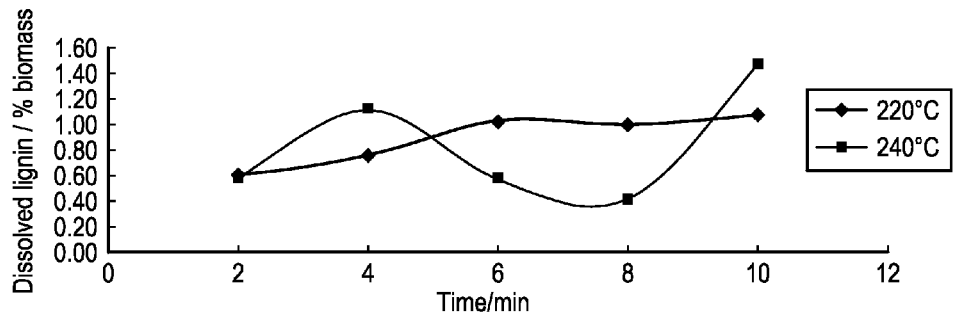
FIG. 40 shows, according to particular aspects, dissolved lignin content within reaction time 220° C. and 240° C. under 0.05% $H_2SO_4$ flowthrough conditions.

The dissolved lignin content within reaction zone at 220° C. and 240° C. is shown in FIG. 40. FIG. 40 shows, according to particular aspects, dissolved lignin content within reaction time under 220° C. and 240° C. At 220° C., with the increase in reaction time, the dissolved lignin content (in percentage) increases and then remains constant after 6 min. As lignin degradation is not significant at relatively lower temperature (220° C.), the dissolved lignin content could reach ~1.03% of biomass within 6 min reaction time, thus remained constant even after increased reaction time. With the increase reaction temperature (240° C.), the dissolved lignin content fluctuated (decrease and then increase) initially, however increased finally (from 8 min) within the reaction time range from 4 to 10 min.

Figure 41:
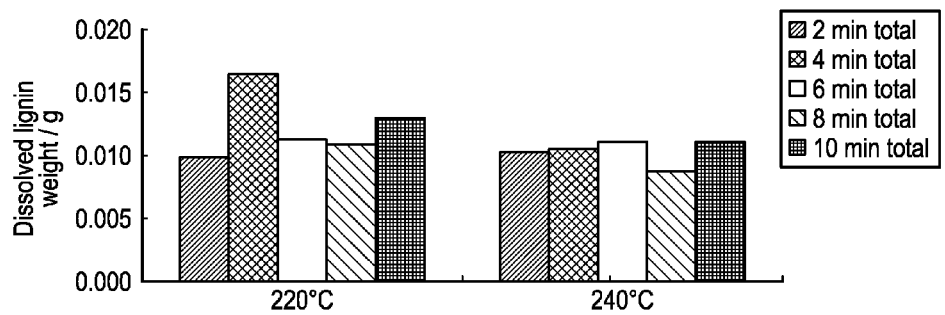
FIG. 41 shows, according to particular aspects, weight of total dissolved lignin released at 220° C. and 240° C. (0.05% $H_2SO_4$ flowthrough conditions).

The maximum dissolved lignin content under 0.05% $H_2SO_4$ flowthrough conditions was 3.3% (17 mg) of original biomass (0.5 g), which was achieved at 220° C. within reaction time of 4 min (FIG. 41).

FIG. 41 shows, according to particular aspects, weight of total dissolved lignin released at 220° C. and 240° C. (0.05% $H_2SO_4$ flowthrough conditions).

In summary: described the mode and pattern of lignin solubilzation under various flowthrough conditions; advanced flowthrough conditions were established for high solubilization of biomass derived lignin; and yields of soluble lignin content were successfully determined under advanced flowthrough conditions.

Example 11

Catalysts that Convert Soluble Lignin/Model Compounds to Hydrocarbons (Cyclohexanol/Cyclohexanone and/or Alkanes) with High Yield were Designed Overview.

This Example describes developing and testing new catalyst system for the conversion of lignin to hydrocarbons (cyclohexanol/cyclohexanone and/or alkanes). For the efficient use of both soluble monomer and oligomers derived from lignin, low-cost noble support catalysts and an environmentally friendly solid acid, e.g., Zeolyst, was used to convert the lignin derived model compounds (e.g., guaiacol) to hydrocarbons and methanol. To find a suitable green solid acid to replace mineral liquid acid, a series of liquid and solid acids were tested for the HDO of lignin model compounds in the presence of hydrogen.

Materials and Methods

Figure 42:
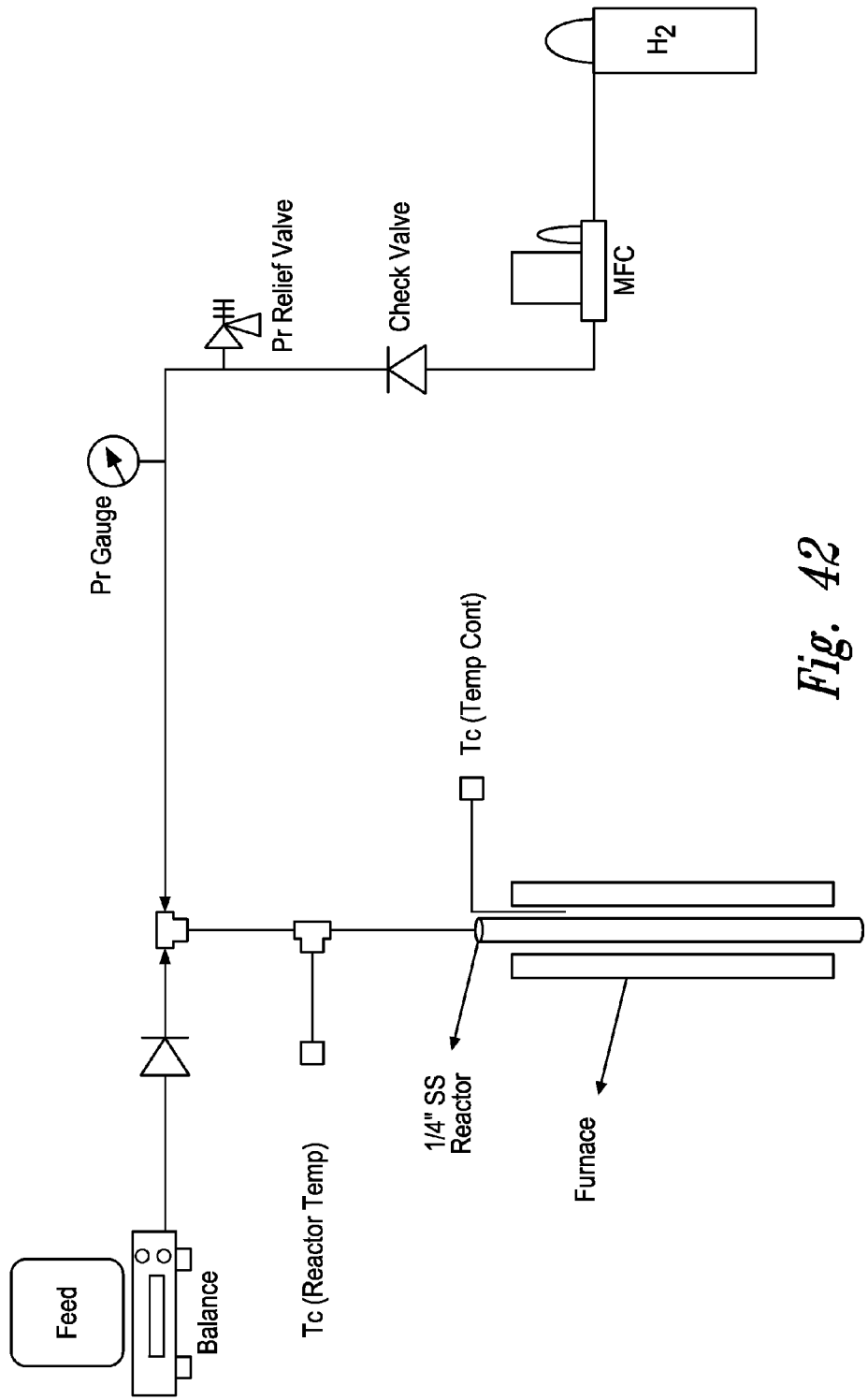
FIG. 42 shows, according to particular aspects, a schematic diagram and design of the hydrotreating batch reactor developed at WSU.

A hydrotreating batch reactor (FIG. 42) was constructed to explore noble metal catalyst for hydrogenation/HDO of depolymerized lignin and model lignin compounds. The schematic diagram and design of the hydrotreating batch reactor is as shown below in FIG. 42.

Results

Figure 43:
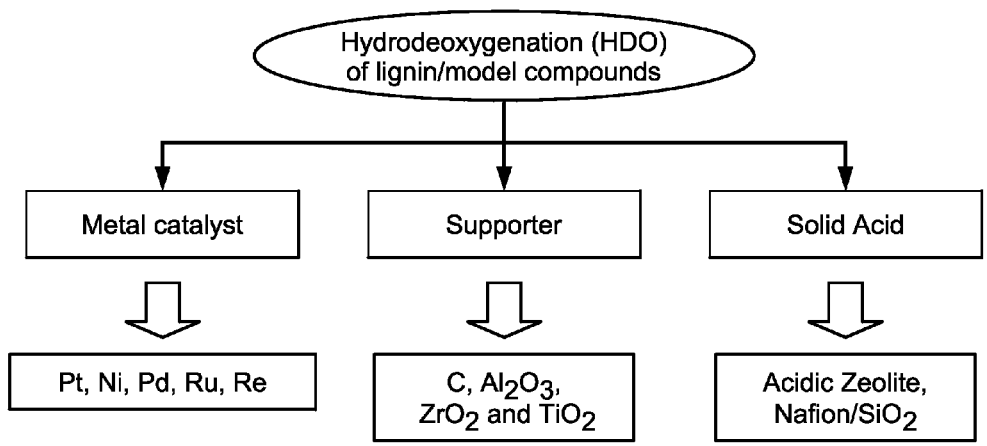
FIG. 43 shows, according to particular aspects, exemplary catalyst systems for HDO of depolymerized lignin entities.

Combination of various noble metal catalysts, such as Pt, Pd, Ru, and Re etc., with solid supports (including $Al_2O_3$, C, $ZrO_2$ and $TiO_2$) in presence of a series of liquid and solid acids were considered for testing hydrogenation/HDO of lignin/model compounds (FIG. 43). FIG. 43 shows, according to particular aspects, exemplary catalyst systems for HDO of depolymerized lignin entities. Under our current tested conditions for noble metal catalyst, Ru over carbon (3% and 5% wt) in presence of acidic Zeolyst CBV 8014 CY 1.6 and NH4+ Z—Y 57277-14-1 catalyst was found to be much favorable for hydrogenation and subsequent HDO of lignin compounds. In particular aspects, the catalytic activity of Ru/C and Pt/C metal support in various solid acid catalysts are used to evaluate the catalytic turn-over for efficient HDO of lignin compounds.

Figure 44:
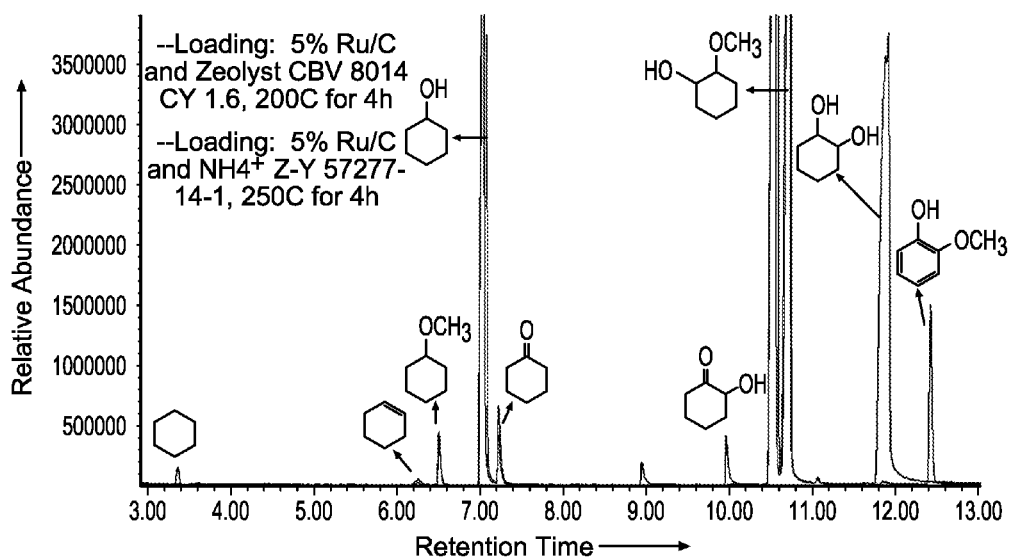
FIG. 44 shows, according to particular aspects, GC-MS analysis of reaction mixture from hydrogenation and HDO of guaiacol.

In a particular test, guaiacol (1 mmol), Zeolyst (15-20 wt %, 40-50 mg), 5% Ru/C (80 mg) and $H_2O$ (1.5 ml) were added to the batch reactor (reactor volume, 24.8 ml). After purging the reactor with $H_2$, the reaction were carried out with 4-5 MPa $H_2$ (room temperature) at 473K for 3 to 4 h. After reaction, the reactor was immersed in a cold water bath. Acetone (10 ml) was added to recover the reaction mixture, filtered and analyzed by GC and GC-MS (FIG. 44). FIG. 44 shows, according to particular aspects, GC-MS analysis of reaction mixture from hydrogenation and HDO of guaiacol. The calculations of conversion and selectivity were based on mol carbon basis as depicted below:

Conversion=(amount of raw material changes/total amount of aromatic compounds in the starting material)×100%;

Selectivity=(C atom in each product/total C atoms in the products)×100%.

The catalytic activities of the solid acid zeolite (e.g., ZEOLYST CBV 8014 CY 1.6 and NH4+ Z—Y 57277-14-1) were evaluated in the conversion of guaiacol to cyclohexane derivatives in presence of Ru/C (5% wt) under hydrogen. Under the tested conditions, conversion of guaiacol with both CBV 8014 CY 1.6 and NH4+ Z—Y 57277-14-1 reached ~100% and the product mixtures were mainly comprised of cyclohexanol/methoxycylcohexanol (ranging from 40% to 70%), with low concentrations of cyclohexanone (8% to 5%) and cyclohexene/cyclohexane derivatives (5% to 1.5%). However, the selectivity for formation of dehydrogenated products (cyclohexenes and cyclohexane derivatives) with solid acid NH4+ Z—Y 57277-14-1 was found to be much higher (4.8%) in comparison to solid acid CBV 8014 CY 1.6 (1.4% selectivity). This indicated that the deoxygenation degree of lignin model compound guaiacol increased with the increase in acidity of the solid acid (e.g., NH4+ Z—Y 57277-14-1) when used in combination with noble metal catalyst such as Ru/C (5% wt). Thus, hydrodeoxygenation of guaiacol to finally form cyclohexane essentially depended on the dehydration ability of solid acid towards cyclohexanol intermediate resulted from hydrogenation and deoxygenation of guaiacol in presence of noble metal support catalysts and hydrogen (Table 7).

TABLE 7

Product distribution of lignin model compound: hydrogenation and HDO of guaiacol

| Catalyst | Feed and T (° C.) | Guiaiacol Conv. (%) | cyclohexanol | methoxy-cyclohexanediol | methoxy-cyclohexanol | methoxy-cyclohexane | cyclohexanone | hydroxy-cyclohexanone | cyclohexene | cyclohexane |
|---|---|---|---|---|---|---|---|---|---|---|
| 5% Ru/C CBV 8014 | 0.5 mmol at 200° C. | 96.3 | 15.3 | 73.1 | 0 | 5.4 | 4.9 | 0 | 1.2 | 1.4 |

TABLE 7-continued

Product distribution of lignin model compound: hydrogenation and HDO of guaiacol

| Catalyst | Feed and T (° C.) | Guiaiacol Conv. (%) | Selectivity (%) | | | | | | | |
|---|---|---|---|---|---|---|---|---|---|---|
| | | | cyclohexanol (OH) | 2-methoxycyclohexanol (HO, OCH₃) | cyclohexane-1,2-diol (OH, OH) | 2-methoxycyclohexanone (OCH₃, =O) | cyclohexanone (=O) | 2-hydroxycyclohexanone (=O, OH) | cyclohexene | cyclohexane |
| 5% Ru/C NH4+ Z—Y | 0.5 mmol at 250° C. | 100 | 18.4 | 40.1 | 24.7 | 7.8 | 6.1 | 5.2 | 1.5 | 4.8 |

Figure 45:
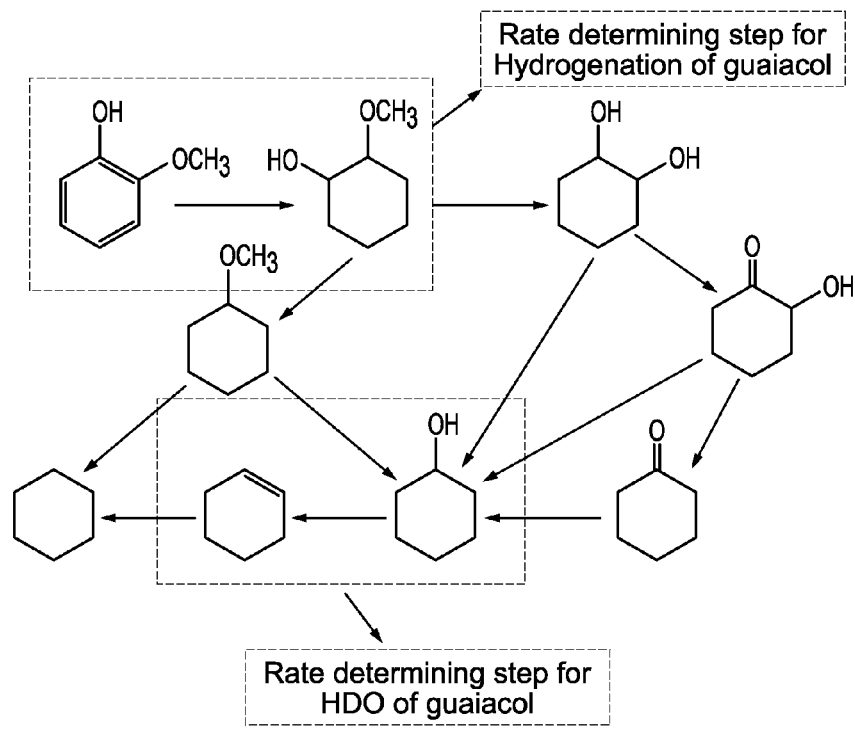
FIG. 45 shows, according to particular aspects, a reaction Pathway for Hydrogenation and HDO of Guaiacol.

As can be seen from the product distribution in Table 7, the HDO of guaiacol to cyclohexane proceeds with the formation of cyclohexanol derivatives, which subsequently converts to cyclohexanone derivatives, then to cyclohexene intermediates and finally to cyclohexane. This initially includes catalyzed hydrogenations reactions, followed by a dehydration step that is catalyzed by a Brønsted acid. Under the tested conditions, in the fully heterogeneous catalyst combination, Ru/C (5% wt) acts as the hydrogenation metal catalyst and solid acid zeolist ZEOLYST (CBV 8014 CY 1.6 and NH4+ Z—Y 57277-14-1) acts as the Brønsted solid acid for hydrolysis and dehydration. Thus, the reaction pathway for hydrodeoxygenation of lignin model compound guaiacol could be proposed as following: 1) the noble metal catalyzes the hydrogenation of the aromatic ring (rate determining step for hydrogenation) and cycloalkene; and 2) solid acid catalysts catalyze the ether hydrolysis and alcohol dehydration, which could be considered as the rate determining step for HDO (FIG. 45).

In summary: hydrotreating and hydrogenation batch reactor for exploring noble metal catalyst for HDO of depolymerized lignin was successfully constructed and operated; favorable conditions for hydrogenation and subsequent deoxygenation of lignin model compound were established; noble metal catalyst such as Ru/C (3% and 5% wt) in presence of series of Zeolyst solid acids were effectively tested for hydrogenation/HDO of lignin; conversion of ~100% of lignin model compound guaiacol could be successfully achieved under the tested hydrogenation/HDO conditions; and putative reaction pathway for hydrodeoxygenation of lignin model compound in aqueous phase was proposed.

Example 12

Catalyst Matrix Before and after HDO Conditions was Characterized

Characterization of Catalyst Matrix Before and after HDO Conditions.

Stiochiometric combination (1:1) of Ru/C (5% wt) (hydrogenation metal catalyst) and Zeolyst NH4+ Z—Y 57277-14-1 (Brønsted solid acid for hydrolysis and dehydration) as catalyst matrix were used for HDO of lignin in presence of hydrogen under aqueous media at 250° C. for 6 hours. After completion of reaction the catalyst matrix were copiously washed with dioxane, water and acetone respectively, filtered, and dried under vacuum, for removal of any residual unreacted substrate and products to obtain the spent catalyst. Both the fresh and spent catalysts were individually subjected to BET surface and X-ray diffraction analysis to determine the characteristic changes in the surface and bulk structure of the catalyst matrix as result of HDO reaction. The surface area and pore volume were measured using nitrogen adsorption on a Micromeritics Tristar II Surface Area and Porosity Analyzer. The bulk structure of the spent samples was analyzed by powder XRD on a Philips diffractometer using CoKα radiation with an iron filter. Because of the samples used in this work was powder $MoO_2$ the Bragg-Brentano optical configuration was used in the current analysis.

Table 8 shows a BET surface area analysis of catalyst matrix.

Figure 46:
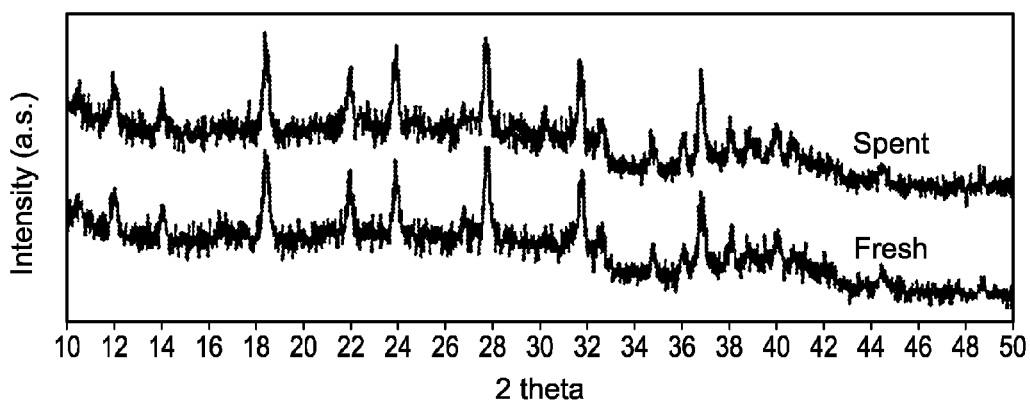
FIG. 46 shows, according to particular aspects, X-Ray diffraction analysis of 5% Ru/C and NH4+ Z—Y 57277-14-1 catalyst matrix before and after catalysis.

BET surface analysis revealed larger surface area and pore size in the catalyst matrix compatible for catalysis of lignin derived fragments, which were retained even after the reaction conditions for 6 hrs under HDO conditions (250° C. at 5 Mpa $H_2$ pressure) (Table 8). The XRD analysis on the fresh and spent (250° C. for 6 hr) catalyst indicated that there were no coke formations after the catalysis process. As observed in FIG. 46, the diffraction patterns from fresh and spent samples did not show major differences. FIG. 46 shows, according to particular aspects, X-Ray diffraction analysis of 5% Ru/C and NH4+ Z—Y 57277-14-1 catalyst matrix before and after catalysis. Hence, the crystalline structure of the catalytic material appears to remain unaffected after exposure to the reaction environment. These results are in close agreement with those obtained from nitrogen adsorption, which show that the surface area was not highly affected by the tested HDO reaction condition.

TABLE 8

BET surface area analysis of catalyst matrix.

| | |
|---|---|
| BET Surface Area: 722.9941 m²/g | BET Surface Area: 666.8048 m²/g |
| BJH Adsorption cumulative surface area of pores between 17.000 Å and 3000.000 Å width: 184.650 m²/g | BJH Adsorption cumulative surface area of pores between 17.000 Å and 3000.000 Å width: 175.007 m²/g |
| Pore Volume | Pore Volume |
| BJH Adsorption cumulative volume of pores between 17.000 Å and 3000.000 Å width: 0.291246 cm³/g | BJH Adsorption cumulative volume of pores between 17.000 Å and 3000.000 A width: 0.276753 cm³/g |
| BJH Desorption cumulative volume of pores between 17.000 Å and 3000.000 Å width: 0.264775 cm³/g | BJH Desorption cumulative volume of pores between 17.000 Å and 3000.000 Å width: 0.248681 cm³/g |
| Pore Size | Pore Size |
| BJH Adsorption average pore width (4 V/A): 63.091 Å | BJH Adsorption average pore width (4 V/A): 63.255 Å |

In Overall Summary of Examples 2 Through 12:
  isolation of depolymerized lignin (about 70-75% of original lignin) in aqueous phase was successfully achieved;
  the reduction in H, G and S lignin of pretreated solid residues progressed along with water-only flowthrough pretreatment time, as established by FTIR and Pyrolysis GC-MS analyses;
  significant reduction of S/G ratio (>60%) associated with the change of lignin composition of biomass as achieved through water-only flowthrough reaction;
  enhanced lignin removal of approx. 86% (previously 70~75%) in aqueous phase was successfully achieved;
  lignin fractions with over 90% purity were isolated under improved flowthrough conditions;
  significant recovery (75~80%) of native lignin (insoluble fraction in aqueous phase) could be achieved through flowthrough systems;
  flowthrough conditions were established for increased solubilization of lignin in aqueous phase;
  mass balance of lignin recovery was achieved successfully;
  the preferential removal and degradation of S-lignin over H and G-lignin as a result of water-only flowthrough pretreatment was validated;
  the majority of lignin-derived fragments released in the aqueous phase were determined as soluble oligomeric lignin-derived entities;
  bond cleavage of β-O-4 structure and β-ether linkage preceded by oxidative cleavage at Cα-Cβ position of end groups of lignin was verified during APD;
  molecular weight profiles of low molecular weight depolymerized lignin were successfully established;
  the insoluble lignin-derived fragments released in the aqueous phase were determined as retaining the native lignin structure;
  soluble lignin released in the aqueous phase during depolymerization reactions were derived as small molecules with free phenolic groups;
  the inter-unit linkages of insoluble lignin-derived fragments released in the aqueous phase under both water only (180° C. for 60 min) and 0.05% $H_2SO_4$ (200° C. for 5 min) flowthrough conditions were determined;
  the released insoluble lignin-derived fragments which were recovered with over 90% purity retained the lignin sub-structures, such as 8-O-4', 5'-5"/7-O-4', 8-O-4", 8-8', and 8-5', and were deploymerized to relatively low degree of polymerization (DP) ranging from 350 to 1750;
  the preferential cleavage and degradation of S-lignin over G-lignin under both water only and 0.05% $H_2SO_4$ flowthrough conditions was further substantiated via 2D HSQC NMR analysis;
  the FTIR results showed that flowthrough conditions under both water-only and 0.05% $H_2SO_4$ conditions have induced: (1) metabolism of the C=O bond and aromatic ring, (3) cleavage of the C=O bond in the syringyl methoxyl groups. In this regard, the results suggest that lignin modifications occurred on the S lignin sites; such modifications are indicative of specific degradation of the S unit within the lignin polymeric framework during water-only and 0.05% $H_2SO_4$ flowthrough pretreatment;
  appropriate catalyst and reaction condition for effective hydrogenation and HDO of lignin was established;
  HDO of inexpensive lignin to C7 and C9 cyclohexane derivatives (jet fuel range hydrocarbons) has been successfully demonstrated;
  a possible reaction pathway for formation of methylcyclohexane derivatives (C7 and C9) during HDO of lignin was elucidated;
  conversion yield of lignin, gas/volatiles and hydrocarbon/light oxygenates during HDO of lignin was verified;
  the kinetic behaviors of catalysis of lignin and data of conversion product distributions were derived;
  reaction time course for effective hydrogenation and HDO of lignin was successfully investigated;
  demonstrated generation of hydrocarbon derivatives (aromatic/aliphatic) from both low and high molecular weight flowthrough lignin under HDO conditions;
  high yields of lignin conversion (38%~45%) with excellent selectivity of HDO aromatic hydrocarbon products (90%~98%) were achieved;
  the molecular weight and reactivity of flowthrough lignin were determined as key factors for catalyst selection for HDO of lignin in presence of hydrogen;
  catalysts were successfully designed and were found to be selective, active and stable.
  provide for a simultaneous solubilization, depolymerization, and HDO process comprising integration of lignin production with HDO in a single reactor;
  described the mode and pattern of lignin solubilzation under various flowthrough conditions;
  advanced flowthrough conditions were established for high solubilization of biomass derived lignin;
  yields of soluble lignin content were successfully determined under advanced flowthrough conditions;
  hydrotreating and hydrogenation batch reactor for exploring noble metal catalyst for HDO of depolymerized lignin was successfully constructed and operated;
  favorable conditions for hydrogenation and subsequent deoxygenation of lignin model compound were established; noble metal catalyst such as Ru/C (3% and 5% wt) in presence of series of Zeolyst solid acids were effectively tested for hydrogenation/HDO of lignin;
  conversion of ~100% of lignin model compound guaiacol could be successfully achieved under the tested hydrogenation/HDO conditions;
  putative reaction pathway for HDO of lignin model compound in aqueous phase was proposed; and
  the crystalline structure of the catalytic material appears to remain unaffected after exposure to the reaction environment.
  demonstrated high yields of lignin (ethanol extracted lignin and alkali extracted lignin) conversion (40%~60%) and excellent selectivity of HDO to aromatic hydrocarbon products; (e.g. toluene 85%~90%) were achieved.
  demonstrated a catalytic process for producing aviation range hydrocarbons from agricultural residue lignin.
  4-of-6 hydrocarbon classes inherent to aviation fuel can be directly generated from the process—2 of which, aromatics and cycloalkanes—have no other apparent basis for production at suitable carbon-chain lengths.

The invention claimed is:
1. A method for aqueous isolation of depolymerized lignin in high yield from a lignin-containing biomass composition, comprising:
  positioning a lignin-containing biomass composition into a flowthrough thermal reactor chamber comprising an input opening and an output opening configured to provide for passage of an aqueous fluid through the reactor chamber, the input opening in communication with a source of aqueous fluid;

contacting the lignin biomass composition in the thermal reactor with the aqueous fluid, under elevated temperature conditions sufficient to provide for lignin release and depolymerization, by flowing the aqueous fluid through the reactor chamber under the elevated temperature conditions, to provide an output aqueous fluid comprising released depolymerized lignin;

collecting, from the output opening, the output aqueous fluid comprising the released depolymerized lignin; and contacting the released depolymerized lignin with a catalyst or catalyst system in a hydrogenation and/or hydrodeoxygenation reactor chamber to provide for hydrogenation and/or hydrodeoxygenation for deconstruction of the released polymerized lignin into lower molecular weight reactive lignin moieties and oligomers amenable for subsequent removal of oxygen to produce hydrocarbon fuels and/or chemicals and/or compounds, wherein the catalyst or catalyst system comprises a combination of one or more noble metal catalysts, with one or more solid supports, in the presence of one or a series of solid acids, and wherein the one or more noble metal catalysts comprises at least one selected from the group consisting of Pt, Pd, Ru, and Rh, wherein the one or more solid supports comprises at least one selected from the group consisting of $Al_2O_3$, C, $ZrO_2$, and $TiO_2$, and wherein the one or more solid acids are solid acidic zeolites.

2. The method of claim 1, wherein contacting the lignin biomass composition under elevated temperature conditions comprises contacting at temperature greater than about 200° C., or a temperature in a range of from 200° C. to 300° C., or in the range of from 220° C. to 260° C., or in the range from 220° C. to 240° C.

3. The method of claim 1, wherein at least 70%, at least 75%, at least 80%, at least 85%, at least 90%, at least 94%, or at least 95% of the original lignin in the lignin containing biomass composition is collected in the output aqueous fluid comprising the depolymerized lignin.

4. The method of claim 1, wherein collecting the output aqueous fluid under the flowthrough conditions results in dilution of the released, depolymerized lignin.

5. The method of claim 1, wherein the flowthrough elevated temperature conditions are sufficient to reduced or eliminate counterproductive recondensation/re-polymerization of the released depolymerized lignin, relative to non-flowthrough or batch conditions/methods.

6. The method of claim 1, wherein the depolymerized lignin comprises at least one selected from the group consisting of soluble depolymerized lignin, oligomeric lignin, and insoluble depolymerized lignin comprising native lignin structure.

7. The method of claim 1, wherein the syringyl/guaiacyl ratio of the depolymerized lignin is decreased relative to the original lignin in the lignin-containing biomass composition.

8. The method of claim 1, wherein contacting the lignin biomass composition by passing the aqueous fluid through the reactor chamber under the elevated temperature conditions, comprises passing the aqueous fluid through the reactor chamber in three different time zones, comprising a heating zone, a reaction zone at elevated temperature, and a colling zone, wherein the heating and the colling zone may optionally occur inside or outside the thermal reactor.

9. The method of claim 1, wherein the flowthrough thermal reactor chamber comprising the lignin-containing biomass composition is purged using an inert gas prior to contacting the lignin biomass composition in the thermal reactor with the aqueous fluid.

10. The method of claim 9 wherein the gas is selected from the group consisting of hydrogen, helium or nitrogen.

11. The method of claim 1, wherein the aqueous fluid is acidic.

12. The method of claim 11, wherein the acid comprises $H_2SO_4$ at a concentration in the range of 0.01% to 2%.

13. The method of claim 12 wherein the acid comprises $H_2SO_4$ at a concentration of at least 0.05% $H_2SO_4$.

14. The method of claim 1, wherein the one or more noble metal catalysts comprises at least one selected from the group consisting of Pd, Ru, and Rh.

15. The method of claim 1, wherein contacting the released depolymerized lignin with a catalyst or catalyst system in the hydrogenation and/or hydrodeoxygenation reactor chamber to provide for hydrogenation and/or hydrodeoxygenation occurs after the released depolymerized lignin exits the flowthrough thermal reactor.

16. The method of claim 15, wherein contacting the released depolymerized lignin with a catalyst or catalyst system in the hydrogenation and/or hydrodeoxygenation reactor chamber to provide for hydrogenation and/or hydrodeoxygenation occurs after the released depolymerized lignin exits the flowthrough thermal reactor in a subsequent hydrogenation and/or hydrodeoxygenation reactor chamber in communication with the flowthrough thermal reactor.

17. The method of claim 1, wherein contacting the released depolymerized ligning with a catalyst or catalyst system in the hydrogenation and/or hydrodeoxygenation reactor chamber to provide for hydrogenation and/or hydrodeoxygenation occurs within the flowthrough thermal reactor to provide for a simultaneous solubilization, depolymerization, and hydrodeoxygenation process comprising integration of depolymerized lignin production with hydrodeoxygenation in a single reactor.

18. The method of claim 1, wherein the hydrogenation and/or hydrodeoxygenation reactor chamber is purged using an inert gas prior to hydrogenation and/or hydrodeoxgenation.

19. An aqueous-based system for depolymerizing lignin in high yield from a lignin-containing biomass composition, comprising:

an aqueous flowthrough thermal reactor chamber comprising an input opening and an output opening configured to provide for passage of an aqueous fluid through the reactor chamber, the input opening in communication with a source of aqueous fluid, the reactor configured for positioning a lignin-containing biomass composition therein to provide for contact with an aqueous fluid flowing therethrough, the input configured to provide for communication with an aqueous fluid source, and with a pressure source suitable to provide for flowing an aqueous fluid with released depolymerized lignin through the flowthrough thermal reactor; and a source of heat suitable to provide for an aqueous fluid at a raised temperature within the aqueous flowthrough thermal reactor; and a hydrogenation and/or hydrodeoxygenation reactor chamber, in fluid communication with the output opening of the aqueous flowthrough thermal reactor chamber, and configured with a catalyst or catalyst system for contacting the released depolymerized lignin with the catalyst or catalyst system to provide for hydrogenation and/or hydrodeoxygenation for deconstruction of the released depolymerized lignin into lower molecular weight reactive lignin moieties and oligomers amenable for subsequent removal of oxygen to produce hydrocarbon fuels and/or chemicals and/or compounds, wherein the catalyst or catalyst system comprises a combination of one or more noble metal catalysts, with one or more solid supports, in the presence of one or a series of solid acids, and wherein the one or more noble metal catalysts comprises at least one selected from the group consisting of Pt, Pd, Ru, and Rh, wherein the one or more solid supports comprises at least one selected from the group consisting of $Al_2O_3$, C, $ZrO_2$, and $TiO_2$, and wherein the one or more solid acids are solid acidic zeolites.

20. The aqueous based system of claim 19, wherein the one or more noble metal catalysts comprises at least one selected from the group consisting of Pd, Ru, and Rh.

21. The aqueous-based system of claim 19, wherein the hydrogenation and/or hydrodeoxygenation reactor chamber is integrated with the aqueous flow through thermal reactor chamber, or is distinct from the aqueous flowthrough thermal reactor chamber.

* * * * *